(12) United States Patent
Joshi

(10) Patent No.: US 10,565,085 B2
(45) Date of Patent: Feb. 18, 2020

(54) TWO-STAGE DISTRIBUTED ESTIMATION SYSTEM

(71) Applicant: SAS Institute Inc., Cary, NC (US)

(72) Inventor: Mahesh V. Joshi, Cary, NC (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 16/433,136

(22) Filed: Jun. 6, 2019

(65) Prior Publication Data

US 2019/0377655 A1 Dec. 12, 2019

Related U.S. Application Data

(60) Provisional application No. 62/681,330, filed on Jun. 6, 2018, provisional application No. 62/694,833, filed on Jul. 6, 2018, provisional application No. 62/701,307, filed on Jul. 20, 2018, provisional application No. 62/715,570, filed on Aug. 7, 2018.

(51) Int. Cl.
*G06F 11/34* (2006.01)
*G06N 7/00* (2006.01)
*G06F 9/54* (2006.01)

(52) U.S. Cl.
CPC .......... *G06F 11/3452* (2013.01); *G06F 9/542* (2013.01); *G06N 7/005* (2013.01)

(58) Field of Classification Search
CPC ...... G06F 11/3452; G06F 9/542; G06N 7/005
USPC ....................................................... 709/224
See application file for complete search history.

(56) References Cited

U.S. PATENT DOCUMENTS

| | | | |
|---|---|---|---|
| 9,208,131 B2 | 12/2015 | Chen et al. |
| 9,507,833 B2 | 11/2016 | Guirguis et al. |
| 9,563,725 B2 | 2/2017 | Joshi et al. |
| 9,665,669 B2 | 5/2017 | Joshi et al. |
| 9,703,852 B2 | 7/2017 | Blanc et al. |
| 9,928,320 B2 | 3/2018 | Joshi et al. |

(Continued)

OTHER PUBLICATIONS

Mahesh V. Joshi, Economic Capital Modeling with SAS® Econometrics, Paper SAS 2114-2018, SAS Institute Inc., 2018, 19 pages.
(Continued)

*Primary Examiner* — Tauqir Hussain
(74) *Attorney, Agent, or Firm* — Bell & Manning, LLC

(57) ABSTRACT

Metadata received from each worker computing device describes EDF estimates for samples of marginal variables stored on each respective worker computing device. Combinations of the EDF estimates are enumerated and assigned to each worker computing device based on the metadata. A request to compute outcome expectation measure values for an outcome expectation measure is initiated to each worker computing device based on the assigned combinations. The outcome expectation measure values computed by each worker computing device are received from each respective worker computing device. The received outcome expectation measure values are accumulated for the outcome expectation measure. A mean value and a standard deviation value are computed for the outcome expectation measure from the accumulated, received outcome expectation measure values. The computed mean and standard deviation values for the outcome expectation measure are output to represent an expected outcome based on the marginal variables.

27 Claims, 44 Drawing Sheets

(56) References Cited

U.S. PATENT DOCUMENTS

| | | | |
|---|---|---|---|
| 10,002,029 B1* | 6/2018 | Bequet | G06F 9/5083 |
| 10,019,411 B2 | 7/2018 | Joshi | |
| 10,095,552 B2* | 10/2018 | Bequet | G06F 9/5083 |
| 10,095,553 B2* | 10/2018 | Bequet | G06F 9/5083 |
| 10,095,554 B2* | 10/2018 | Bequet | G06F 9/5083 |
| 2014/0278239 A1 | 9/2014 | Macaro et al. | |
| 2014/0358831 A1 | 12/2014 | Adams et al. | |
| 2015/0234955 A1* | 8/2015 | Joshi | G06F 17/5009 |
| | | | 703/2 |
| 2016/0063145 A1* | 3/2016 | Chang | H04L 65/403 |
| | | | 703/6 |
| 2016/0285700 A1* | 9/2016 | Gopalakrishnan | G06N 7/005 |
| 2018/0060470 A1 | 3/2018 | Joshi et al. | |
| 2018/0174694 A1* | 6/2018 | Mashio | G06N 7/005 |

OTHER PUBLICATIONS

The ECM Procedure, SAS® Help Center: Example 12.1 Developing an Economic Capital Model, Aug. 22, 2018, 18 pages.

SAS® Econometrics 8.3 Econometrics Procedures, SAS Institute Inc., Chapters 1, 2, 3 , 6, and 12, Jul. 2018.

* cited by examiner

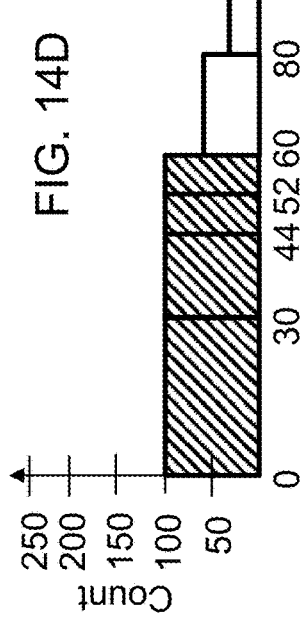
FIG. 14D
FIG. 14E
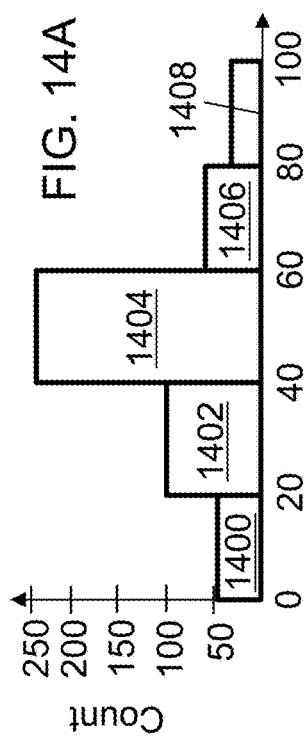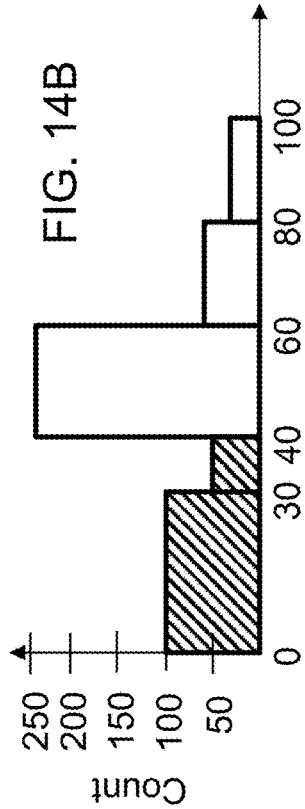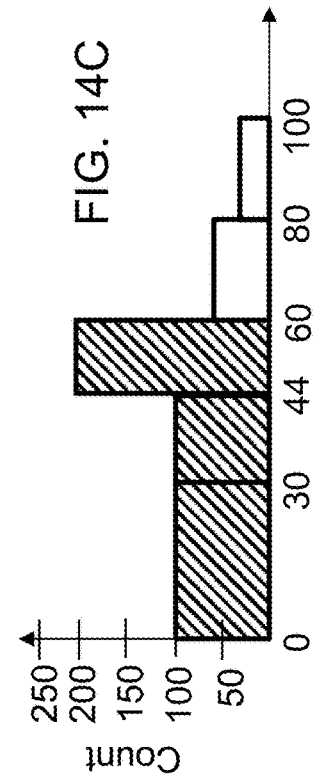
FIG. 14A
FIG. 14B
FIG. 14C

FIG. 18A

Analysis of Variance for Variable CB_loss
Classified by Variable method

| method | N | Mean |
|---|---|---|
| FULL | 5000000 | 12453.3232 |
| 2STG | 5000000 | 12453.8197 |

FIG. 18B

| Source | DF | Sum of Squares | Mean Square | F Value | Pr > F |
|---|---|---|---|---|---|
| Among | 1 | 616234.5807546 | 616234.58 | 0.0340 | 0.8537 |
| Within | 9999998 | 1.812206082E14 | 18122064.45 | | |

FIG. 18C

Conover Scores for Variable CB_loss
Classified by Variable method

| method | N | Sum of Scores | Expected Under H0 | Std Dev Under H0 | Mean Score |
|---|---|---|---|---|---|
| FULL | 5000000 | 1.66684E20 | 1.66667E20 | 4.71405E16 | 3.33368E13 |
| 2STG | 5000000 | 1.66649E20 | 1.66667E20 | 4.71405E16 | 3.33299E13 |

FIG. 18D

Conover Two-Sample Test

| | |
|---|---|
| Statistic | 1.66684E20 |
| Z | 0.3673 |
| One-Sided Pr > Z | 0.3567 |
| Two-Sided Pr > \|Z\| | 0.7134 |

Kolmogorov-Smirnov Test for Variable CB_loss Classified by Variable method

| method | N | EDF at Maximum | Deviation from Mean at Maximum |
|---|---|---|---|
| FULL | 5000000 | 0.200259 | 0.254465 |
| 2STG | 5000000 | 0.200031 | -0.254465 |
| Total | 10000000 | 0.200145 | |

FIG. 18E

Kolmogorov-Smirnov Two-Sample Test (Asymptotic)

| KS | 0.000114 | D | 0.000228 |
|---|---|---|---|
| KSa | 0.359867 | Pr > KSa | 0.9995 |

FIG. 18F

Kuiper Test for Variable CB_loss Classified by Variable method

| method | N | Deviation from Mean |
|---|---|---|
| FULL | 5000000 | 0.000228 |
| 2STG | 5000000 | 0.000123 |

FIG. 18G

Kuiper Two-Sample Test (Asymptotic)

| K | 0.000351 | Ka | 0.554347 | Pr > Ka | 1.0000 |

FIG. 18H

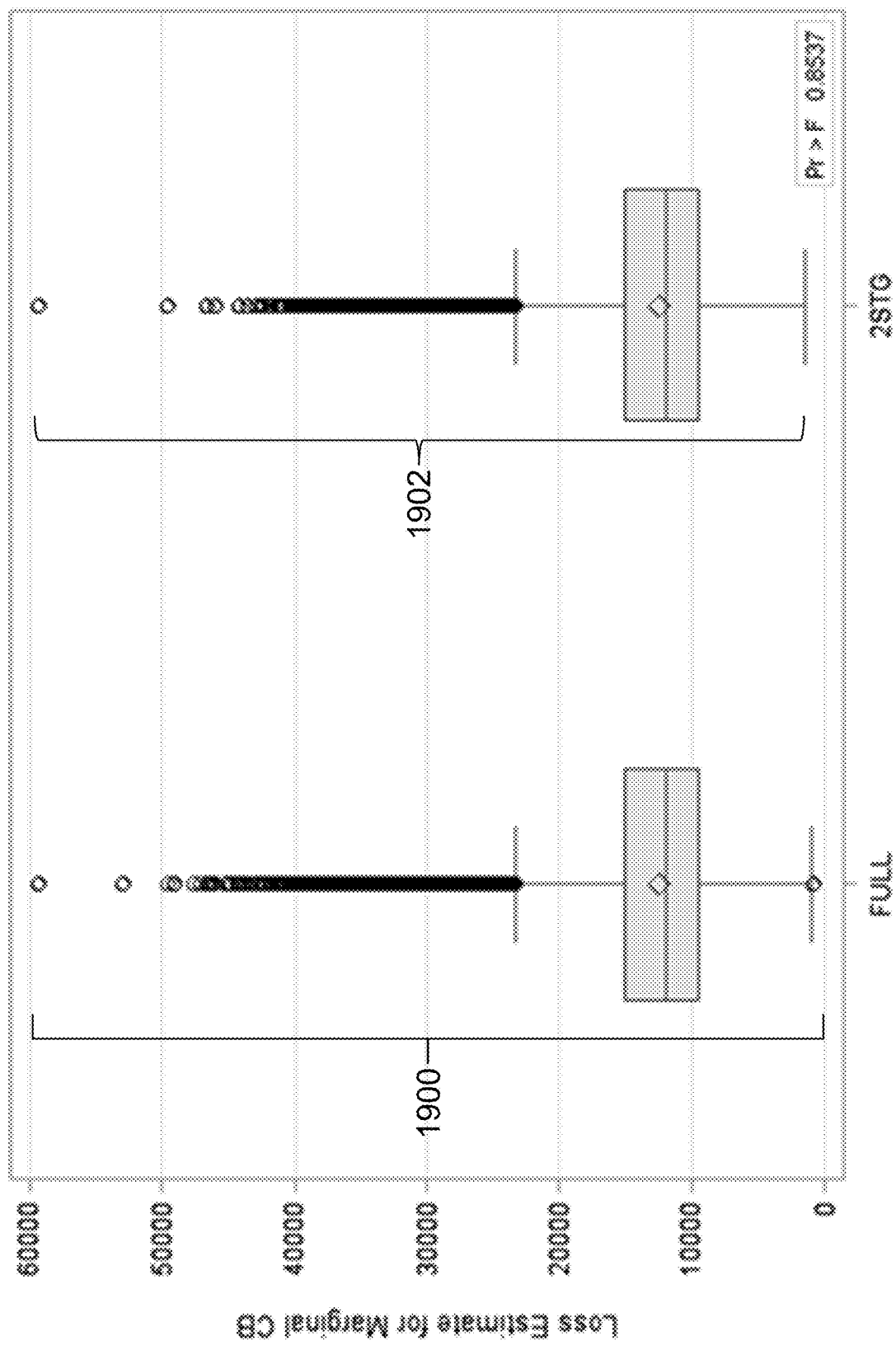

FIG. 20A

Analysis of Variance for Variable CB_loss
Classified by Variable method

| method | N | Mean |
|---|---|---|
| FULL | 5000000 | 12453.3232 |
| 2STG | 5000000 | 12462.5182 |

FIG. 20B

| Source | DF | Sum of Squares | Mean Square | F Value | Pr > F |
|---|---|---|---|---|---|
| Among | 1 | 211367767.5279 | 211367767.5 | 11.6273 | 0.0006 |
| Within | 9999998 | 1.81785352E14 | 18178539.9 | | |

FIG. 20C

Conover Scores for Variable CB_loss
Classified by Variable method

| method | N | Sum of Scores | Expected Under H0 | Std Dev Under H0 | Mean Score |
|---|---|---|---|---|---|
| FULL | 5000000 | 1.66686E20 | 1.66667E20 | 4.71405E16 | 3.33373E13 |
| 2STG | 5000000 | 1.66647E20 | 1.66667E20 | 4.71405E16 | 3.33294E13 |

FIG. 20D

Conover Two-Sample Test

| Statistic | 1.66686E20 |
|---|---|
| Z | 0.4169 |
| One-Sided Pr > Z | 0.3384 |
| Two-Sided Pr > |Z| | 0.6767 |

Kolmogorov-Smirnov Test for Variable CB_loss Classified by Variable method

| method | N | EDF at Maximum | Deviation from Mean at Maximum |
|---|---|---|---|
| FULL | 5000000 | 0.530423 | 1.295131 |
| 2STG | 5000000 | 0.529264 | -1.295131 |
| Total | 10000000 | 0.529844 | |

FIG. 20E

Kolmogorov-Smirnov Two-Sample Test (Asymptotic)

| KS | 0.000579 | D | 0.001158 |
|---|---|---|---|
| KSa | 1.831591 | Pr > KSa | 0.0024 |

FIG. 20F

Kuiper Test for Variable CB_loss Classified by Variable method

| method | N | Deviation from Mean |
|---|---|---|
| FULL | 5000000 | 0.001158 |
| 2STG | 5000000 | 0.000118 |

FIG. 20G

Kuiper Two-Sample Test (Asymptotic)

| K | 0.001276 | Ka | 2.017533 | Pr > Ka | 0.0089 |
|---|---|---|---|---|---|

FIG. 20H

TWO-STAGE DISTRIBUTED ESTIMATION SYSTEM

CROSS-REFERENCE TO RELATED APPLICATIONS

The present application claims the benefit of 35 U.S.C. § 119(e) to U.S. Provisional Patent Application No. 62/681,330 filed Jun. 6, 2018, the entire contents of which are hereby incorporated by reference. The present application also claims the benefit of 35 U.S.C. § 119(e) to U.S. Provisional Patent Application No. 62/694,833 filed Jul. 6, 2018, the entire contents of which are hereby incorporated by reference. The present application also claims the benefit of 35 U.S.C. § 119(e) to U.S. Provisional Patent Application No. 62/701,307 filed Jul. 20, 2018, the entire contents of which are hereby incorporated by reference. The present application also claims the benefit of 35 U.S.C. § 119(e) to U.S. Provisional Patent Application No. 62/715,570 filed Aug. 7, 2018, the entire contents of which are hereby incorporated by reference.

SUMMARY

In an example embodiment, a computer-readable medium is provided having stored thereon computer-readable instructions that when executed by a computing device, cause the computing device to provide distributed computation of an outcome expectation measure. Metadata is received from each worker computing device of a plurality of worker computing devices. The metadata from each worker computing device describes a plurality of EDF estimates computed for each of a plurality of samples of each of a plurality of marginal variables that is stored on each respective worker computing device. A plurality of combinations of the EDF estimates are enumerated and assigned to each worker computing device based on the received metadata. A request to compute outcome expectation measure values for an outcome expectation measure is initiated to each worker computing device of the plurality of worker computing devices based on the assigned plurality of combinations of the EDF estimates. The outcome expectation measure values computed by each worker computing device of the plurality of worker computing devices are received from each respective worker computing device. The received outcome expectation measure values are accumulated for the outcome expectation measure. A mean value and a standard deviation value are computed for the outcome expectation measure from the accumulated, received outcome expectation measure values. The computed mean and standard deviation values for the outcome expectation measure are output to represent an expected outcome based on the plurality of marginal variables.

In another example embodiment, a system is provided. The system includes, but is not limited to, a processor and a computer-readable medium operably coupled to the processor. The computer-readable medium has instructions stored thereon that, when executed by the processor, cause the system to provide distributed computation of an outcome expectation measure.

In yet another example embodiment, a method of distributed computation of an outcome expectation measure is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 14A to 14E graphically illustrate creation of equal proportion bins as part of a first iteration in accordance with an illustrative embodiment.

FIGS. 18A to 18H provide first tables of comparative results between the described system and an existing system in accordance with an illustrative embodiment.

FIG. 19 provides a first box plot for comparison between the described system and the existing system in accordance with an illustrative embodiment.

FIGS. 20A to 20H provide second tables of comparative results between the described system and the existing system in accordance with an illustrative embodiment.

DETAILED DESCRIPTION

Figure 1:
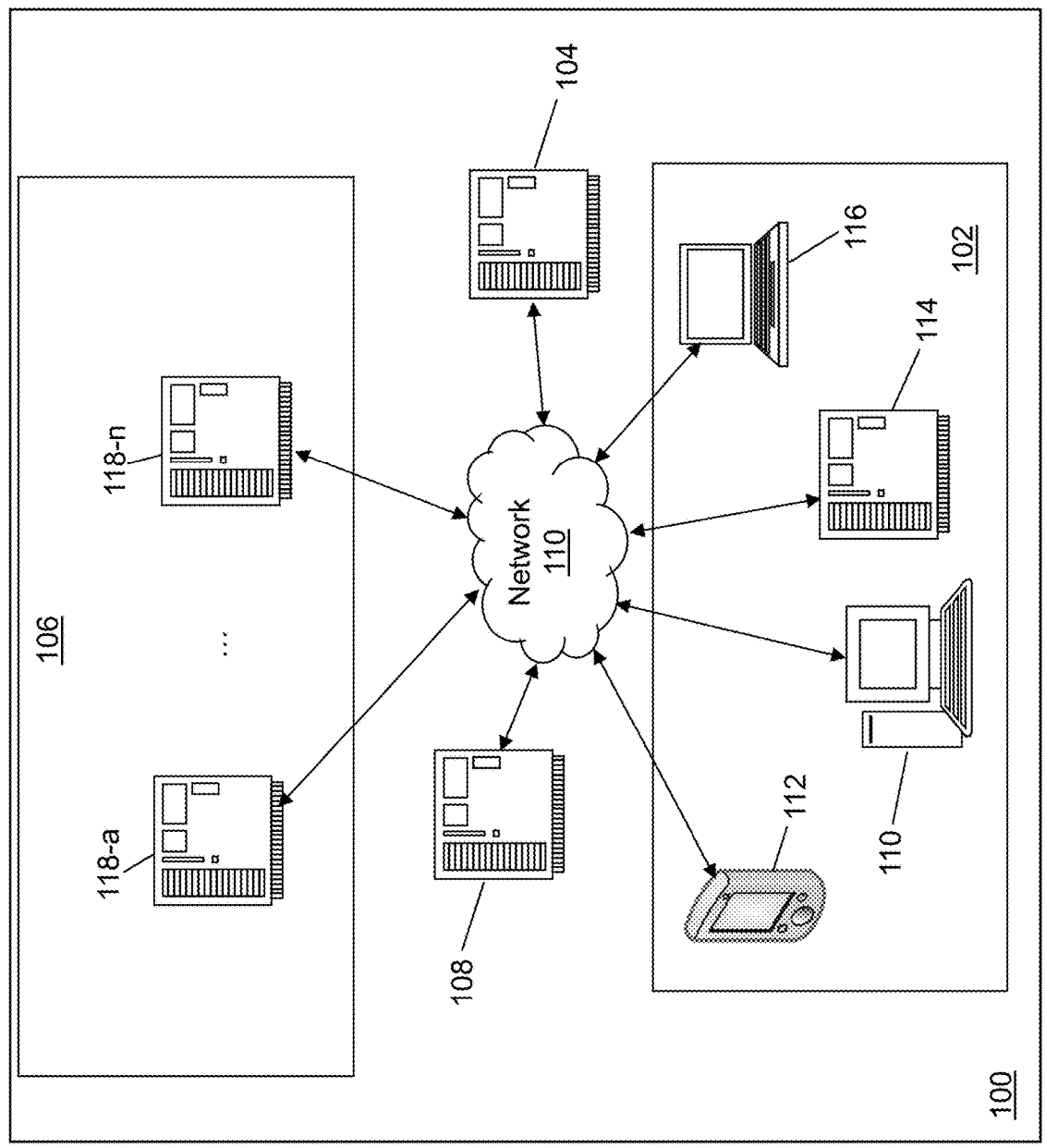
FIG. 1 depicts a block diagram of a distributed system in accordance with an illustrative embodiment.

Referring to FIG. 1, a block diagram of a distributed system 100 is shown in accordance with an illustrative embodiment. In an illustrative embodiment, distributed system 100 may include a user system 102, a manager device 104, a worker system 106, a prediction device 108, and a network 110. Each of user system 102, manager device 104, worker system 106, and prediction device 108 may be composed of one or more discrete computing devices in communication through network 110.

Many phenomena in the real world can be modeled as stochastic (probabilistic) processes. Complex processes often consist of individual processes such that a measure of the composite process is derived from the measurement of the individual processes. An individual measure of each individual process can be obtained by various means, such as sensor data and written or computer records of past observations of the process. When individual processes are stochastic and are dependent on each other, the statistical properties of an aggregate measure of the composite process are not easy to compute. Such situations arise in many application domains. For example, in finance, an individual measure might be the marginal incurred by one line of business (LoB) and the aggregate measure can be the aggregate measure across all LoBs of an enterprise. In this context, the process of estimating the statistical properties of the aggregate measure is part of the economic capital modeling (ECM) process. In another example, climate models often include prediction of the statistical properties of an aggregate precipitation in an area given the large empirical samples of the precipitation that is observed in several catchment areas, some or all of which might be dependent on each other due to geographic or climatological proximity. In yet another example from reliability modeling, the lifetime or up-time of a physical system that is built from multiple components is dependent on the reliability of those individual components. If an individual measure represents some failure indicator of a component, the aggregate measure that indicates the failure of the entire system can be derived from the individual measures by such operations as minimum lifetime of any one component. In yet another example from demand modeling in the retail industry, some products might have an intermittent demand such that only a few quantities of the product are ordered intermittently, and the statistical properties of the product's demand are best encoded in a large empirical sample from its distribution. If the demand for such a product is dependent on demands of other intermittent-demand products, it is challenging to estimate the statistical properties of an aggregate measure, such as the sum, minimum, or maximum, of the individual demands.

The common denominators in all these and possibly many other similar applications are as follows:

Multiple individual stochastic measures that are dependent on each other. Each one of the multiple dependent individual measures is typically called a marginal random variable or simply a marginal.

The dependency structure of marginals is available in the form a large joint probability sample. For example, the joint probability sample might have been simulated from dependency models such as copula models.

The final quantity of interest is an aggregate measure, which is computed from the marginals by using an aggregation function. For example, the aggregation function can be a summation of marginals, a minimum value of marginals, or an elaborate, application-dependent composition of marginals.

The goal is to estimate the probability distribution of the aggregate measure.

Distributed system 100 solves the problem of estimating the probability distribution of the aggregate measure given a joint probability sample and estimates of the probability distribution of each marginal. Distributed system 100 employs a multi-step process that first converts each marginal's probability in the joint probability sample to an estimate of that marginal's value by computing the quantile function of that marginal. Distributed system 100 then applies the aggregation function to the marginal values to compute the aggregate measure. Repeating this for each observation of the joint probability sample results in a sample of the aggregate measure that correctly accounts for the dependency among marginals. Distributed system 100 then computes any desired outcome expectation measure by using the sample of the aggregate measure. For example, where the aggregate measure is the enterprise-wide marginal, an outcome expectation measure can be a value-at-outcome expectation (VaR), which is a percentile from the aggregate measure's sample, or it can be a tail value-at-outcome expectation (TVaR), which is an average of the values that exceed a specified VaR. In the reliability application, where the aggregate measure is the minimum of the failure times of individual components (marginals), an outcome expectation measure can be the probability of a specific failure time, which is an estimate of the empirical distribution function (EDF) that is computed by using the sample of the aggregate measure.

Distributed system 100 overcomes the following difficulties that arise in implementing this process by existing systems:

The size of the joint probability sample needs to be large to capture salient features of the joint probability space. Often this large joint probability sample needs to be simulated and distributed across multiple machines of a distributed computing system.

The quantile computation for a marginal is often not easy, especially when an estimate of the marginal's probability distribution is only available in the form of a large empirical sample, which happens when the cumulative distribution function (CDF) or the quantile function of the marginal is not available in closed-form. For such cases, quantiles are estimated by percentiles, but computing large number of percentiles from a large empirical sample is a memory- and compute-intensive task.

It is not sufficient to generate just one sample of the aggregate measure, because it leads to only the point estimate (one value) of an outcome expectation measure. It is desirable to estimate at least the location (mean) and scale (variance or standard deviation) of the outcome expectation measure, and that requires a large number of aggregate measure samples.

Distributed system 100 solves the very computationally intensive problem by using parallel and distributed processing as well as approximate algorithms, both sequential and parallel, for estimating the EDF from a large empirical sample, which is then used for fast percentile computations.

Network 110 may include one or more networks of the same or different types. Network 110 can be any type of wired and/or wireless public or private network including a cellular network, a local area network, a wide area network such as the Internet or the World Wide Web, etc. Network 110 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 110 to/from another of the one or more computing devices of user system 102 and/or to/from manager device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
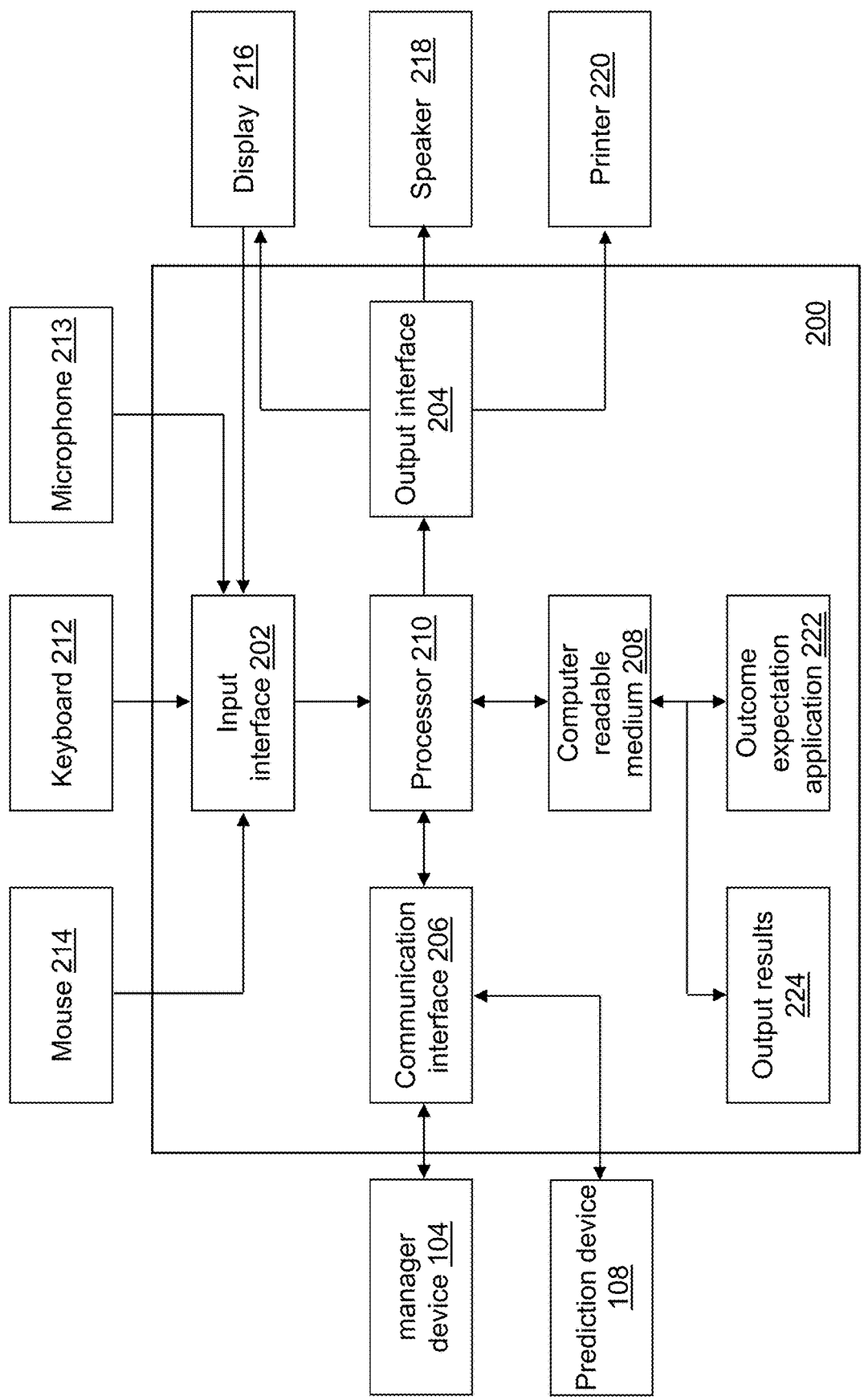
FIG. 2 depicts a block diagram of a user device of the distributed system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a non-transitory computer-readable medium 208, a processor 210, a outcome expectation application 222, and output results 224. Each computing device of user system 102 may be executing outcome expectation application 222 of the same or different type.

Referring again to FIG. 1, manager device 104 can include any form factor of computing device. For illustration, FIG. 1 represents manager device 104 as a server computer. Manager device 104 may send and receive signals through network 110 to/from user system 102 and/or to/from worker system 106 and/or to/from prediction device 108. Manager device 104 may communicate using various transmission media that may be wired and/or wireless as understood by those skilled in the art. Manager device 104 may be implemented on a plurality of computing devices of the same or different type. Distributed system 100 further may include a plurality of manager devices.

Figure 3:
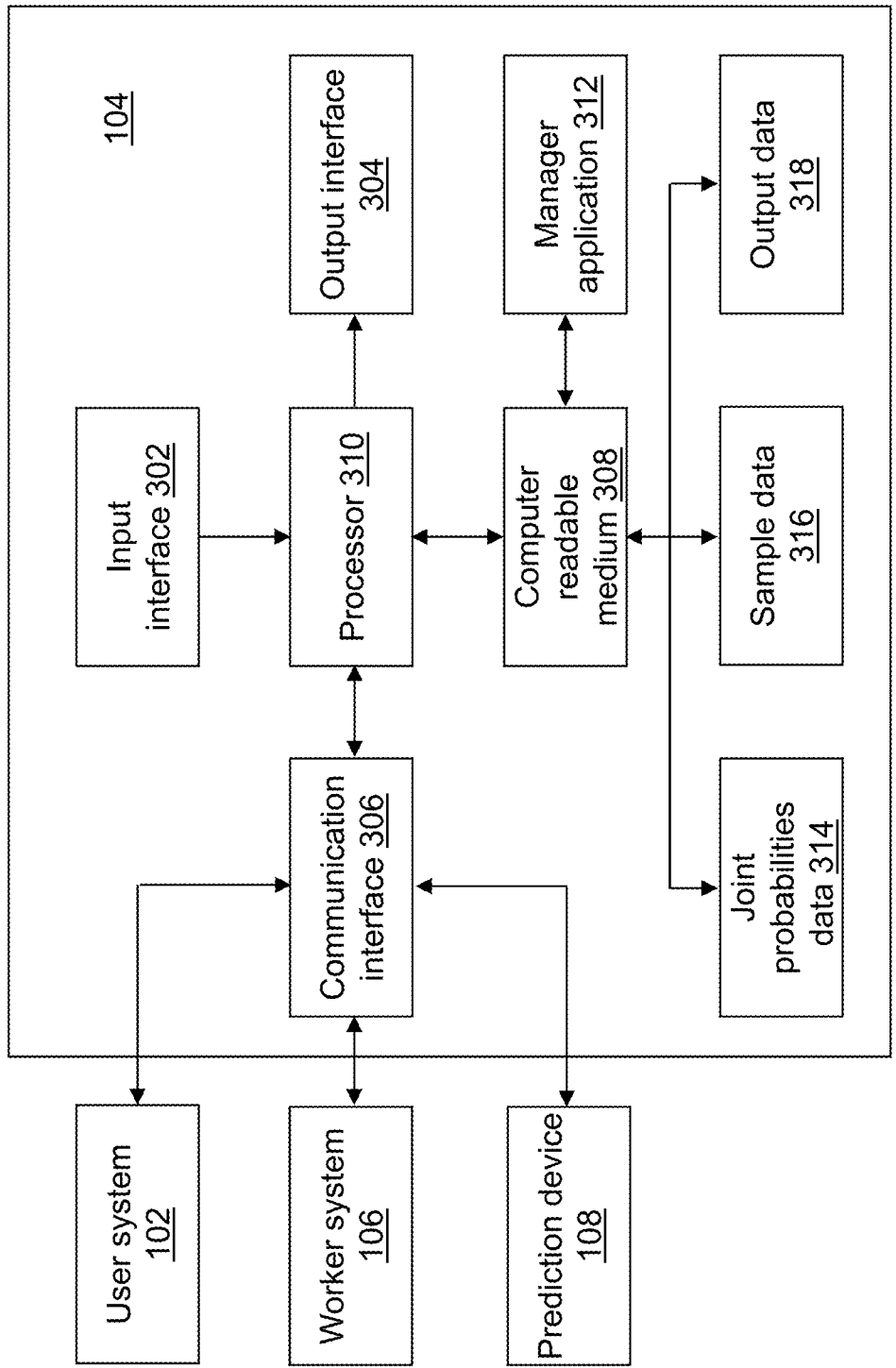
FIG. 3 depicts a block diagram of a manager device of the distributed system of FIG. 1 in accordance with an illustrative embodiment.

For illustration, referring to FIG. 3, a block diagram of manager device 104 is shown in accordance with an illustrative embodiment. Manager device 104 may include a second input interface 302, a second output interface 304, a second communication interface 306, a second non-transitory computer-readable medium 308, a second processor 310, a manager application 312, joint probabilities data 314, sample data 316, and output data 318. Manager device 104 may execute manager application 312 that creates output data 318 based on joint probabilities data 314 by controlling execution by the computing devices of worker system 106.

Referring again to FIG. 1, the one or more computing devices of worker system 106 may include computers of any form factor such as a desktop, a server, a laptop, etc. For example, in the illustrative embodiment, worker system 106 includes a first server computer 118-$a$, . . . , and an nth server computer 118-$n$. Each server computer may support use of a plurality of threads. The computing devices of worker system 106 may send and receive signals through network 110 to/from manager device 104 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4:
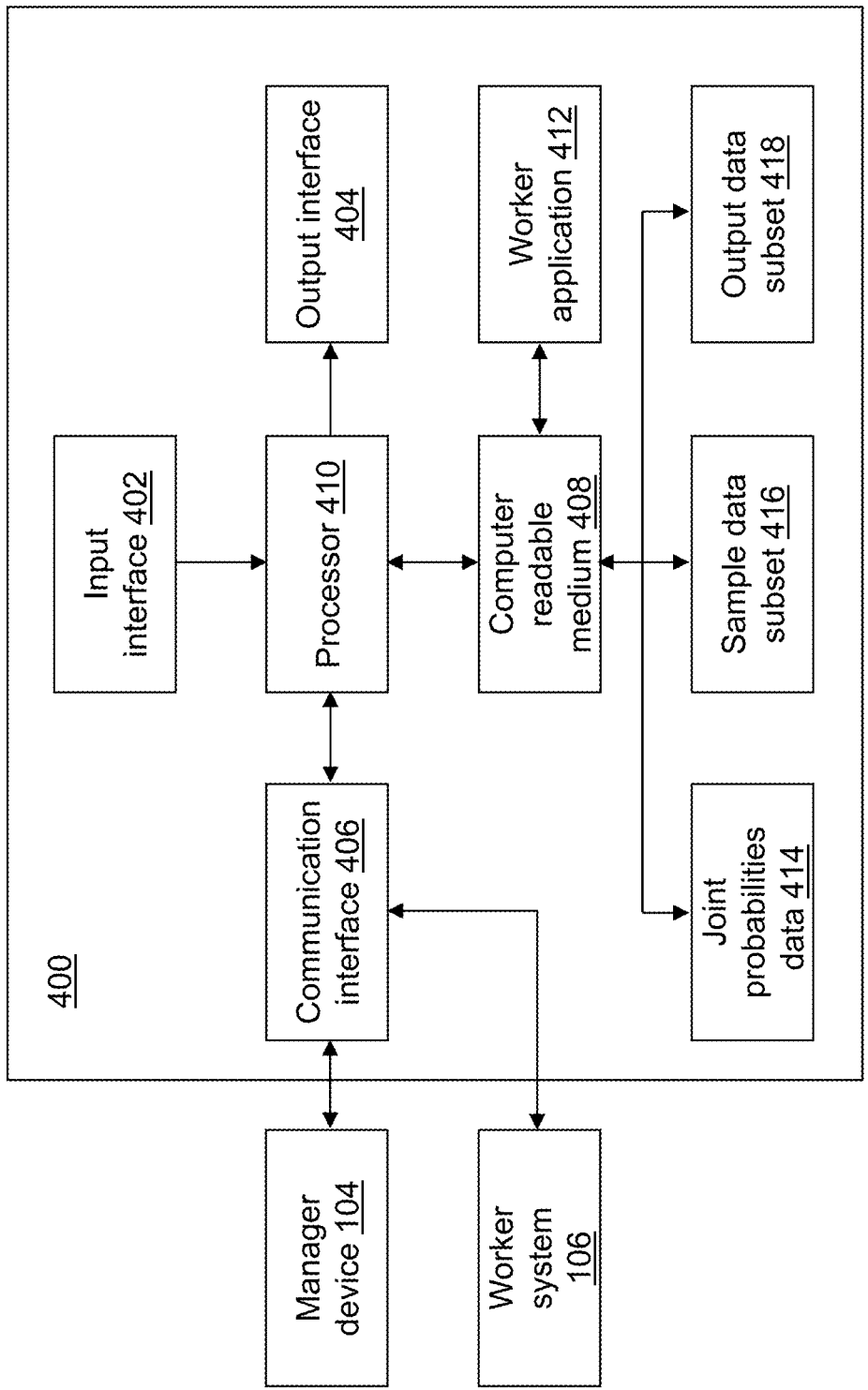
FIG. 4 depicts a block diagram of a worker device of the distributed system of FIG. 1 in accordance with an illustrative embodiment.

For illustration, referring to FIG. 4, a block diagram of a worker device 400 is shown in accordance with an example embodiment. Worker device 400 is an example computing device of worker system 106. For example, each of first server computer 118-$a$, . . . , and nth server computer 118-$n$ may be an instance of worker device 400. Worker device 400 may include a third input interface 402, a third output interface 404, a third communication interface 406, a third non-transitory computer-readable medium 408, a third processor 410, a worker application 412, a joint probabilities data 414, a sample data subset 416, and output data subset 418.

Referring again to FIG. 1, prediction device 108 may include one or more computers of any form factor such as a desktop, a server, a laptop, etc. Prediction device 108 may send and receive signals through network 110 to/from another of the one or more computing devices of user system 102 and/or to/from manager device 104. Prediction device 108 may communicate using various transmission media that may be wired and/or wireless as understood by those skilled in the art.

Figure 16:
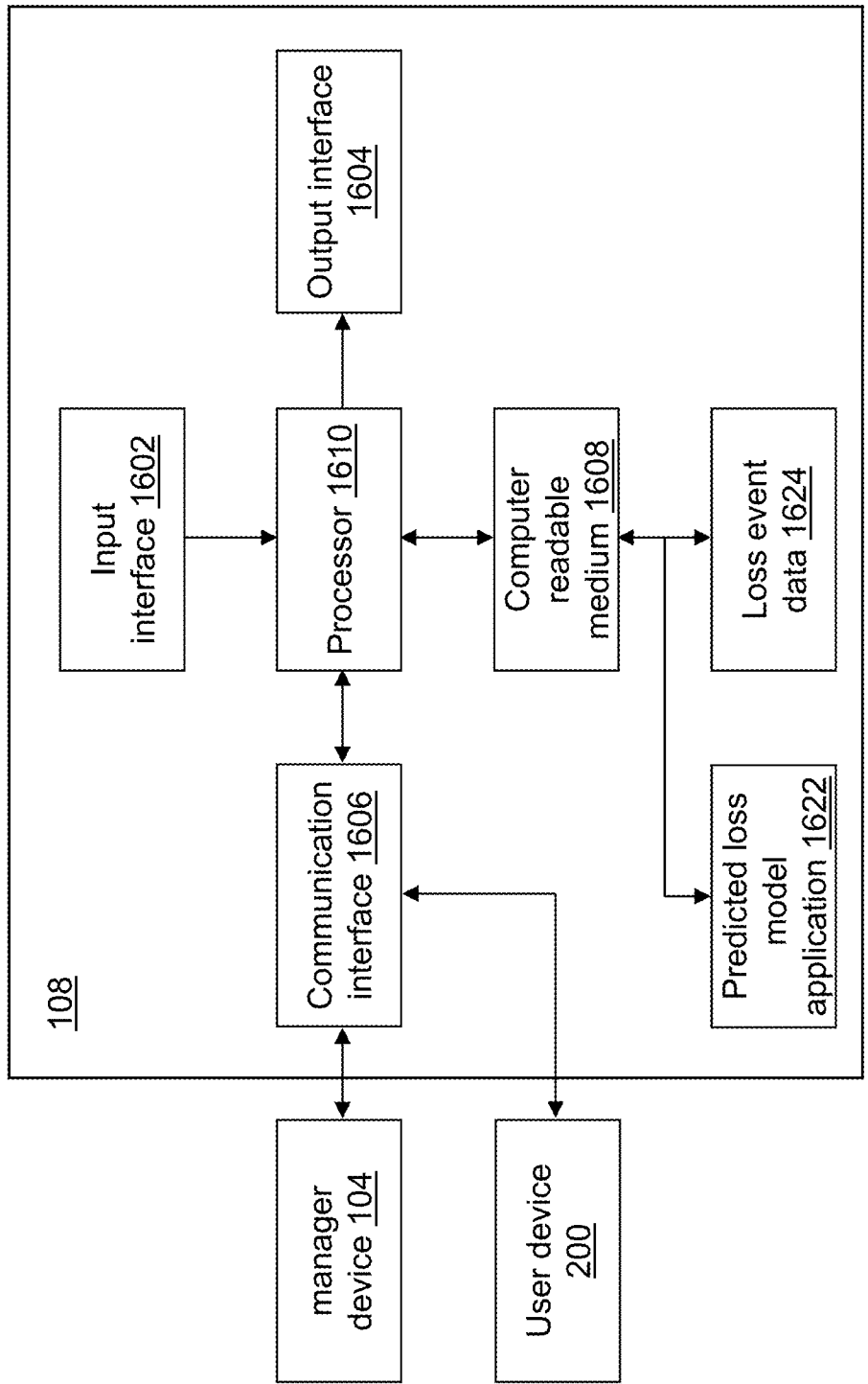
FIG. 16 depicts a block diagram of a prediction device in accordance with an illustrative embodiment.

For illustration, referring to FIG. 16, a block diagram of prediction device 108 is shown in accordance with an illustrative embodiment. Prediction device 108 may include a fourth input interface 1602, a fourth output interface 1604, a fourth communication interface 1606, a fourth non-transitory computer-readable medium 1608, a fourth processor 1610, a predictive marginal model application 1622, and marginal event data 1624. Fewer, different, and/or additional components may be incorporated into prediction device 108. Prediction device 108 and user device 200 and/or manager device 104 may be the same or different devices.

Referring again to FIG. 2, each user device 200 of user system 102 may include the same or different components and combinations of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a microphone 214, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 includes a touch screen that allows input from a user and that presents output to the user. User device 200 may have one or more input interfaces that use the same or a different input interface technology. The input interface technology further may be accessible by user device 200 through communication interface 206.

Output interface 204 provides an interface for outputting information for review by a user of user device 200. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and manager device 104 and/or prediction device 108 using communication interface 206.

Non-transitory computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106 and/or output interface 104.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Outcome expectation application 222 performs operations associated with defining an aggregate measure sample and/or outcome expectation measure values from joint probabilities data 314 and sample data 318. The operations may be implemented using hardware, firmware, software, or any combination of these methods. Referring to the example embodiment of FIG. 2, outcome expectation application 222 is implemented in software (comprised of computer-readable and/or computer-executable instructions) stored in computer-readable medium 208 and accessible by processor 210 for execution of the instructions that embody the operations of outcome expectation application 222. Outcome expectation application 222 may be written using one or more programming languages, assembly languages, scripting languages, etc.

Outcome expectation application 222 may be implemented as a Web application. For example, outcome expectation application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Outcome expectation application 222 may be integrated with other analytic tools. As an example, outcome expectation application 222 may be part of an integrated data analytics software application and/or software architecture such as that offered by SAS Institute Inc. of Cary, N.C., USA. For example, outcome expectation application 222 may be implemented using or integrated with one or more SAS software tools such as Base SAS, SAS® Econometrics, SAS/STAT®, SAS/ETS®, SAS® Visual Data Mining and Machine Learning, SAS® Visual Analytics, SAS® Viya™, all of which are developed and provided by SAS Institute Inc. of Cary, N.C., USA.

Referring to FIG. 3, fewer, different, or additional components may be incorporated into manager device 104. Second input interface 302 provides the same or similar functionality as that described with reference to input interface 202 of user device 200 though referring to manager device 104. Second output interface 304 provides the same or similar functionality as that described with reference to output interface 204 of user device 200 though referring to manager device 104. Second communication interface 306 provides the same or similar functionality as that described with reference to communication interface 206 of user device 200 though referring to manager device 104. Data and messages may be transferred between manager device 104 and user device 200 and/or worker device 400 and/or prediction device 108 using second communication interface 306. Second computer-readable medium 308 provides the same or similar functionality as that described with reference to computer-readable medium 208 of user device 200 though referring to manager device 104. Second processor 310 provides the same or similar functionality as that described with reference to processor 210 of user device 200 though referring to manager device 104.

Manager application 312 performs operations associated with creating output data 318 that includes outcome expectation measure values and/or summary statistics based on inputs provided from user device 200 and/or prediction device 108 possibly using the computing devices of worker system 106. The operations may be implemented using hardware, firmware, software, or any combination of these methods. Referring to the example embodiment of FIG. 3, manager application 312 is implemented in software (comprised of computer-readable and/or computer-executable instructions) stored in second computer-readable medium 308 and accessible by second processor 310 for execution of the instructions that embody the operations of manager application 312. Manager application 312 may be written using one or more programming languages, assembly languages, scripting languages, etc. Manager application 312 may be implemented as a Web application. Manager application 312 may be integrated with other analytic tools including outcome expectation application 222 and worker application 412 in various manners.

Referring to FIG. 4, fewer, different, and additional components may be incorporated into worker device 400. Each worker device 400 of worker system 106 may include the same or different components or combination of components.

Third input interface 402 provides the same or similar functionality as that described with reference to input interface 202 of user device 200 though referring to worker device 400. Third output interface 404 provides the same or similar functionality as that described with reference to output interface 204 of user device 200 though referring to worker device 400. Third communication interface 406 provides the same or similar functionality as that described with reference to communication interface 206 of user device 200 though referring to worker device 400. Data and messages may be transferred between worker device 400 and another computing device of worker system 106 and/or manager device 104 using third communication interface 406. Third computer-readable medium 408 provides the same or similar functionality as that described with reference to computer-readable medium 208 of user device 200 though referring to worker device 400. Third processor 410 provides the same or similar functionality as that described with reference to processor 210 of user device 200 though referring to worker device 400.

Outcome expectation application 222, manager application 312, and worker application 412 may be the same or different applications that are integrated in various manners to build a model using joint probabilities data 314 and sample data 316 distributed across a plurality of computing devices that may include manager device 104 and/or worker system 106.

Joint probabilities data 314 includes estimated joint probability distributions of random variables that are associated with sample data 316. Joint probabilities data 314 may include, for example, a plurality of rows and a plurality of columns. The plurality of rows may be referred to as observation vectors or records (observations), and the columns may be referred to as marginal variables. For example, each marginal variable of the plurality of marginal variables may be a line of business of an entity, a climate measurement, such as a precipitation amount in a catchment area, a lifetime of a component in a system, or an otherwise different marginal variable to which sample data 316 is associated. The plurality of marginal variables may define multiple dimensions for each observation vector. An observation vector $x_i$ may include a probability value for each of the plurality of marginal variables associated with the observation i.

Joint probabilities data 314 may be stored on computer-readable medium 208, on second computer-readable medium 308, and/or on third computer-readable medium 408, and/or on one or more computer-readable media accessible by manager application 312 using second communication interface 306 and/or second input interface 302. Joint probabilities data 314 may be stored using various structures as known to those skilled in the art including one or more files of a file system, a relational database, one or more tables of a system of tables, a structured query language database, etc. Joint probabilities data 314 may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and marginal variables (columns) that can be processed by one or more SAS software tools.

Manager device 104 may coordinate access to joint probabilities data 314 that is distributed across worker system 106. For example, joint probabilities data 314 may be stored in a cube distributed across worker system 106 that forms a grid of computers as understood by a person of skill in the art. As another example, joint probabilities data 314 may be stored in a multi-node Hadoop® cluster. For instance, Apache™ Hadoop® is an open-source software framework for distributed computing supported by the Apache Software Foundation. As another example, joint probabilities data 314 may be stored in worker system 106 that forms a cloud of computers and accessed using cloud computing technologies, as understood by a person of skill in the art. The SAS® LASR™ Analytic Server may be used as an analytic platform to enable multiple users to concurrently access data stored in joint probabilities data 314. The SAS® Viya™ open, cloud-ready, in-memory architecture also may be used as an analytic platform to enable multiple users to concurrently access data stored in joint probabilities data 314. SAS Cloud Analytic Services (CAS) may be used as an analytic server with associated cloud services in SAS Viya. Some systems may be of other types and configurations.

Figure 17:
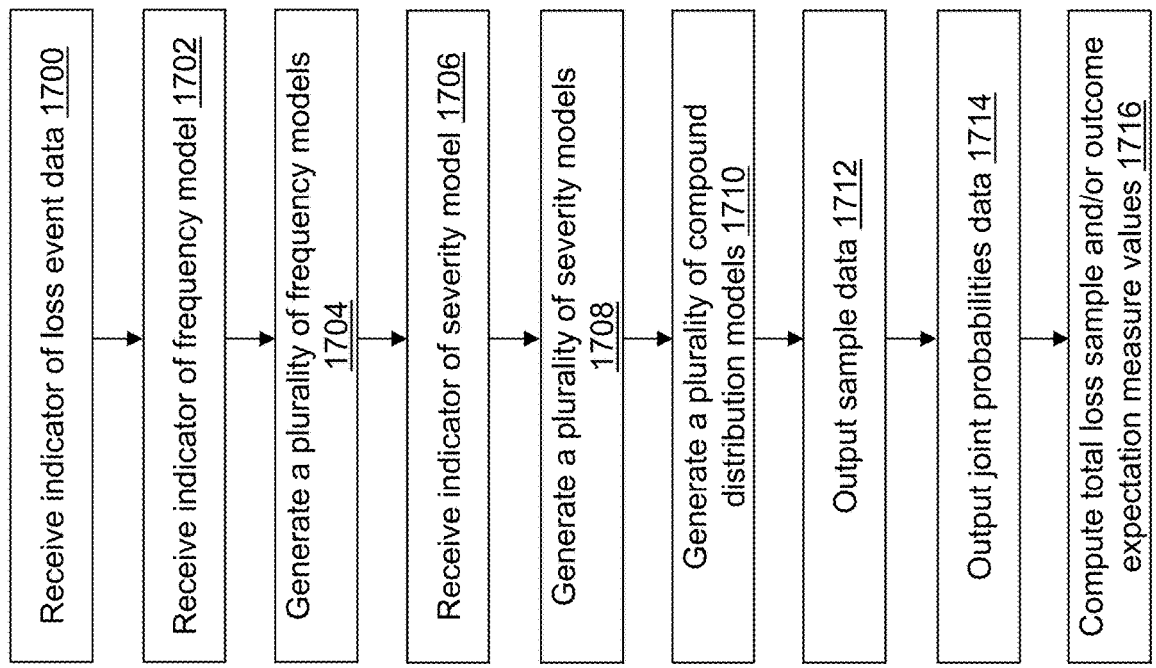
FIG. 17 depicts a flow diagram illustrating examples of operations performed by the prediction device of FIG. 16 in accordance with an illustrative embodiment.

The data stored in sample data 316 may be generated using the operations of FIG. 17, for example, as described in U.S. Pat. No. 9,563,725. Sample data 316 includes simulated marginal data generated using frequency and severity model combinations from perturbed marginal event data 1624. Each sample data 316 corresponds to one marginal. Where there are multiple marginals, there may be a plurality of sample data, one for each marginal. Sample data 316 for each marginal may be further comprised of a plurality of samples that each may include a plurality of rows and one or more columns. The one or more columns contain random draws from the marginal's probability distribution. For example, sample data 316 may be organized as a plurality of tables. Each sample table of the plurality of tables may be created from a simulation of the frequency and severity model combinations with the perturbed marginal event data 1624. Each sample table of the plurality of tables further may be associated with a different marginal variable.

Sample data 316 may be stored on computer-readable medium 208, on second computer-readable medium 308, and/or on third computer-readable medium 408, and/or on one or more computer-readable media accessible by manager application 312 using second communication interface 306 and/or second input interface 302. Sample data 316 may be stored using various structures as known to those skilled in the art including one or more files of a file system, a relational database, one or more tables of a system of tables, a structured query language database, etc. Sample data 316 may be organized using delimited fields, such as comma or space separated fields, fixed width fields, using a SAS® dataset, a SAS© Viya™ table, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Manager device 104 may coordinate access to sample data 316 that is distributed across worker system 106 where a unique portion of sample data 316 may be distributed into sample data subset 416 stored at a respective worker device 400. Again, for example, each sample data subset 416 may be organized into the plurality of tables created from a simulation of the frequency and severity model combinations with the perturbed marginal event data 1624 and may be associated with a different marginal variable. Manager device 104 may also store a unique portion of sample data 316 or no portion of sample data 316. As a result, only the unique portion of sample data 316, if any, may be stored on computer-readable medium 308. For example, sample data 316 may be stored in a cube distributed across worker system 106 that forms a grid of computers as understood by a person of skill in the art. As another example, sample data 316 may be stored in a multi-node Hadoop® cluster. For instance, Apache™ Hadoop® is an open-source software framework for distributed computing supported by the Apache Software Foundation. As another example, sample data 316 may be stored in worker system 106 that forms a cloud of computers and accessed using cloud computing technologies, as understood by a person of skill in the art. The SAS® LASR™ Analytic Server may be used as an analytic platform to enable multiple users to concurrently access data stored in sample data 316. The SAS® Viya™ open, cloud-ready, in-memory architecture also may be used as an analytic platform to enable multiple users to concurrently access data stored in sample data 316.

Figure 5:
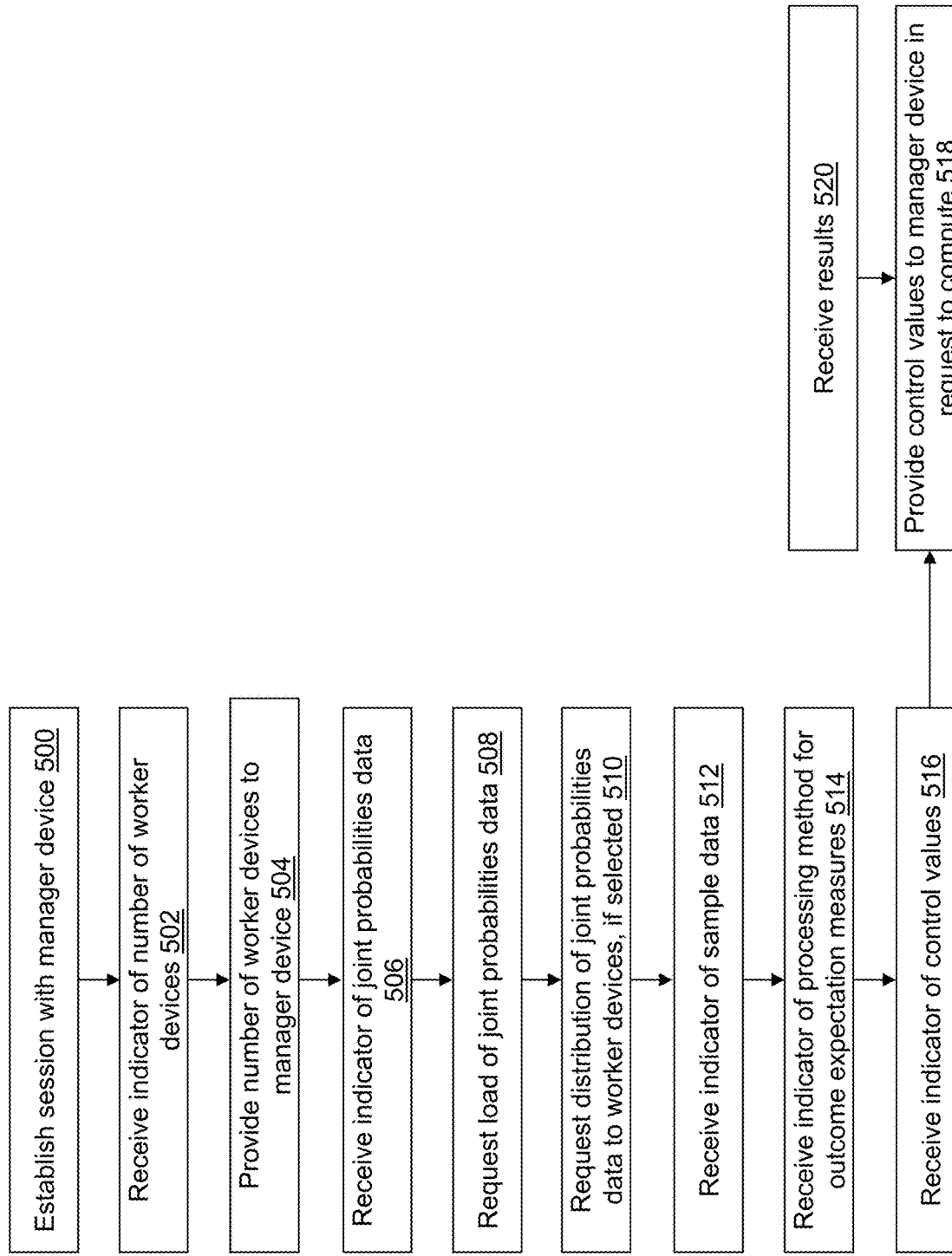
FIG. 5 depicts a flow diagram illustrating examples of operations performed by the user device of FIG. 2 in accordance with an illustrative embodiment.

Referring to FIG. 5, example operations associated with outcome expectation application 222 are described. Additional, fewer, or different operations may be performed depending on the embodiment. The order of presentation of the operations of FIG. 5 is not intended to be limiting. A user can interact with one or more user interface windows presented to the user in a display under control of outcome expectation application 222 independently or through a browser application in an order selectable by the user. Although some of the operational flows are presented in sequence, the various operations may be performed in various repetitions, concurrently, and/or in other orders than those that are illustrated. For example, a user may execute outcome expectation application 222, which causes presentation of a first user interface window, which may include a plurality of menus and selectors such as drop-down menus, buttons, text boxes, hyperlinks, etc. associated with outcome expectation application 222 as understood by a person of skill in the art. As further understood by a person of skill in the art, various operations may be performed in parallel, for example, using a plurality of threads or a plurality of computing devices such as a grid or a cloud of computing devices.

In an operation 500, a session is established with manager device 104. A "session" includes user device 200, manager device 104, and a plurality of worker devices of worker system 106. The session may optionally also include prediction device 108. User device 200 accepts commands from a user and relays instructions to manager device 104. Manager device 104 establishes a communication network with the worker devices of worker system 106, sending instructions to the worker devices of worker system 106, collecting and aggregating the results of computations from the worker devices of worker system 106, and communicating final results to user device 200 or an indication of completion of generation of the final results. Manager device 104 may utilize itself as a worker device. The worker devices of worker system 106 receive instructions from manager device 104, store and process data, and send the results of computations back to manager device 104. Worker devices of worker system 106 may also communicate with each other directly to accomplish tasks.

In an operation 502, a first indicator may be received that indicates a value of $N_w$ for a number of worker devices 400 of worker system 106 that may include manager device 104 (for example, the same or another indicator may indicate whether to include manager device 104 or it may or may not be included by default). The first indicator may further indicate whether manager device 104 is configured in a single-machine mode or a distributed mode. In an alternative embodiment, the first indicator may not be received. For example, a default value may be stored, for example, in computer-readable medium 208 and used automatically. In another alternative embodiment, $N_w$ may not be selectable. Instead, a fixed, predefined value may be used. The value further may be automatically determined based on a number of computing devices connected to manager device 104.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on multiple processing units. More simply, single-machine mode means multithreading on the computing device. The number of CPUs (cores) on the computing device may be used to determine a number of concurrent threads. For example, one thread per core may be used though a number of threads on any computing device of distributed system 100 may be changed under control of the user. Manager device 104 may be a grid host specified for a distributed mode and may be identified using a domain name system (DNS) or IP address of manager device 104 as a separate device from user device 200. Alternatively, user device and manager device 104 may be the same device.

In an operation 504, the value of $N_w$, the number of computing devices or workers of worker system 106 may be provided to manager device 104. For example, the value of $N_w$ may be sent in a message or other instruction to manager device 104 or may be provided in a known memory location to manager device 104. In an alternative embodiment, user device 200 and manager device 104 may be integrated in the same computing device so that when the value of $N_w$ is received by user device 200, it is also received by manager device 104. A worker computing device may also be referred to as a worker node.

In an operation 506, a second indicator may be received that indicates joint probabilities data 314. For example, the second indicator indicates a location and a name of joint probabilities data 314. As an example, the second indicator may be received by outcome expectation application 222 after selection from a user interface window or after entry by a user into a user interface window. In an alternative embodiment, joint probabilities data 314 may not be selectable. For example, a most recently created dataset may be used automatically. The second indicator may further indicate whether each worker device uses joint probabilities data 414 already stored on a respective worker device 400 with no data movement, whether joint probabilities data 414 is distributed across worker system 106 and should be combined, or whether a common copy of joint probabilities data 414 has already been distributed across worker system 106, or whether joint probabilities data 314 already exists on a single computing device such as manager device 104. An illustrative joint probabilities data 314 is shown below as Table I, where each row contains the probabilities of the simultaneous occurrence of the values that you would expect to see for each of the plurality of marginals caused by the dependency among them:

TABLE I

| Marginal variable 1 | Marginal variable 2 | ... | Marginal variable M |
|---|---|---|---|
| 0.3 | 0.6 | ... | 0.2 |
| 0.5 | 0.25 | ... | 0.7 |
| ... | ... | ... | ... |
| 0.75 | 0.5 | ... | 0.6 |
| 0.2 | 0.9 | ... | 0.3 |

In an operation 508, loading of joint probabilities data 314 may be requested. For example, user device 200 may request that joint probabilities data 314 be loaded into a table that is ready for processing. If joint probabilities data 414 is distributed across worker system 106 and the second indicator indicates joint probabilities data 414 should be combined, joint probabilities data 414 from each worker device 400 may be collected to define joint probabilities data 314. For example, a worker device 400 of worker system 106 or manager device 104 may be selected to receive joint probabilities data 414 from each worker device 400 and combine them with its own copy, if any. The selection may be random or may be based on a characteristic such as an amount of available memory in second computer-readable medium 308 or third computer-readable medium 408. As another option, when the second indicator indicates that each worker device load joint probabilities data 414 already stored on a respective worker device 400 with no data movement between the computing devices of distributed system 100, each worker device 400 is requested to load its respective joint probabilities data 414 into third computer-readable medium 408. When $N_w=1$, joint probabilities data 414 may be loaded into second computer-readable medium 308 of manager device 104.

In an illustrative embodiment, whether joint probabilities data 314 is distributed is determined. When joint probabilities data 314 is available on a single one worker node ($N_w=1$), joint probabilities data 314 is broadcast from that worker node to each of the other worker nodes of worker system 106. When joint probabilities data 314 is distributed, whether a portion of joint probabilities data 314 on a worker node w, referred to as $J_w$, is large enough on each worker node is determined based on a threshold value, $NJ_{min}$, that can be user-specified or a system default included as a control value. The threshold value $NJ_{min}$ helps in controlling and minimizing a cost of data movement. When $J_w \geq NJ_{min}$ on each worker node w, joint probabilities data 314 on the worker node w is the portion of joint probabilities data 314 on the worker node w. When $J_w < NJ_{min}$ on some worker node w, joint probabilities data 314 is gathered on manager device 104 or one of the worker nodes of worker system 106. Let $N_j$ denote a sum of the sizes of $J_w$ on all the worker nodes of worker system 106. When $N_j \geq N_w J_{min}$, approximately $N_j/N_w$ observations of joint probabilities data 314 is distributed to each worker. When $N_j < N_w J_{min}$, joint probabilities data 314 is broadcast to each of the worker nodes of worker system 106.

In an operation 510, a distribution of the loaded joint probabilities data 314 to each worker device 400 of worker system 106 by or coordinated by manager device 104 is requested, for example, as described for the illustrative embodiment in the paragraph above.

In an operation 512, a third indicator may be received that indicates sample data 316. For example, the third indicator indicates a location and a name of sample data 316. As an example, the third indicator may be received by outcome expectation application 222 after selection from a user interface window or after entry by a user into a user interface window. In an alternative embodiment, sample data 316 may not be selectable. For example, a most recently created dataset may be used automatically. The third indicator may further indicate whether sample data 314 is already distributed across worker system 106 and/or manager device 104.

In an operation 518, a fourth indicator of a processing method may be received. For illustration, the processing method may be selected from sequential empirical distribution function (EDF) estimation, parallel EDF estimation, or local sample sort EDF estimation. In an alternative embodiment, the fourth indicator may not be received. For example, a default processing method may be stored, for example, in computer-readable medium 208 or second computer-readable medium 308 and used automatically. In another alternative embodiment, the processing method may not be selectable.

An EDF of a random variable is a nonparametric estimate of a cumulative distribution function (CDF). EDF is computed from a sample of values of the random variable. EDF is useful in many applications, such as a computation of percentiles for a large set of probability values. The local sample sort EDF estimation described herein makes percentile computations expensive in terms of both runtime and memory requirements because it requires the sample data to be brought to a single memory and sorted. However, the local sample sort EDF estimation provides an exact solution instead of an approximate solution when the sample is small enough to fit in a single memory. The sequential EDF estimation and parallel EDF estimation described herein make percentile computations faster while reducing memory requirements for storing the EDF estimates by binning the data into B bins, where B<N, where N is a sample size. The B bins are formed such that a distribution of counts in all the bins is approximately uniform making the bins equal proportioned. The set of values that represent the boundaries of the equal proportioned bins can be used as the EDF estimate. The value of B is determined by the desired accuracy of the EDF estimates. The largest EDF accuracy—that is, the smallest difference between two consecutive values of the EDF—that can be achieved for an N-sized sample is 1/N, or when B=N. For most practical applications, a smaller accuracy is acceptable especially for certain regions of the EDF.

The sequential EDF estimation and parallel EDF estimation described herein allow the user to specify different accuracy levels for different regions. In particular, the sequential EDF estimation and parallel EDF estimation described herein allow the user to specify multiple regions by specifying the desired CDF value at the start of each region and a different accuracy level for each region. For example, when the marginal's probability distribution has a fat (or heavy) right tail, which can especially occur in financial, climatology, and retail applications there are typically two regions of interest: a body region and a tail region. The tail region may be of particular importance so a higher accuracy may be requested for the tail region. As described herein, the binning process includes two stages. A first stage provides coarse binning to find region boundaries, and a second stage provides finer binning in each region independently by applying the region-specific accuracy levels. As long as the requested accuracy level in the more populated regions is less than $1/N_g$, where $N_g$ denotes the number of sample points that fall in the gth region, the sequential EDF estimation and parallel EDF estimation described herein achieve data compression to reduce an amount of memory needed to store the EDF estimate as well as avoiding the memory and run time costs associated with sorting the data.

In an operation 516, a fifth indicator of control values may be received. For illustration, the control values may include a plurality of outcome expectation measure values to compute on the aggregate measure sample. In an alternative embodiment, the fifth indicator may not be received. For example, one or more default values for the control values may be stored, for example, in computer-readable medium 208 or second computer-readable medium 308 and used automatically. In another alternative embodiment, one or more of the control values may not be selectable. Instead, fixed, predefined values may be used. Illustrative values for the plurality of outcome expectation measure values may include 50%, 75%, 95%, 97.5%, 97.5%, etc. Each outcome expectation measure value may be defined as a percentage value or as a fractional value. $N_r$ is a number of the plurality of outcome expectation measure values. An accuracy value further may be associated with each outcome expectation measure value. The control values may include a fewer or a greater number of control values that may be different in various embodiments.

In an operation 518, the control values may be provided to manager device 104 with a request to perform EDF estimation and compute the outcome expectation measure values. For example, the control values may be sent in the request or other instruction to manager device 104 or may be provided in a known memory location to manager device 104. In an alternative embodiment, user device 200 and manager device 104 may be integrated in the same computing device so that when the control values are received by user device 200, the control values are also received by manager device 104.

In an operation 520, results are received when complete. For example, a notification may be received from manager device 104 indicating that the processing to compute the aggregate measure sample and/or the outcome expectation measure values and/or summary statistics is complete. In addition, or in the alternative, the summary statistics, the aggregate measure sample, and/or the outcome expectation measure values may be stored in output data 318 on second computer-readable medium 308. In addition, or in the alternative, the summary statistics, the aggregate measure sample, and/or the outcome expectation measure values may be received from manager device 104. For example, one or more output tables may be presented on display 216 when the computational process is complete. As another option, display 216 may present a statement indicating that the computational process is complete. The user may access the summary statistics, the aggregate measure sample, and/or the outcome expectation measure values in a predefined location(s).

Referring to FIGS. 6A to 6E, example operations associated with manager application 312 are described. Additional, fewer, or different operations may be performed depending on the embodiment. The order of presentation of the operations of FIGS. 6A to 6E is not intended to be limiting. Again, manager application 312 and outcome expectation application 222 may be integrated or be the same applications so that the operations of FIG. 5 and FIGS. 6A to 6E are merged.

In an operation 600, the value of $N_w$, the number of computing devices or worker devices of worker system 106 may be received from user device 200 or directly from the user of user device 200.

In an operation 601, the control values may be received from user device 200 or directly from the user of user device 200 when integrated.

In an operation 602, sample data 316 is distributed as needed. In an illustrative embodiment, let $k_m$ denote the number of samples that are available for the mth marginal, and let $S_m$ denote one of the samples of the mth marginal. If $S_m$ is distributed across multiple worker nodes, the default EDF estimation method may be the parallel EDF estimation method. However, if the user specifies local-sort or the sequential EDF method, distributed system 100 attempts to bring $S_m$ to one of the worker nodes, for example, the worker node with the least work load. This operation might fail if none of the worker nodes can accommodate the sample $S_m$ in its entirety. In that case, distributed system 100 ignores the user's selection (after appropriately notifying the user) and reverts to the default parallel EDF estimation method. When parallel EDF estimation method is used, the EDF estimate is kept on manager device 104.

Parallel EDF estimation in general allows the final EDF estimate to be brought to the manager device or to keep it distributed. Only in the context of outcome expectation measure computation, it is preferable to bring it onto the manager device and keep it there so that it can be sent to a worker as part of a combination.

If $S_m$ is already available in its entirety on one of the worker nodes, the default EDF estimation method is the sequential EDF estimation method. However, if the user specifies the local-sort method, distributed system 100 attempts to use that method. If the local-sort method fails, which can happen if $S_m$ is too large, distributed system 100 ignores the user's selection (after appropriately notifying the user) and reverts to the default sequential method. The EDF estimate is kept on the worker node where $S_m$ is stored.

If $S_m$ is already available in its entirety on one of the worker nodes and if the user specifies the parallel EDF estimation method, distributed system 100 ignores the selection (after appropriately notifying the user) and chooses the default sequential EDF estimation method. The EDF estimate is kept on the worker node where $S_m$ is stored.

In an operation 604, an EDF estimate is computed for each sample and for each marginal variable based on the selected EDF estimation method in combination with an analysis of the distribution of the sample data for each marginal variable. To compute the EDF estimate, processing continues in an operation 613 of FIG. 6B.

In an operation 605, sample combinations are enumerated and assigned to worker devices. To enumerate and assign the sample combinations, processing continues in an operation 800 of FIG. 8.

In an operation 606, EDF estimates of the required non-local samples are gathered on each worker device. For each worker, the non-local samples in the combinations that are assigned to it are identified, and the EDF estimates of those samples are sent to that worker. Each non-local EDF estimate might come from manager device 104 (if the corresponding sample is a distributed sample whose EDF estimates are computed by using the parallel EDF estimation process), or it can come from another worker (if the corresponding sample is local to another worker).

In an operation 607, a request to compute outcome expectation measure values is sent to each worker device 400. To request to compute outcome expectation measure values, processing continues in an operation 1040 of FIG. 10B. The computations are performed independently and in parallel on the worker nodes for their respectively assigned combinations of marginal samples. At the end of this step, each worker w has $K_w$-sized sample $R_w$ for the outcome expectation measure, where $K_w$ denotes the number of combinations that the worker w processes.

In operation 608, the outcome expectation measure values are received from each worker device 400 of worker system 106.

In an operation 609, the outcome expectation measure values are accumulated and optionally stored in output data 318. For example, output data 318 may include a sample $R=\{R_1, R_2, \ldots, R_{Nw}\}$ of each outcome expectation measure value that has size $K=K_1+K_2+\ldots+K_{Nw}$, where $N_w$ is the number of worker devices 400 of worker system 106 that may include manager device 104, $i=1, \ldots, N_w$ is output data subset 418 of an $i^{th}$ worker device 400, and $i=1, \ldots, N_w$ is a size of output data subset 418 of the $i^{th}$ worker device 400. R is an empirical sample drawn from a probability distribution of the associated outcome expectation measure value.

In an operation 610, any desired summary statistic that can be computed from sample R for the associated outcome expectation measure value may also be computed from the accumulated outcome expectation measure values and optionally stored in output data 318. For example, a sample mean and a sample standard deviation of R estimate the popular measures of location and dispersion (scale), respectively. If robust statistics are desired, a median and inter-quartile range can be computed from R as estimates of location and dispersion, respectively. If there are $N_r$ outcome expectation measures, the summary statistic(s) is/are computed from the sample R associated with each outcome expectation measure value.

In an operation 611, output data 318 may be provided to user device 200 if user device 200 and manager device 104 are not integrated. For example, a notification may be sent to user device 200 indicating the processing is complete and that the results are available. The results further may be returned to user device 200.

The local sample sort EDF estimation processing method provides an easy way to compute an EDF estimate by sorting the sample while accounting for duplicate values and assigning an EDF estimate of r/N to each sorted unique value y in the sample, where r is the number of values that are less than or equal to y in the sample and N is the total number of values in the sample. This essentially means that the entire sample serves as the EDF estimate. To compute a $P^{th}$ percentile (0<P<100) from the EDF estimate, the two values in the sorted sample are found such that their EDF estimates are closest to P/100, and they are combined in some manner, for example by taking their average. For a faster computation, the EDF estimate needs to be kept in memory, which means that the entire sample needs to be kept in memory for the local sample sort EDF estimation method. When N is large, and the EDF estimates need to be computed for many random variables, the memory requirements for the local sample sort method can become prohibitively large.

The parallel EDF estimation and sequential EDF estimation processing methods reduce the memory requirements for storing the EDF estimates, thereby allowing faster percentile computations from such EDF. The parallel EDF estimation and sequential EDF estimation processing methods bin the data into B bins, where B<N. The bins are formed such that a distribution of counts in all of the bins is approximately uniform. In other words, the fraction of values that fall in each bin is approximately equal. By keeping approximately, the same fraction in each bin, the parallel EDF estimation and sequential EDF estimation processing allow a control over the precision of the EDF estimates. The smaller the fraction of observations in each bin, the greater the precision, and the higher the accuracy of the EDF estimates. The bin boundaries can be used to compute the EDF estimate. As long as the desired accuracy is not too high to cause each bin to have very few observations, B can be significantly smaller than N, thereby achieving a good degree of data compression and saving memory. If the distribution of counts is exactly uniform across all bins, the EDF estimate at a start of a $b^{th}$ bin is simply b/B. However, if a distribution of counts is not exactly uniform, the EDF estimate at the start of the $b^{th}$ bin is $N_{b-1}/N$, where $N_{b-1}$ is a sum of counts in a previous b−1 bins. To compute a $P^{th}$ percentile, a binary search is done in O(log(B)) time to find the two bins whose EDF estimates are closest to P/100, and the boundaries of those bins are combined, for example, by taking their average.

The value of B, and thereby the amount of data compression, is determined by the desired accuracy of the EDF estimates. However, the desired accuracy might not be uniform across the entire range of values where the probability distribution of V is defined. Certain ranges of values might require higher accuracy than other ranges. For example, in applications where the right tail of the probability distribution of V is of particular interest, the larger marginal values usually need to be estimated with higher accuracy than the smaller marginal values. Each consecutive range of mutually exclusive values of V in the observed sample S forms a region. Such regions are defined based on the desired CDF values at the region boundaries and their associated desired accuracy value of the EDF estimates for each region. Let $P_k$ denote the CDF value at the end of the $k^{th}$ region. Note that $0<P_k<100$ and $P_{k-1}<P_k$ for $k=1, \ldots, K-1$, where $P_0=0$ and $P_K=1$. The $k^{th}$ region contains values $v_j$ in the sample T such that $F^{-1}(P_{k-1})<v_j<F^{-1}(P_k)$, where $F^{-1}$ denotes the inverse of the CDF, which is also known as the quantile function.

Figure 6A:
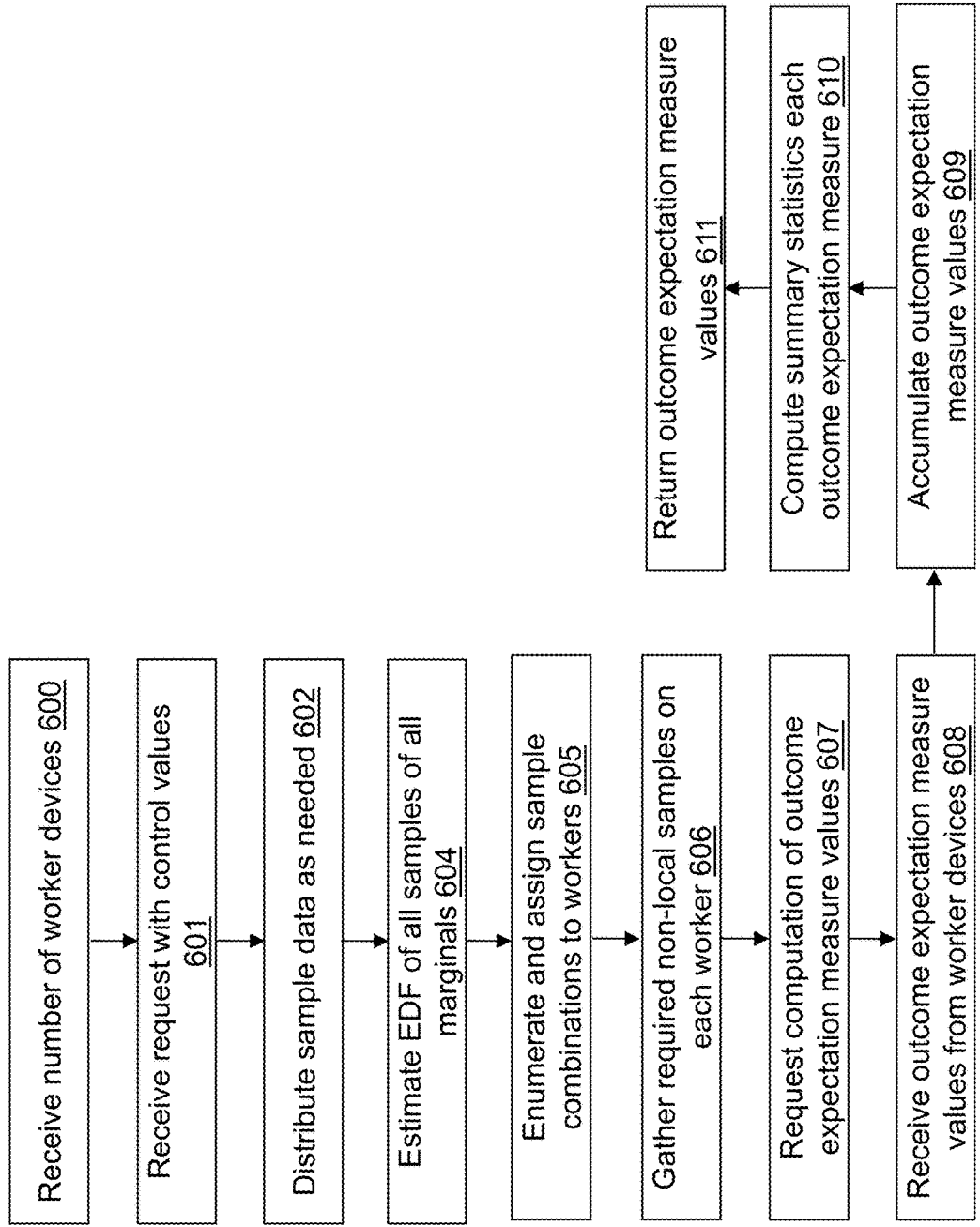
FIGS. 6A to 6E depicts a flow diagram illustrating examples of operations performed by the manager device of FIG. 3 in accordance with an illustrative embodiment.
Figure 6B:
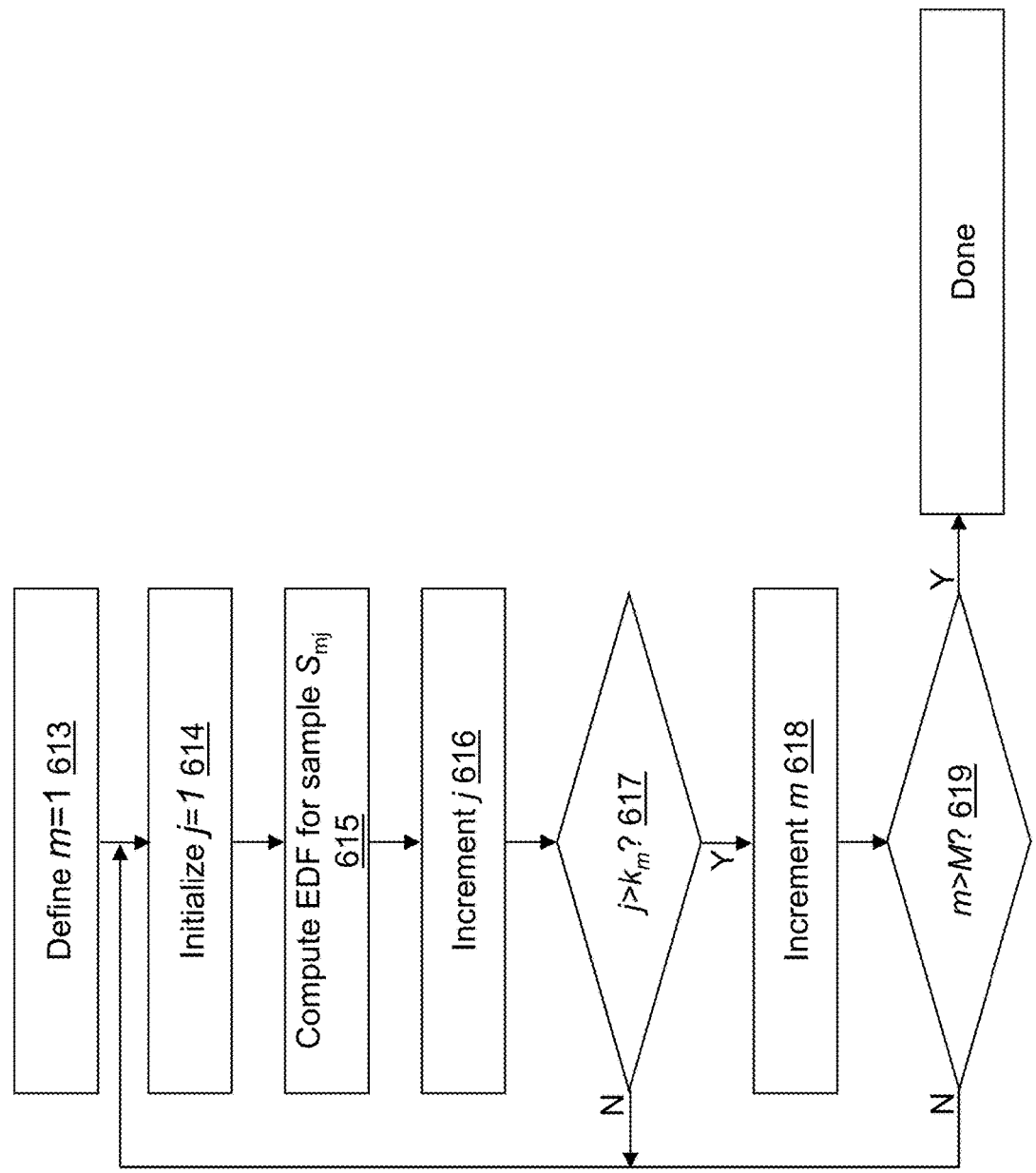

Referring to FIG. 6B, in an operation 613, an index m is defined, for example, using m=1.

In an operation 614, an index j is initialized, for example, using j=1.

In an operation 615, an EDF of $S_{mj}$, the $j^{th}$ sample of the $m^{th}$ marginal variable is computed. When sequential EDF estimation is selected for the $m^{th}$ marginal variable, the EDF of $S_{mj}$, the $j^{th}$ sample of the $m^{th}$ marginal variable, is computed by computing equal proportion bins for $S_{mj}$ such that processing continues in an operation 637 shown referring to FIG. 6C. When parallel EDF estimation is selected for the $m^{th}$ marginal variable, the EDF of $S_{mj}$ is computed by computing equal proportion bins for $S_{mj}$ such that processing continues in an operation 725 shown referring to FIG. 7A. When local sample sort is selected for the $m^{th}$ marginal variable, the EDF of $S_{mj}$ is computed by sorting the $j^{th}$ sample of the $m^{th}$ marginal variable if not already sorted.

In an operation 616, the index j is incremented, for example, using j=j+1.

In an operation 617, a determination is made concerning whether $j>k_m$. When $j>k_m$, processing continues in an operation 618. When $j\leq k_m$, processing continues in operation 614.

In operation 618, the index m is incremented, for example, using m=m+1.

In an operation 619, a determination is made concerning whether there is another marginal variable to process, for example, by comparing the third index to the number of marginal variables M. When m>M, processing is done and control returns to operation 605 shown referring to FIG. 6A. When m≤M, processing continues in operation 614.

For example, let $Q_m$ denote a quantile function of an $m^{th}$ marginal variable, which is an inverse of the CDF and is not typically available in closed-form. If $p_{im}$ denotes a probability of the $m^{th}$ marginal variable in an $i^{th}$ observation of joint probabilities data 314 as illustrated in Table I above, the quantile functions are used to transform the joint probabilities data to a table that contains the values that you expect to observe for each of the marginals as illustrated in Table II below.

TABLE II

| Marginal variable 1 | Marginal variable 2 | ... | Marginal variable M |
|---|---|---|---|
| $Q_1(0.3)$ | $Q_2(0.6)$ | ... | $Q_M(0.2)$ |
| $Q_1(0.5)$ | $Q_2(0.25)$ | ... | $Q_M(0.7)$ |
| ... | ... | ... | ... |
| $Q_1(0.75)$ | $Q_2(0.5)$ | ... | $Q_M(0.6)$ |
| $Q_1(0.2)$ | $Q_2(0.9)$ | ... | $Q_M(0.3)$ |

The aggregate measure sample T as illustrated below in Table III is computed from each row of Table II, where AF denotes an aggregation function that combines the individual measures into the desired aggregate measure. If $v_m$ denotes the value of an individual measure, then one simple example of an aggregation function is $$AF(v_1, v_2, \ldots, v_M) = \sum_{m=1}^{M} v_m.$$

Another simple example is $AF(v_1, v_2, \ldots, v_M)=\min(\{v_m | m=1, \ldots, M\})$. However, AF can in general be as complex as the application demands.

TABLE III

| Aggregate Measure |
|---|
| $AF(Q_1(p_{11}), Q_2(p_{12}), \ldots, Q_M(p_{1M}))$ |
| $AF(Q_2(p_{21}), Q_2(p_{22}), \ldots, Q_M(p_{2M}))$ |
| ... |
| $AF(Q_N(p_{N1}), Q_2(p_{N2}), \ldots, Q_M(p_{NM}))$ |

A size of joint probabilities data 314, N, is typically very large. As Table II indicates, a large value of N implies that the quantile function of each marginal needs to be evaluated for a large number of probabilities. In particular, N*M quantiles need to be computed across all marginal variables to generate the aggregate measure sample T. Typically, the quantile functions $Q_m$ are not available in closed-form, but multiple large empirical samples, $S_{mk}(k=1, \ldots, k_m)$, are available for each marginal variable m in sample data subset 416, where $k_m$ is the total number of samples that are available for marginal variable m. Each $Q_m(p_{im})$ is estimated as the $P^{th}$ percentile that is computed by using the EDF estimate of one of the available empirical samples, $S_{mk}$, for the $m^{th}$ marginal variable, where $P=100*p_{im}$. The sample $S_{mk}$ is a sample of the $m^{th}$ marginal variables in one of the sample combinations that is assigned to the worker that performs the percentile computation. To compute this percentile, if the EDF estimation method for the $m^{th}$ marginal variable is local-sort, the chosen sample $S_{mk}$ resides locally on worker device 400 that performs the percentile computation. If the EDF estimation method for the $m^{th}$ marginal variable is sequential EDF estimation or parallel EDF estimation, then the EDF estimate of the chosen sample $S_{mk}$ is either available locally or sent to the worker from the manager or worker device that holds the EDF estimate of $S_{mk}$.

Figure 8:
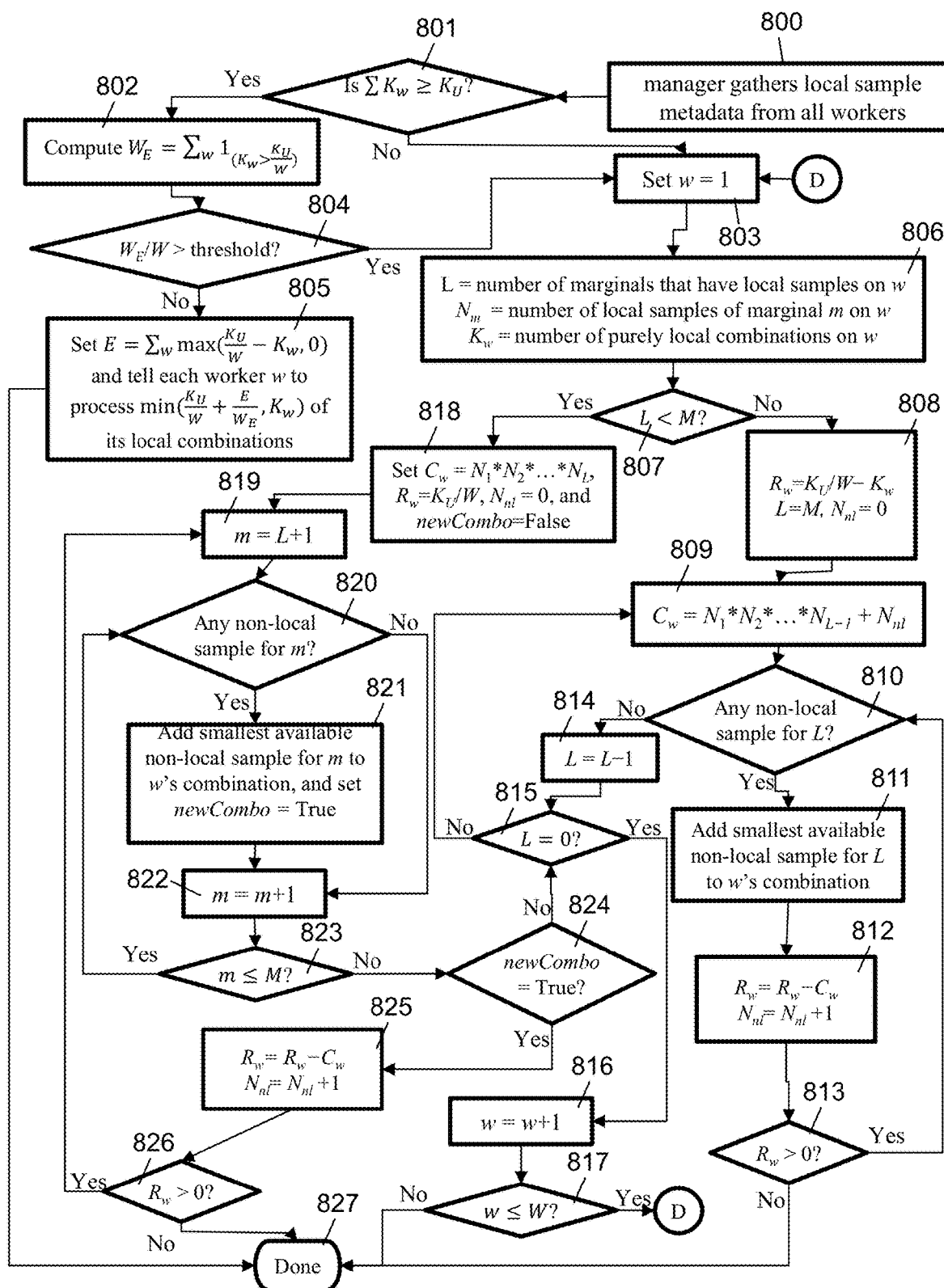
FIG. 8 depicts a flow diagram illustrating examples of operations performed by the manager device of FIG. 3 in assigning sample combinations to worker devices in accordance with an illustrative embodiment.

As already indicated, to enumerate and assign the sample combinations, processing continues in operation 800 of FIG. 8. Referring to FIG. 8, example operations performed by manager device 104 in assigning sample combinations to worker devices are described in accordance with an illustrative embodiment. Additional, fewer, or different operations may be performed depending on the embodiment. The order of presentation of the operations of FIG. 8 is not intended to be limiting.

There are $K=k_1*k_2* \ldots *k_M$ number of possible combinations of marginal samples, where $k_m(m=1, \ldots, M)$ is a number of samples included for the $m^{th}$ marginal variable in sample data 416, and $S_k=\{S_{1k}, S_{2k}, \ldots, S_{Mk}\}$, $k=1, \ldots, K$ denotes a $k^{th}$ combination of samples into which sample data 416 is organized if not already stored in this manner. Depending on the values of $k_m$, K can be very large, so manager device 104 imposes a user-specified or a default limit on K, for example, that may be referred to as $K_U$. The process of forming $K_U$ combinations starts by first forming combinations of all locally available samples on all of the worker nodes. Such combinations may be referred to as purely local combinations because they do not require any network data movement for accessing the required EDF estimates of samples in these combinations. For example, if there are 3 marginal variables and a worker node stores 5, 2, and 3 full samples of marginals 1, 2, and 3, respectively, that worker can process at most 30 purely local combinations without requiring any network data movement. Let $K_w$ denote a number of purely local combinations on worker w. Note that if a worker has no full samples even for one marginal, $K_w=0$. Also note that a distributed sample, whose EDF estimate is computed by using the parallel EDF estimation method and is available on the controller node, is considered a non-local sample and cannot be part of any purely local combination. For balancing the load of processing combinations across worker nodes, each worker node should process approximately $$\frac{K_U}{N_W}$$

combinations including purely local combinations and combinations that contain non-local samples.

In operation 800, manager device 104 gathers local sample metadata from the worker nodes of worker system 106.

In an operation 801, a determination is made concerning whether $\Sigma K_w \geq K_U$. When $\Sigma K_w \geq K_U$, processing continues in an operation 802. When $\Sigma K_w < K_U$, processing continues in an operation 803.

In operation 802, $$W_E = \Sigma_W 1_{\left(K_w > \frac{K_U}{W}\right)}$$

is computed, where $1_C$ denotes a function that equals one if the condition C is true and zero otherwise, and processing continues in operation 804. If the sum of all purely local combinations across all workers is more than $K_U$, there is no need to form combinations with non-local samples. If $$K_w < \frac{K_U}{N_W}$$

for some worker node w, worker node w processes all of its local combinations and worker nodes that have more than $$\frac{K_U}{N_W}$$

combinations are requested to process some of the $$\frac{K_U}{N_W} - K_w$$

excess combinations that they have, thereby picking up the slack left by worker node w. $W_E$ is the number of worker nodes that have excess number of combinations than $$\frac{K_U}{N_W} \left(\text{i.e., } K_w > \frac{K_U}{N_W}\right).$$

In operation 803, w=1, and processing continues in operation 806.

When the distribution of $K_w$ among worker nodes is not too far from a uniform distribution, this process provides satisfactory load balance and performance, especially considering that the cost of sample data movement across the network is avoided. One simple way, but certainly not the only way, to judge whether the distribution of $K_w$ is far from the uniform distribution is to compare the value of $W_E$ to the total number of workers $N_w$. If $$\frac{W_E}{N_W}$$

exceeds some threshold T, which may be specified by the user as a control value, the distribution of $K_w$ is deemed to be too unbalanced and some worker nodes are assigned combinations that contain some non-local samples. In operation 804, a determination is made concerning whether $$\frac{W_E}{N_W} > T.$$

When $$\frac{W_E}{N_W} > T,$$

processing continues in operation 803. When $$\frac{W_E}{N_W} \leq T,$$

processing continues in an operation 805.

In operation 805, a total slack value E is computed as $$E = \Sigma_w \max\left(\frac{K_U}{N_W} - K_w, 0\right),$$

and each worker is requested to process $$\min\left(\frac{K_U}{N_W} + \frac{E}{W_E}, K_w\right)$$

of its purely local combinations, and processing continues in an operation 827.

If $\Sigma K_w < K_U$ or if $$\frac{W_E}{N_W} > T,$$

manager device 104 assigns some workers combinations that contain local samples of some marginals and non-local samples of the remaining marginals. Preference is given to combinations that contain as many local samples as possible. Further, each non-local sample is ranked by the size of its EDF estimate, and smaller non-local samples are preferred over larger non-local samples. The motivation behind these two preferences is to minimize the cost of data movement that is required for communicating the EDF estimate of a non-local sample to the worker that processes the combination. Manager device 104 orchestrates the creation of such combinations for each worker, by first gathering the sizes of the EDF estimates of all samples of all marginals in operation 800. Manager device 104 already knows the EDF estimate sizes for samples that are distributed and processed using the parallel EDF estimation method. For other samples, manager device 104 contacts each worker to obtain the EDF estimate size of all of its samples and stores it along with the identity of that worker. Manager device 104 ranks all the samples of each marginal in ascending order of their EDF estimate sizes and systematically enumerates the combinations for each worker w (starting from the first worker) until at least $$\frac{K_U}{N_W}$$

combinations are assigned to it.

In operation 806, L, the number of marginals for which the worker w stores local samples, and $N_m$, the number of local samples of the marginal variable m for which the worker w stores local samples, are computed.

In an operation 807, a determination is made concerning whether L<M. When L<M, processing continues in an operation 818. When L>M, processing continues in an operation 808. When L=M, $K_w$ denotes a total number of purely local combinations sent by the worker w when it sends the information about its local samples to manager device 104. When $$L = M \text{ and } K_W \geq \frac{K_U}{N_W},$$

processing for worker w continues in operation 827 because worker w does not need to process any combinations that involve non-local samples.

When L<M, the next smallest non-local sample for each of the remaining M−L marginals (non-local in the context of worker w means a sample whose EDF estimate resides either on manager device 104 or on a worker node other than worker w) is assigned. When L<M, $K_w$=0.

In operation 808, $$R_w = \frac{K_U}{N_W} - K_W,$$

L=M, and $N_{nl}$=0 are initialized.

In an operation 809, $C_w = N_1 * N_2 * \ldots * N_{L-1} + N_{nl}$ is computed, where $C_w$ is a number of combinations of local samples of L marginals, and $N_{nl}$ denotes the number of combinations for non-local samples of marginals L+1 through M that have been assigned to worker w. L can be equal to zero, in which case $C_w$=0.

In an operation 810, a determination is made concerning whether there are any non-local samples for L. When there are non-local samples for L, processing continues in an operation 811. When there are not any non-local samples for L, processing continues in an operation 814.

In operation 811, the next smallest non-local sample is added for L to worker node w's combinations.

When L>0, $C_w$ combinations can be formed for each combination of non-local samples of M−L marginals, so decrement $R_w$ by $C_w$, because $R_w$ keeps track of the number combinations that still remain to be generated for worker w. When L=0, then because $C_w$=0, $R_w$ is decremented by one. In an operation 812, $R_w = R_w - C_w$ and $N_{nl} = N_{nl} + 1$ are computed.

When $R_w$>0, the next smallest non-local sample for each of the remaining M−L marginals are assigned and the process is repeated until $R_w$<0. If $R_w$ remains nonzero even after exhausting all possible combinations of non-local samples of the M−L marginals, then when L=0, processing for worker w is done. Otherwise, if L>0, set $C_w = N_1 * N_2 * \ldots * N_{L-1} + N_{nl}$ and keep assigning the smallest non-local sample for the Lth marginal, incrementing $N_{nl}$ by one, and decrementing $R_w$ by $C_w$ until $R_w \leq 0$. If $R_w$ still remains nonzero, decrement L by one, set $C_w = N_1 * N_2 * \ldots * N_{L-1} + N_{nl}$, and repeat the process of assigning smallest non-local sample for the (new) Lth marginal.

In an operation 813, a determination is made concerning whether $R_w$>0. When $R_w$>0, processing continues in operation 810. When $R_w \leq 0$, processing continues in operation 827 because worker node has received at least $$\frac{K_U}{N_W}$$

combinations.

In operation 814, L=L−1 is computed.

In an operation 815, a determination is made concerning whether L=0. When L=0, processing continues in operation 809. When L≠0, processing continues in an operation 816.

In operation 816, worker index w=w+1 is computed.

In an operation 817, a determination is made concerning whether w≤$N_W$. When w≤$N_W$, processing continues in operation 803. When w>$N_W$, combinations have been assigned to all workers, and processing continues in operation 827.

In operation 818, $$R_w = \frac{K_U}{N_W},$$

$C_w = N_1 * N_2 * \ldots * N_L$, newCombo=false, and $N_{nl}$=0 are initialized.

In an operation 819, m=L+1 is computed.

In an operation 820, a determination is made concerning whether there are any non-local samples for marginal m. When there are non-local samples for marginal m, processing continues in an operation 821. When there are not any non-local samples for marginal m, processing continues in an operation 822.

In operation 821, the next smallest available non-local sample for marginal m is added to worker node w's combinations and newCombo=true is set.

In operation 822, m=m+1 is computed.

In an operation 823, a determination is made concerning whether m≤M. When m≤M, processing continues in operation 820. When m>M, processing continues in operation 824.

In operation 824, a determination is made concerning whether newCombo=true. When newCombo=true, processing continues in operation 825. When newCombo=false, processing continues in operation 815.

In operation 825, because total $C_w$ combinations are possible for the recently added marginal, the number of remaining combinations is decreased by $C_w$ as $R_w=R_w-C_w$, and the number of non-local combinations is increased by 1 as $N_{nl}=N_{nl}+1$.

In an operation 826, a determination is made concerning whether $R_w>0$. When $R_w>0$, processing continues in operation 819. When $R_w \leq 0$, processing continues in operation 827 because worker node has received at least $$\frac{K_U}{N_W}$$

combinations.

In operation 827, the processing of enumerating and assigning the sample combinations is compete and control returns to operation 606 shown referring to FIG. 6A.

Figure 10A:
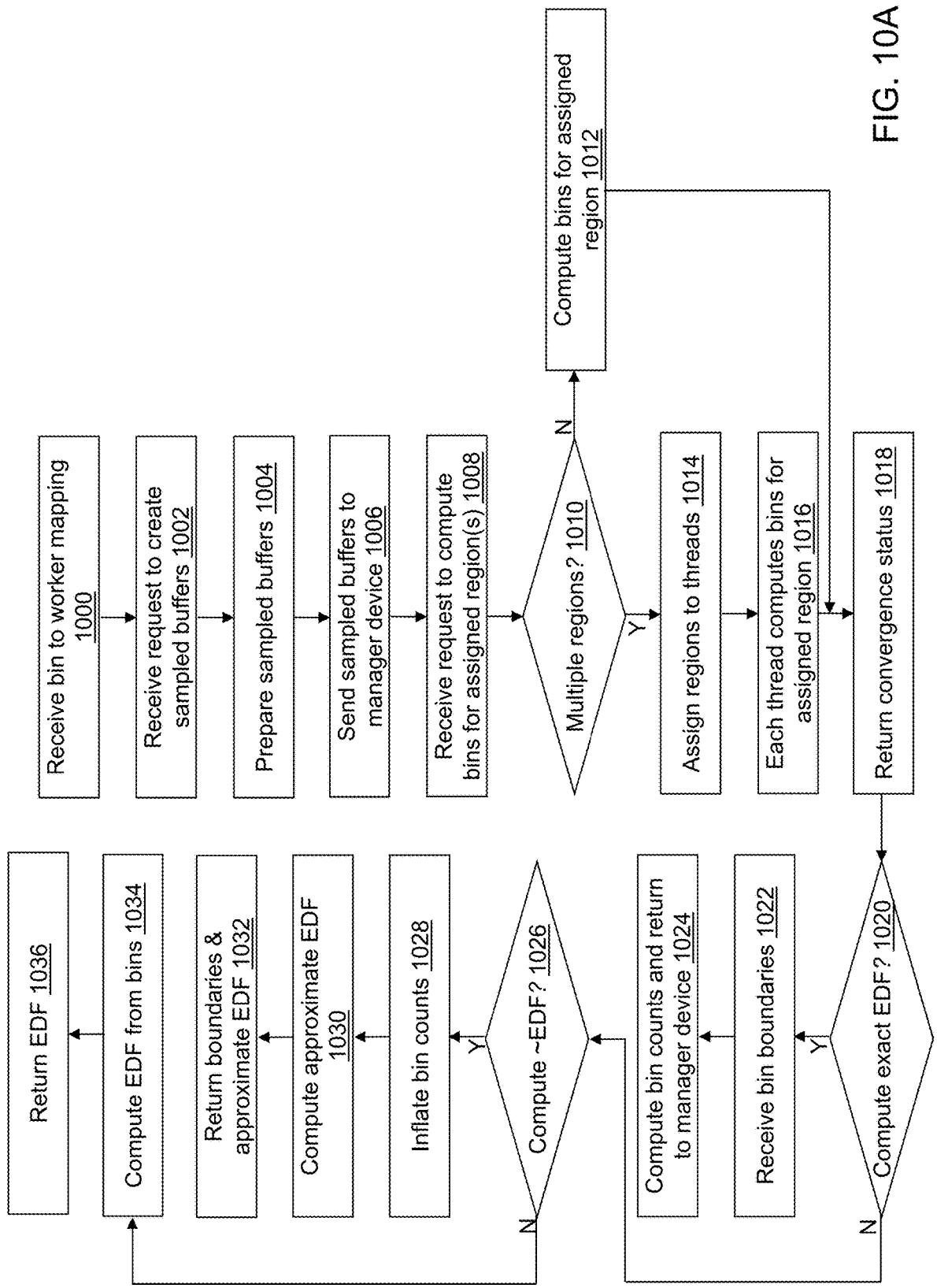
FIG. 10A depicts a flow diagram illustrating examples of additional operations performed by the worker device of FIG. 4 in performing equal proportion binning in accordance with an illustrative embodiment.
Figure 10B:
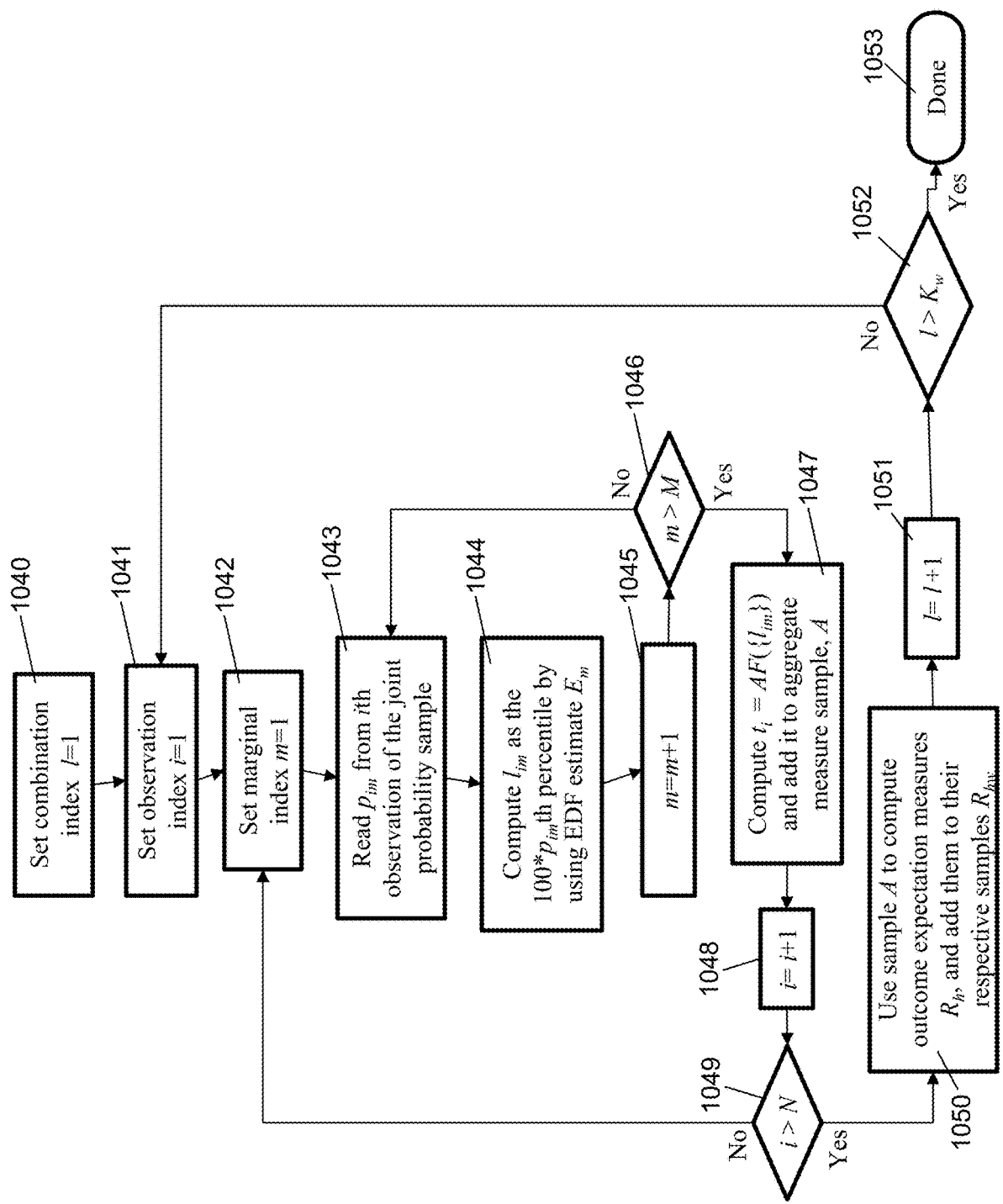
FIG. 10B depicts a flow diagram illustrating examples of additional operations performed by the worker device of FIG. 4 in computing outcome expectation measure values in accordance with an illustrative embodiment.

The outcome expectation measure computations continue in an operation 1040 of FIG. 10B where $\{E_1, E_2, \ldots, E_M\}$ denotes the set of EDF estimates for M marginals in the current combination. Referring to FIG. 10B, example operations performed by each worker device 400 in processing the assigned combinations are described in accordance with an illustrative embodiment. Additional, fewer, or different operations may be performed depending on the embodiment. The order of presentation of the operations of FIG. 10B is not intended to be limiting.

In operation 1040, an index l is defined as an indicator of the next combination to process, for example, using l=1.

In an operation 1041, an index i is defined as an indicator of the next observation to process from the joint probabilities data, for example, using i=1.

In an operation 1042, an index m is defined as an indicator of the next marginal to process in the currently selected combination, for example, using m=1.

In an operation 1043, an $i^{th}$ observation is read from joint probabilities data 414 to define $J_i=\{p_{i1}, p_{i2}, \ldots, p_{iM}\}$.

In an operation 1044, $l_{im}$ is computed as the $P=100*p_{im}$ percentile from the EDF estimate $E_m$, where $l_{im}$ approximates the quantile function $Q_m(p_{im})$.

In an operation 1045, the index m is incremented, for example, using m=m+1.

In an operation 1046, a determination is made concerning whether there is another marginal variable to process, for example, by comparing the index m to the number of marginal variables M. When m>M, processing continues in an operation 1047. When m≤M, processing continues in operation 1043.

In operation 1047, the aggregate measure value $t_i$ for the $i^{th}$ observation is computed using $t_i=AF(\{l_{im}\})$, where AF is the aggregation function, and $t_i$ is added to an aggregate measure sample A, for example, using $T(i)=t_i$. The aggregate measure sample A may be stored in output data subset 418.

In an operation 1048, the index i is incremented, for example, using i=i+1.

In an operation 1049, a determination is made concerning whether there is another observation to process, for example, by comparing the index i to the number of observations N. When i>N, processing continues in an operation 1050. When i≤N, processing continues in operation 1042 to compute the aggregate measure value $t_i$ of a next observation indicated by the index m.

In operation 1050, sample A is used to compute each outcome expectation measure value $R_h$, h=1, ..., $N_r$ that is added to the worker's sample as $R_{hw}(l)$, where $N_r$ is the number of desired outcome expectation measures. For example, if an outcome expectation measure value $R_1$ of $R_h$, h=1, ..., $N_r$ is defined as a value-at-outcome expectation (VaR) at a 95% level (VaR95), a VaR95 value is estimated at a 95th percentile of the sorted aggregate measure sample A and stored as $R_1$. For example, if an outcome expectation measure value $R_2$ of $R_h$, h=1, ..., $N_r$ is defined as a tail value-at-outcome expectation (TVaR) at a 97.5th percentile (TVaR97.5), a VaR at a 97.5% level (VaR97.5) is estimated at the 97.5th percentile of the sorted aggregate measure sample T and an average of the values that belong to the set $\{T_i|T_i>VaR97.5\}$ is computed and stored as $R_2$.

In an operation 1051, the index l is incremented, for example, using l=l+1.

In an operation 1052, a determination is made concerning whether $l>K_w$. When $l>K_w$, processing continues in an operation 1053. When $l \leq K_w$, processing continues in operation 1041.

In operation 1053, computation of the outcome expectation measure values is complete, and control returns to operation 609.

The sequential EDF estimation processing method includes two stages where the first stage estimates region start values $R_K=F_n^{-1}(P_k)$ for the K regions. The first stage uses an equal proportion binning algorithm to bin the values into $B_0$ bins.

Figure 6C:
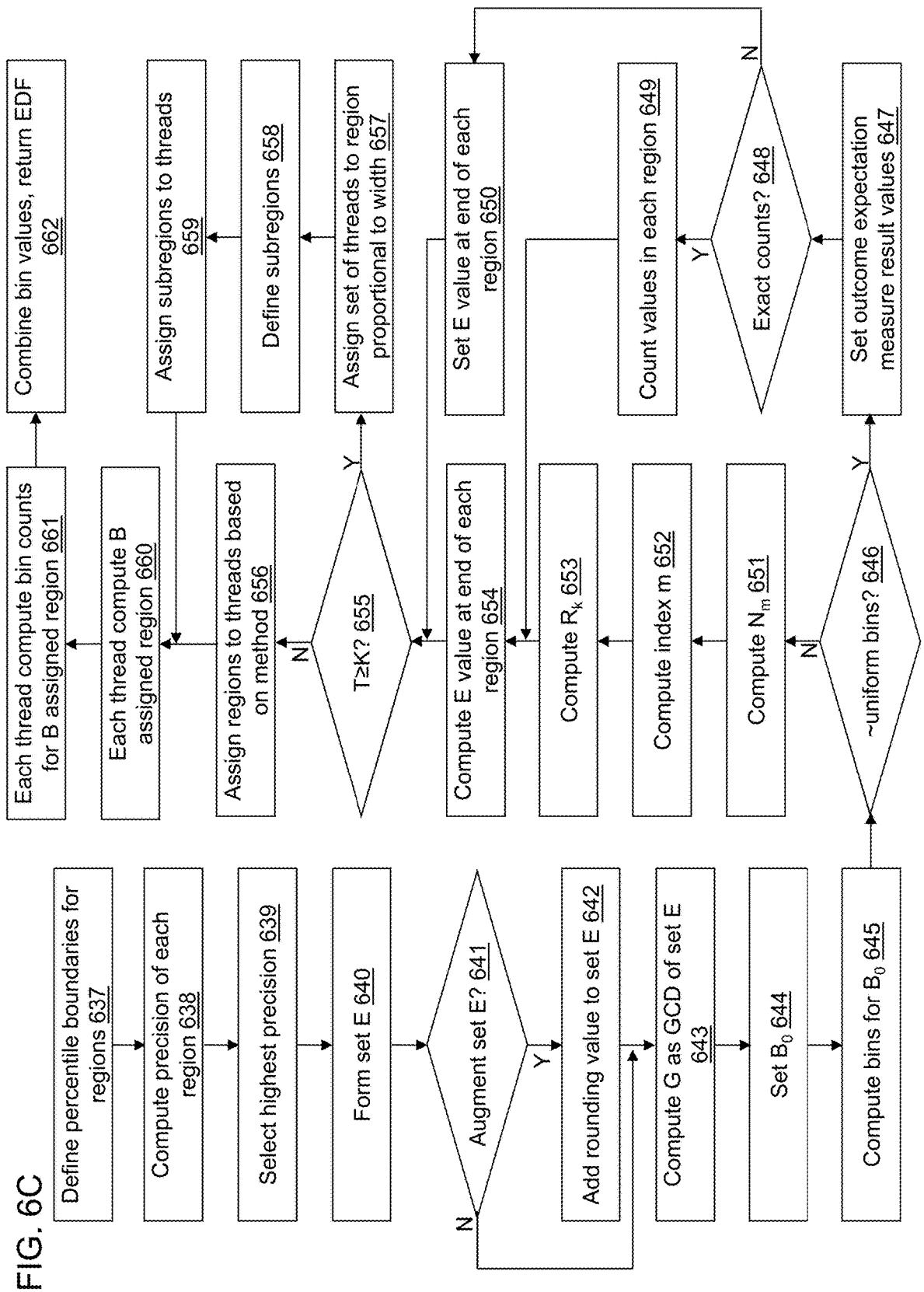
Figure 11:
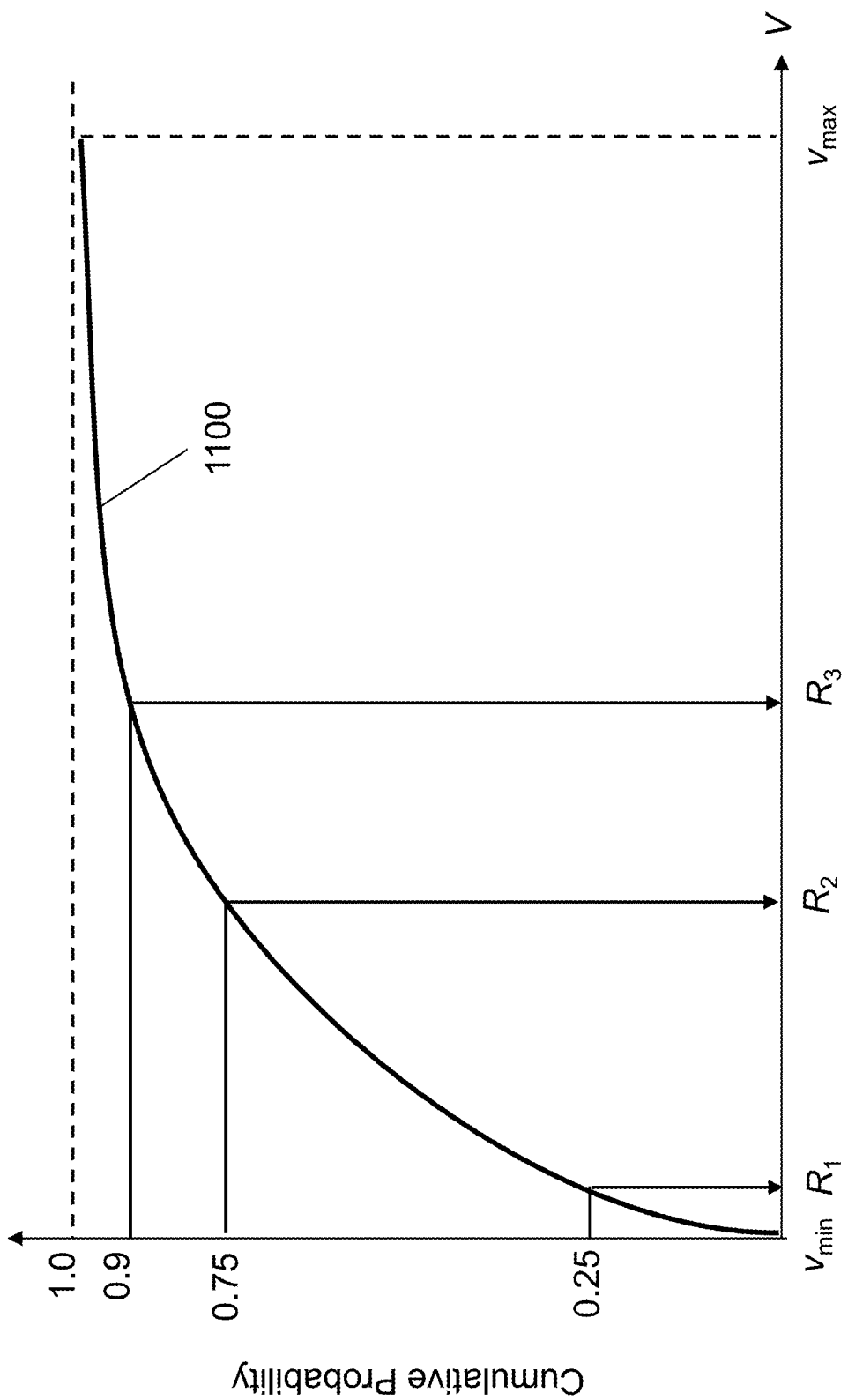
FIG. 11 shows a cumulative probability curve in accordance with an illustrative embodiment.

Referring to FIG. 6C, sequential EDF estimation is shown. In operation 637, percentile boundaries for a plurality of regions defined based on the region boundary CDF values may be defined. For example, referring to FIG. 11, a cumulative probability curve 1100 as a function of values of a random variable V is shown in accordance with an illustrative embodiment. The cumulative probability curve 1100 denotes F a true cumulative distribution function (CDF) of the random variable V and its inverse, $F^{-1}$, is a quantile function. The CDF function F is not known. Let $F_n(v)$ denote the EDF estimate at a value v. The function $F_n$ is essentially the nonparametric estimate of F. If $R_k$ denotes the end of the kth region, then $R_k=F_n^{-1}(P_k)$, where $F_n^{-1}$ denotes the inverse of the EDF, which is also the $100*P_k$th percentile. Because $F_n$ is not known a priori, the region boundaries $R_k$ are estimated using binning, which forms the first stage of the two-stage binning algorithm. FIG. 11 assumes that user has specified three region boundary CDF values, 0.25, 0.75, and 0.9, to demarcate four regions. The ranges of values in the first, second, third, and fourth region are $[v_{min}, R_1]$, $(R_1, R_2]$, $(R_2, R_3]$, and $(R_3, V_{max}]$, where $R_1=F_n^{-1}(0.25)$, $R_2=F_n^{-1}(0.75)$, and $R_3=F_n^{-1}(0.9)$.

Operations 638 through 644 describe one possible method of computing $B_0$, the number of bins to be created in the first stage. They embody the idea that the first-stage bins should be granular enough to capture the precision in the $P_k$ values, so that the $R_k$ values are reasonably good estimates of $F_n^{-1}(P_k)$, but not too granular to make $B_0$ too large, which will make the first-stage unnecessarily expensive. In an operation 638, a precision dk, the number of significant digits after the decimal point, for each region is computed. For example, for each value $P_k$, the precision dk is computed as a smallest value such that $abs(round(P_k*10^{dk})<P_k*10^{dk})<\varepsilon$, where $\varepsilon$ is a machine precision constant that is typically less than 1.0E−10 for modern computers. The value of $\varepsilon$ may be one of the control values. The abs(x) function returns the absolute value of x, and the round(x) function returns the integer that is nearest to x.

In an operation 639, a highest precision d is selected from the precision computed for each region. The highest precision d is selected as a largest of the dk region precision values. Typically, the value of d is small, such as 1, 2, or 3, because $P_k$ is not expected to be specified to have a very high precision.

In an operation 640, a set E of values $\{10^{d}*\min(P_k, 1-P_k)\}$ is formed.

In an operation 641, a determination is made concerning whether to augment set E. When set E is augmented, processing continues in an operation 642. When set E is not augmented, processing continues in an operation 643.

In operation 642, a rounding value $\text{round}(10^d/T)$ is added to each entry of set E where T is a number of threads that may be one of the control values or may be defined based on a number of processors of the device that is processing the sequential EDF estimation.

In operation 643, G is computed as a greatest common divisor (GCD) of set E. As discussed further below, if the number of threads, T, is greater than a number of regions, a method of assigning regions to threads in a second stage requires the GCD to be computed on the augmented set $E=\{\text{round}(10^d/T), 10^{d}*\min(P_k, 1-P_k)\}$.

In an operation 644, $B_0$ is set using $B_0=\text{round}(10^d/G)$. The proportion of each bin is $c=1/B_0$. Assuming an equal proportion binning process converges to an almost uniform distribution, the EDF values at the end of the final region boundaries are multiples of $1/B_0$. However, because $10^d$ might not be an exact multiple of G, the EDF values at the region boundaries might be different than the set of $P_k$ values.

In an operation 645, $B_0$ bins are computed. For illustration, processing continues in an operation 663 shown referring to FIG. 6D.

In an operation 646, a determination is made concerning whether the computed bins are uniform. When the computed bins are uniform, processing continues in an operation 647. When the computed bins are not uniform, processing continues in an operation 651.

Consider a few examples to illustrate the computation of $B_0$:

For the set of $P_k$ values $\{0.2, 0.5, 0.9, 0.95\}$, d=2. G is the GCD of $\{20, 50, 10, 5\}$, which is 5, so $B_0=\text{round}(100/5)=20$. Because G is an exact multiple of $10^d$, the EDF estimates for region boundaries will be the same as the $P_k$ values assuming the equal proportion binning algorithm converges to an almost uniform distribution.

For the set of $P_k$ values $\{0.3, 0.7, 0.85\}$, d=2. G is the GCD of $\{30, 30, 15\}$, which is 15, so $B_0=\text{round}(100/15)=7$. Because G is not an exact multiple of $10^d$, the EDF estimates for region boundaries will be multiples of $c=1/7$, which are approximately $\{0.286, 0.714, 0.857\}$ assuming the equal proportion binning algorithm converges to an almost uniform distribution.

For the set of $P_k$ values $\{0.2, 0.8\}$, d=1 and G is the GCD of $\{2, 2\}$, which is 2, so $B_0=\text{round}(10/2)=5$.

For the set of $P_k$ values $\{0.75\}$, d=2 and G is the GCD of $\{25\}$, which is 25, so $B_0=\text{round}(100/25)=4$.

After the sequential equal proportion binning processes finishes, let the $B_0$ bin boundaries that it finds be denoted by $\{b_{0,1}, b_{0,2}, b_{0,B0}\}$. These are used to estimate the region boundaries $R_k$ as follows:

If the binning algorithm is successful in achieving an almost uniform distribution of counts, then the EDF estimate at the start of the mth bin is approximately $m/B_0=m*c$. For the kth region, find m such that $P_k$ is closest to $m*c$ and set $R_k=b_{0,m}$, boundary of the mth bin.

If the binning algorithm fails to achieve a uniform distribution of counts for some reason, the actual cumulative counts in the bins are used to estimate the values of $R_k$. The EDF estimate at the start of the mth bin is $N_{m-1}/N$, where $N_{m-1}$ is the sum of counts in the previous m−1 bins. So, one way to estimate $R_k$ for the kth region is to find the mth bin such that $P_k$ is closest to $N_{m-1}/N$ and set $R_k=b_{0,m}$. Another way to estimate $R_k$ is to find a value of m such that $N_{m-1}<N*P_k<N$, and set $R_k=(b_{0,m}+b_{0,m+1})/2$. There are also other possible ways of combining $b_{0,m}$ and $b_{0,m+1}$ to compute $R_k$ when $N_{m-1}<N*P_k<N_m$ for some m.

After $R_k$ values are estimated, the first stage concludes by computing $E_k$, the EDF at the end of each kth region. If the equal proportion binning algorithm is successful in achieving an almost uniform distribution of counts, $E_k$ can be approximated by $m*c$ for the same value of m that is used for estimating $R_k$ for that region. If exact EDF estimate is needed at the end of each region or if the binning algorithm fails to achieve a uniform distribution, then the input sample is read to gather the exact count of values in each of the region by using the estimated $R_k$ values. If $N_k$ denotes the count in the kth region, then the EDF at the of kth region is computed as $E_k=(N_1+\ldots+N_k)/N$.

In operation 647, the outcome expectation measure result values are set.

In an operation 648, a determination is made concerning whether exact counts was selected. When exact counts was selected, processing continues in an operation 649. When exact counts was not selected, processing continues in an operation 650.

In operation 649, count values are computed for each region, and processing continues in operation 654.

In operation 650, a value $E_k$ is set at an end of each $k^{th}$ region as $E_k=m*c$, where m is the same value that is used to compute $R_k$, and processing continues in operation 655.

In operation 651, $N_m$ is computed as a sum of counts in the first m bins.

In an operation 652, an index m is computed for each k such that $N_{m-1}<N*P_k<N_m$.

In an operation 653, $R_k$ is computed as some combination of $b_{0,m}$ and $b_{0,m+1}$ (e.g. $R_k=(b_{0,m}+b_{0,m+1})/2$).

In operation 654, values are counted in each region, and a value $E_k$ is computed at an end of each region.

In operation 655, a determination is made concerning whether the number of threads T is greater than a number of regions K into which sample data 316 is organized. When T≥K, processing continues in an operation 657. When T<K, processing continues in an operation 656.

Operation 655 is a start of the second stage. The second stage further bins the values in each of the K regions to achieve the desired accuracy level for the EDF estimates in each region. Let $a_k$ denote the desired accuracy in the kth region. It means that the desired precision in the EDF values in that region is $a_k$. For example, if $a_k=0.001$, then the values for which the EDF estimates differ by 0.001 should be distinguishable, but it is OK if the values for which the EDF estimates differ by a value smaller than 0.001, say 0.0005, are not distinguishable. The value of $a_k$ is used in conjunction with the EDF values at the beginning and end of the kth region to compute the number of bins $B_k$ in the kth region as $B_k=(E_k-E_{k-1})/a_k$. The same equal proportion binning algorithm that is used in the first stage is then run in each region, but now the algorithm operates only on the values that fall in the region that is being analyzed and the desired fraction of values in each of the $B_k$ bins is $c_k=1/B_k=a_k/(E_k-E_{k-1})$, which is essentially a region-relative fraction or EDF accuracy.

Figure 12A:
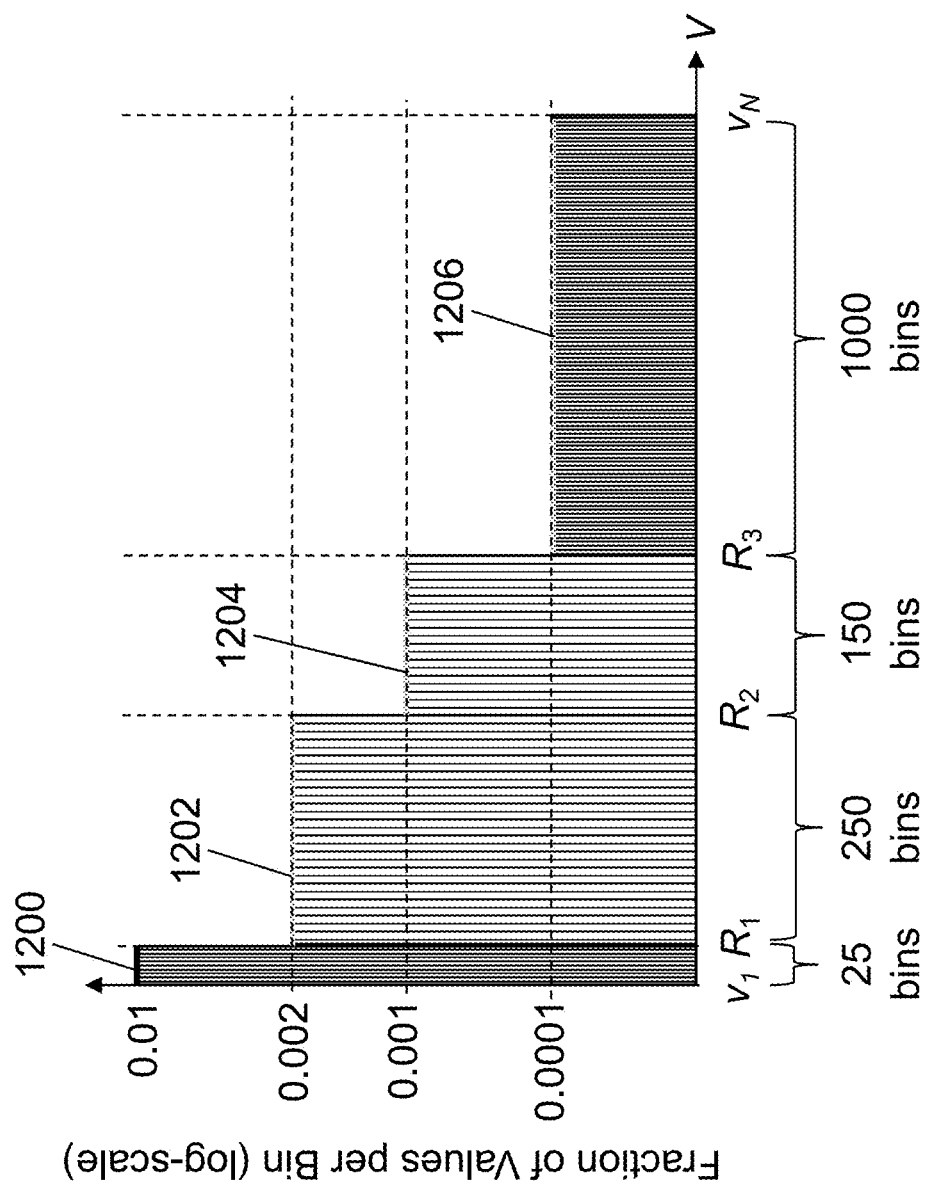
FIGS. 12A, 12B, and 12C shows equal proportion bins in accordance with an illustrative embodiment.

To illustrate, consider that the user has specified accuracy values of {0.01, 0.002, 0.001, 0.0001} for the four regions and the EDF values $E_k$ at the end of those four regions are {0.25, 0.75, 0.9, 1}. The EDF range for the first region is (0,0.25] and the desired EDF accuracy is 0.01, so the algorithm needs to create (0.25−0)/0.01=25 equal proportion bins in that region. The proportion of the values that fall in each of those 25 bins is $c_k$=1/25=0.04. Note that this proportion is relative to the region; the proportion of each bin relative to the full set of values is 0.04*0.25=0.01. For the second region, the desired EDF range is (0.25,0.75) and the desired EDF accuracy is 0.002, so the equal proportion binning algorithm needs to create (0.75−0.25)/0.002=250 bins, each with a region-relative proportion of 1/250=0.004. Similarly, the algorithm needs to create 150 bins in the third region. Finally, for the fourth region, the EDF range is (0.9,1] and the desired EDF accuracy is 0.0001, so the algorithm needs to create (1−0.9)/0.0001=1,000 equal proportion bins in the fourth region. FIG. 12A includes a first region 1200, a second region 1202, a third region 1204, and a fourth region 1206 with the selected accuracy values.

The second stage runs the equal proportion binning algorithm in each of the K regions. The set of values in each region are mutually exclusive from the values in the other regions, so the set of bin boundaries of one region is independent from those of the other regions. This observation allows the distributed system 100 to use multiple threads of execution to process the regions in parallel, thereby achieving a higher computational performance by reducing the total amount of time that is required to complete the second stage.

In operation 656, regions are assigned to threads in a round robin manner or a block manner possibly based on a user selection that may be included in the control values, and processing continues in an operation 660.

For illustration, using the round robin assignment manner, assign the regions sequentially to T threads and when thread count reaches T, go back to the first thread. For example, if there are 15 regions and 6 threads, then thread 1 processes regions 1, 7, and 13; thread 2 processes regions 2, 8, and 14; thread 3 processes regions 3, 9, and 15; thread 4 processes regions 4 and 10; thread 5 processes regions 5 and 11; and thread 6 processes regions 6 and 12.

For illustration, using the block assignment manner, assign the regions in blocks of size int(K/T), where int(x) function computes the integer portion of x and distribute any remainder regions among the first K−int(K/T)*T threads. For example, if there are 15 regions and 6 threads, then thread 1 processes regions 1, 2, and 3; thread 2 processes regions 4, 5, and 6; thread 3 processes regions 7, 8, and 9; thread 4 processes regions 10 and 11; thread 5 processes regions 12 and 13; and thread 6 processes regions 14 and 15.

One way to assign sample values of a region to a thread is to make a thread-local copy of the values that belong to the regions that are assigned to that thread. However, this means bringing the entire data in to memory. To avoid this, a thread that is processing the kth region reads the input sample one value at a time and processes that value only if it is in the $(R_{k-1}, R_k]$ interval. Multiple simultaneous read passes over the input sample data are used, but the memory saved by not storing anything in memory is proportional to the size of the input sample.

In operation 657, a set of threads is assigned to each region proportional to a width of each region. If the number of regions is smaller than the number of threads (K<T), then one option is to just assign the regions to K threads and let T-K threads remain idle. However, a better option is to divide K regions into at least T subregions and then assign those subregions to threads by using the round robin or block scheme.

In an operation 658, because the number of regions is smaller than the number of threads (K<T), subregions are defined for one or more of the regions such that those subregions can subsequently be assigned to threads. An alternative way to handle the case would be to just assign the K regions to K threads and let (T-K) threads remain idle, but that would not take advantage of the available computational resources, so two alternative methods of defining subregions and assigning them to threads are proposed. In the first method, the number of bins that the first stage creates is modified by adding 1/T, rounded to d digits after the decimal point, to the list of user-specified region boundary CDFs, and the number of bins, $B_0$, is computed by using the GCD of the augmented set. d is computed as before using the user-specified set $\{P_k\}$, not by using the augmented set. The addition of 1/T to the augmented set for computing $B_0$ ensures that there will be at least T equal proportion bins after the first stage so that some work can be assigned to each of the T threads. Each bin that is computed in this manner essentially defines one subregion.

The accuracy level to use for a subregion is decided by the user-specified region that the subregion belongs to. Next, subregions need to be assigned to threads. Although there are different possibilities, an illustrative method includes first assigning each region number of threads that is proportional to the width of that region (along the EDF dimension) and second assigning the subregions within a region as equitably as possible among the threads that are assigned to that region. This ensures that one thread processes subregions of only one region and hence, needs to run the sequential equal proportion binning process only once. At the end of the assignment process, each thread essentially gets assigned a distinct EDF range to process. This EDF range is translated to the range of values for that thread by using the same method for computing the region boundaries $R_k$ at the end of the first stage. Other subregion-to-thread assignment schemes would require some threads to handle subregions from more than one region, which would mean that those threads need to run the sequential equal proportion binning algorithm more than once, each time with different accuracy level. For illustration, consider that the user specifies 4 regions with region boundaries {0.25, 0.75, 0.9} and the computing device has T=32 threads. Add 1/32 to the set of region boundaries {0.03125, 0.25, 0.75, 0.9}. The maximum precision d can be determined in two ways: by excluding the 1/T term or by including it.

Excluding 1/T for the computation of d means using the set {0.25, 0.75, 0.9} to compute d, which leads to d=2. Now, add a rounded version of 1/T to the user-specified set leads to an augmented set of region boundaries: {0.03, 0.25, 0.75, 0.9}. Next, compute the GCD of {3, 25, 25, 10}, which is one, so set the number of first-stage bins, $B_0$, to $10^d/1$=100.

Including 1/T for the computation of d would lead to d=5 for this example, which would require computing the GCD of {3125, 25000, 25000, 10000}, which is 625. This would lead to $B_0$=160, which is larger than the value of $B_0$ obtained by excluding 1/T. So, not including 1/T in the computation of d is chosen for this example. Note that in general, for values of T that require small d even after including 1/T in the computation of d, values of $B_0$ can be smaller, so both inclusion and exclusion of 1/T can be tried and whichever leads to smaller value of $B_0$ can be chosen.

For $B_0$=100, the 100 equal proportion bins that the first stage computes essentially form 100 subregions, each with estimated proportion of 0.01 of values. Region 1 has EDF range of (0,0.25], so the first 25 subregions belong to region 1. Region 2 has EDF range of (0.25,0.75], so the next 50 subregions belong to region 2. Similarly, the next 15 subregions belong to Region 3 and the last 10 subregions belong to Region 4.

Now, for simplicity of illustration, assume the T=8, in which case inclusion of 1/T in the computation of d leads to smaller $B_0$=40. The 40 equal proportion bins that the first stage computes essentially form 40 subregions, each with estimated proportion of 0.025 of values. The first 10 subregions belong to Region 1, next 20 subregions belong to Region 2, next 6 subregions belong to Region 3, and the last 4 subregions belong to Region 4. The 8 threads need to be assigned to four regions. The widths of the four regions along the EDF dimension are {0.25, 0.5, 0.15, 0.1}. Dividing T into a set of four integer values in approximate proportions of {0.25, 0.5, 0.15, 0.1} leads to a set {2, 4, 1, 1}. Note that the division of T among regions must ensure that each region is assigned at least one thread.

Assign subregions of a region to threads of that region. For this example, the assignment happens as follows:

The 10 subregions of Region 1 are divided among the 2 threads as 5, 5. So, thread 1 processes the first 5 subregions, which have a EDF range of (0,0.125], which gets translated to a value range by using the boundaries of the first and the 13th bins (assuming the equal proportion binning algorithm of the first stage has converged to an almost uniform distribution of counts). The desired accuracy level for region 1 is 0.01, so thread 1 runs the equal proportion algorithm to compute (0.125−0)/0.01≈13 bin boundaries. Thread 2 processes the next 5 subregions with the EDF range of (0.125, 0.25], so it runs the equal proportion algorithm to compute (0.25−0.125)/0.01≈13 bin boundaries.

The 20 subregions of Region 2 are divided among next 4 threads. Threads 3, 4, 5, and 6 are each assigned 5 subregions in the EDF ranges (0.25,0.375], (0.375,0.5], (0.5, 0.625], and (0.625,0.75], respectively. Because the desired accuracy of region 2 is 0.002, threads 3, 4, 5, and 6 each run the equal proportion binning algorithm to compute 63 bin boundaries for their respective EDF ranges.

The 6 subregions of Region 3 are assigned to thread 7 with an EDF range of (0.75,0.9]. The desired accuracy level for region 3 is 0.001, so thread 7 runs the equal proportion binning algorithm to compute 150 bin boundaries.

Lastly, the 4 subregions of Region 4 are assigned to thread 8 with an EDF range of (0.9,1.0]. The desired accuracy level for region 3 is 0.0001, so thread 8 runs the equal proportion binning algorithm to compute 1000 bin boundaries.

In the second method of dividing the regions into subregions, regions are divided into subregions to not modify the computation of number of bins, $B_0$, for stage 1. First, assign each region the number of threads that is proportional to the widths of that region along the EDF dimension. If a region is assigned $T_k$ threads, form subregions by dividing the $(R_{k-1}, R_k)$ range of values into $T_k$ equal spaced, disjoint subranges and assign each subregion to one of the $T_k$ threads.

The main benefit of the first method is that the distribution of work among threads may be more equitable, but the cost is to make stage 1 do more work by trying to find a greater number of equal proportion bins. The benefit of the second method is that it does not increase the amount of work in stage 1. The cost of the second method is possibly an inequitable distribution of work among threads. A selection of the first method or the second method may be included as a user selection in the control values.

In an operation 659, subregions are assigned to threads.

In operation 660, each thread computes $B_k$, the number of bins for each region and/or subregion that is assigned to it. Each $B_k$ is computed as $B_k = E_r/a_k$, where $E_r$ denotes the EDF range of assigned regions or subregions and $a_k$ denotes the desired accuracy for the associated region.

In an operation 661, all threads run in parallel to compute the B equal proportion bins for each of their assigned region and/or subregion. When a plurality of regions or subregions is assigned to a thread, the plurality of regions or subregions the bins are computed successively by the thread. Operations 660 and 661 may be performed in succession by a thread before performing operation 660 for a next region or subregion.

After all threads finish running the equal proportion binning process for their assigned regions according to their respective accuracy, the set of bin boundaries in all the regions together form the final EDF estimate. For the bins in the kth region, the EDF estimates start at $E_{k-1}$ (note that $E_0$=0). The EDF at each bin boundary in the region is computed based on the result of the equal proportion binning algorithm as follows. If the algorithm converges to an almost uniform distribution, then the EDF increase by $a_k$ at each bin boundary, so the EDF estimate at the end of the ith bin in the kth region is $E_{k-1}+a_k*i$. If the algorithm does not converge to an almost uniform distribution, the counts in each final bin are used to compute the EDF estimate. Let $c_{i,k}$ denote the count in the ith bin and let $n_{i,k}=c_{1,k}+c_{2,k}+ \ldots +c_{i,k}$ denote the sum of the counts in bins 1 through i in the kth region. The count at the beginning of the kth region is $E_{k-1}*N$, because N is the total size of the sample. So, the EDF estimate at the end of the ith bin in the kth region is $(N*E_{k-1}+n_{i,k})/N$. If the equal proportion algorithm succeeds in all regions, the number of values that need to be stored to represent the EDF estimate is B, which is the sum of the number of bins $B_K$ in all the regions: B=81+82 $B_K$. It is important to note that the value of each $B_K$ depends only on the values of $P_k$ and $a_k$, so B is independent of N. Even when the equal proportion algorithm fails to achieve a uniform distribution of counts in all the regions, the final set of bin boundaries that it computes can still be used for computing the EDF estimate by using the counts in the individual bins. In that case, in addition to just the bin boundaries, the cumulative counts at the start of each bin also need to be stored, which doubles the required storage to 2*B. Comparing this to the naïve method of computing the EDF estimates that requires all N values to be stored, the memory saved by the proposed method can be significant when N is large. For the example illustrated in FIG. 12A, B=25+250+150+1,000=1,425. Even if the desired accuracy is increased ten-fold in all the regions by dividing all $a_k$ values by 10, the required storage is proportional to 14,250 instead of being proportional to N, which can typically be in millions.

In an operation 662, computation of the EDF as defined by sequential equal proportion bins is complete, and control returns to an operation 617 referring again to FIG. 6A. The bin boundaries from all regions and their average proportions together form the EDF estimate.

Figure 7A:
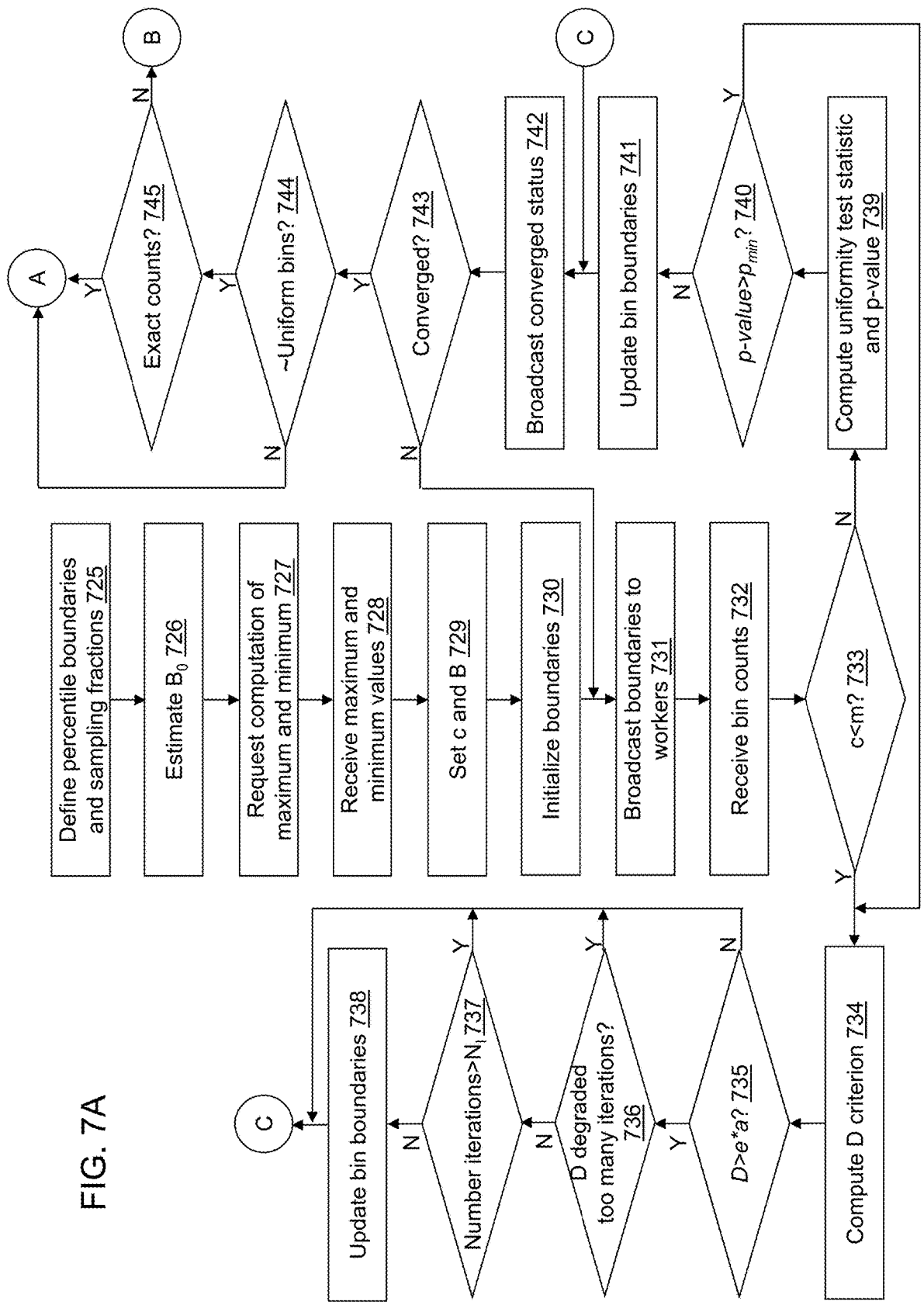
FIGS. 7A and 7B depict a flow diagram illustrating examples of operations performed by the manager device of FIG. 3 in computing a parallel empirical distribution function in accordance with an illustrative embodiment.

Referring to FIG. 7A, parallel EDF estimation is shown. After the region boundaries are found, the second stage of the proposed solution further bins the values in each of the regions into finer bins that are determined by the desired accuracy in each region. To speed up the second stage, the proposed solution assigns parts of each region to different nodes of the cluster, so that the nodes can run their respective binning algorithms in parallel. However, to achieve that parallelism, the data in parts of each region need to be moved to the nodes that are assigned to process that part. For regions that do not require high accuracy, the data can be sampled before it is moved to reduce the cost of data movement. The distributed system 100 allows the user to specify a sampling fraction, $s_k$, for each kth region. The sampling fractions are used not only in the second stage to sample the data in each region but also in the first stage to decide the binning granularity.

As long as the desired accuracy is not too high to cause each bin to have very few observations, B can be significantly smaller than N and the algorithm can achieve a good degree of data compression and thereby save on the memory that it needs in order to store the EDF estimate. If the distribution of counts is exactly uniform across all bins of the kth region, then the EDF estimate at the start of the bth bin in that region is simply $E_{k-1}+b/B$, where $E_k$ denotes the EDF estimate at the start of the kth region ($E_1=0$). However, if the distribution of counts is not exactly uniform, then the EDF estimate at the start of the bth bin is $E_{k-1}+(N_{b-1}/N)$, where $N_{b-1}$ is the sum of counts in the previous b−1 bins of the region. To compute a Pth percentile, a binary search is done to find the two bins whose EDF estimates are closest to P/100 and the boundaries of those bins are combined, for example by taking their average. The value of B, and thereby the amount of data compression, is determined by the desired accuracy of the EDF estimates.

In operation 725, region CDF boundaries $P_k$ and sampling fractions $s_k$ are specified by the user. The first stage needs to estimate the region end values $R_k=F_n^{-1}(P_k)$ for the K regions. One simple way to estimate $F_n^{-1}(p)$ would be to compute the 100*pth percentile from the full sample. However, that would require the entire sample S to be brought into the main memory of one computing device and sorted, thereby requiring large amount of data movement and large memory for large values of N, which is precisely what the proposed solution is trying to avoid. To avoid that, the first stage of the proposed solution uses an equal proportion binning algorithm, to be described later, to bin the values into $B_0$ bins, where $B_0$ is determined by the values of $P_k$ and the sampling fractions $s_k$ to allow for both accurate estimation of region boundaries, $R_k$, and equitable distribution of work in the second stage.

In an operation 726, the $B_0$ value is estimated. For each value $P_k$, compute the precision dk, the number of significant digits after the decimal point, as the smallest value of such that $abs(round(P_k*10^{dk})-P_k*10^{dk})<\varepsilon$, where $\varepsilon$ is some small number, such as the machine precision constant. Note that the abs(x) function returns the absolute value of x and the round(x) function returns the integer that is nearest to x. Set d to be the largest of all such dk values. Typically, the value of d is expected to be small, such as 1, 2, or 3, because $P_k$ is not expected to be specified to a very high precision.

One of the main goals of the first stage is to estimate values of $R_k$, which depend on the values of $P_k$. It would be ideal if each $P_k$ is a multiple of the fraction of observations in each bin for easy estimation of $R_k$. To achieve that, the GCD of the set of values $\{round(10^{d}*min(P_k, 1-P_k))\}$ is computed for all k=1, . . . , K−1. Note that d is the largest number of significant digits after the decimal point in any $P_k$ value that the first step computes. If G denotes the GCD of the set, then set $B_0=round(10^d/G)$ and the proportion of each bin is $c=1/B_0$. Assuming the parallel equal proportion binning converges to an almost uniform distribution, the EDF values at the end of final region boundaries are multiples of c. The number of bins in the kth region, $b_k$, is approximately $b_k=round(B_0*(P_k-P_{k-1}))$. Each region must contain at least one bin, so $b_k \geq 1$ for all k. In other words, $B_0*(P_k-P_{k-1}) \geq 1$, or equivalently, $B_0 \geq 1/(P_k-P_{k-1})$, for all k. Let $Q=\max\{(1/(P_k-P_{k-1})|k=1, \ldots, K\}$, where max{S} denotes the smallest value in the set S. To satisfy $b_k \geq 1$ for all k, the value of $B_0$ must satisfy the condition $B_0 \geq Q$. The proposed solution checks that condition and if $B_0<Q$, it multiplies $B_0$ by a factor $m_0=ceil(Q/B_0)$, where the function ceil(x) returns the smallest integer that is greater than or equal to x. So, in terms of G and Q, $B_0$ is computed as $B_0=round(10^d/G)*ceil(Q/round(10^d/G))$. Note that due to the conversion of floating point numbers to integers, each $P_k$ might not be an exact multiple of the proportion of each bin (1/$B_0$), which implies that the EDF values at the region boundaries might not be exactly equal to $P_k$ for some regions In an operation 727, a request to compute a maximum sample value, a minimum sample value, and a number of values $M_W$ in sample data subset 416 is sent to each worker device.

In an operation 728, the maximum sample value, the minimum sample value, and $M_W$ are received from each worker device.

In an operation 729, c and B are set.

In an operation 730, boundaries are initialized.

In an operation 731, the boundaries are sent to each worker device with a request to compute bin counts in parallel.

In an operation 732, the bin counts computed by each worker device are received.

In operation 733, a determination is made concerning whether c<m. When c<m, processing continues in an operation 734. When c≥m, processing continues in an operation 739.

In operation 734, a D criterion is computed.

In an operation 735, a determination is made concerning whether D>e*a. When D>e*a, processing continues in an operation 736. When D≤e*a, processing continues in operation 742.

In operation 736, a determination is made concerning whether D has degraded for too many iterations. When D has degraded for too many iterations, processing continues in operation 742. When D has not degraded for too many iterations $I_n$, processing continues in an operation 737.

In operation 737, a determination is made concerning whether there have been too many iterations of operation 731. When there have been too many iterations, processing continues in operation 742 to broadcast that the binning has converged. When there have not been too many iterations, processing continues in an operation 738.

Figure 6D:
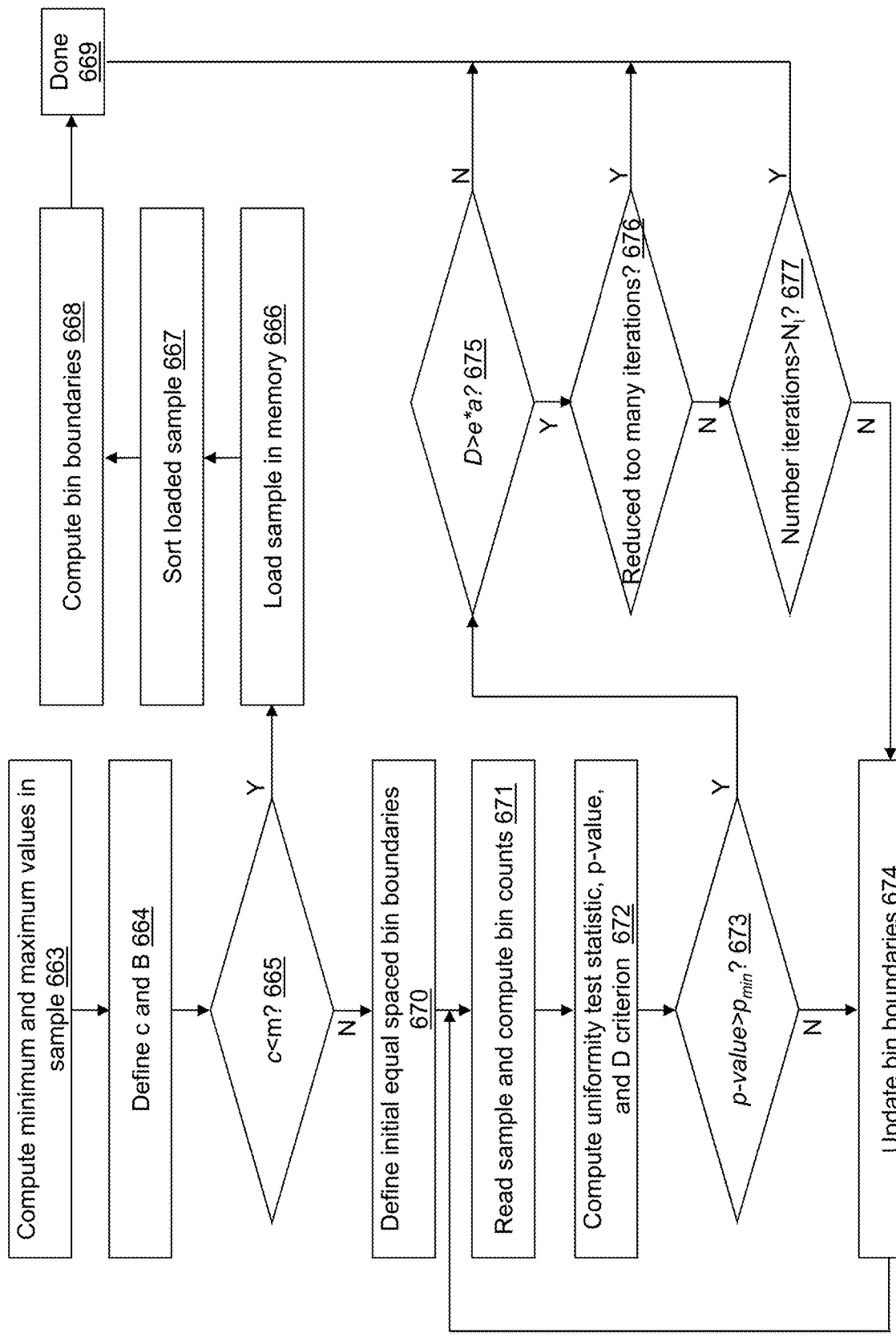
Figure 6E:
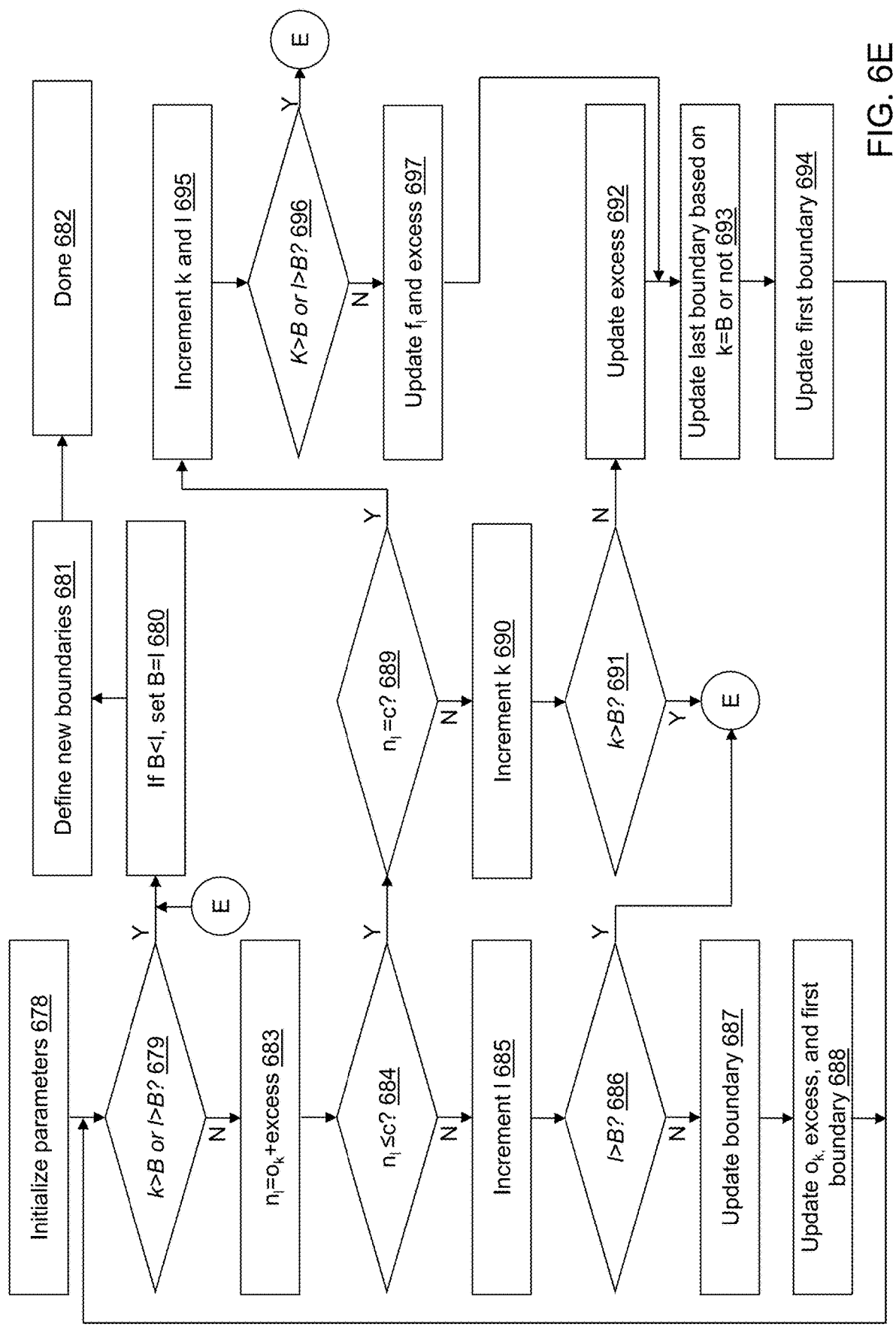

In operation 738, bin boundaries are updated, for example, the operations of FIG. 6E may be performed to update the bin boundaries, and processing continues in operation 742.

In operation 739, a uniformity test statistic and a p-value are computed.

In an operation 740, a determination is made concerning whether the p-value>$p_{min}$. When the p-value>$p_{min}$, processing continues in operation 734. When the p-value≤$p_{min}$, processing continues in an operation 741.

In operation 741, bin boundaries are updated, for example, the operations of FIG. 6E may be performed to update the bin boundaries.

In operation 742, a converged status is broadcast to each worked device.

In an operation 743, a determination is made concerning whether the converged status is converged. When the converged status is converged, processing continues in an operation 744. When the converged status is not converged, processing continues in operation 731 to broadcast the updated bin boundaries to each worker device.

In operation 744, a determination is made concerning whether the computed bins are uniform. When the computed bins are uniform, processing continues in an operation 745. When the computed bins are not uniform, processing continues in an operation 746 shown referring to FIG. 7B.

In operation 745, a determination is made concerning whether exact counts was selected. When exact counts was selected, processing continues in operation 746. When exact counts was not selected, processing continues in an operation 750.

Figure 7B:
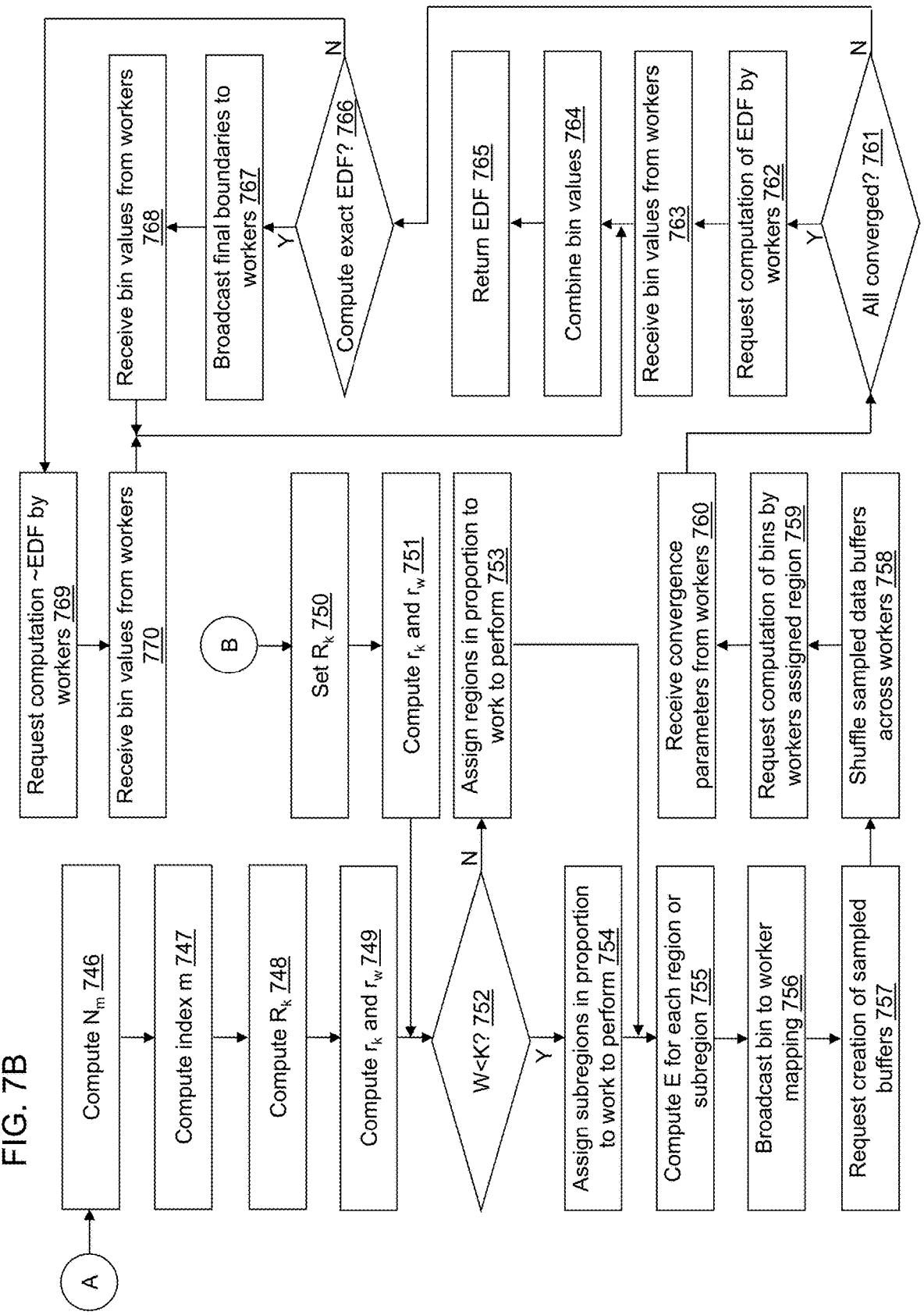

Referring to FIG. 7B, in operation 746, $N_m$ is computed.

In an operation 747, an index m is computed.

In an operation 748, $R_k$ is computed.

In an operation 749, $r_k$ and $r_w$ are computed, and processing continues in operation 752. The work that needs to be done for each bin in the kth region is approximately $r_k=T_k/b_k$, where $b_k$ is the number of bins in the kth region ($b_k$=round($B_0*(P_k-P_{k-1})$)). For equitable assignment of work, the amount of work that should be assigned to each worker should be approximately $r_w=T/N_W$. $r_w$ might not be an exact multiple of $r_k$ for each region k.

In operation 750, $R_k$ is set.

In an operation 751, $r_k$ and $r_W$ are computed.

In operation 752, a determination is made concerning whether a number of workers $N_W$ is less than a number of regions into which sample data 316 is organized. When the number of workers is less than the number of regions, processing continues in an operation 754. When the number of workers is greater than or equal to the number of regions, processing continues in an operation 753.

In operation 753, regions are assigned to worker devices based on a proportion of work to perform, and processing continues in operation 755. Because the work in each region is proportional to $T_k$, the number of workers for the kth region is computed as $W_k$=round($W*T_k/T$), such that $W_k \geq 1$ for each k. Note that it might be necessary to reduce the $W_k$ value by 1 for some region(s) to ensure that the condition $W=\Sigma_k W_k$ is satisfied. Now, the bins in the kth region need to be assigned to the workers that are assigned to that region. Of the total number of bins, $B_0$, the number of bins that belong to the kth region is approximately $b_k$=round($B_0*(P_k-P_{k-1})$). The goal is to assign the $b_k$ bins as equitably as possible among the $W_k$ workers. If $b_k$ is exactly divisible by $W_k$ for all values of k, each set of $b_k/W_k$ bins is assigned to one of the $W_k$ workers, achieving a perfect balancing of the binning work in the second stage. However, if $b_k$ is not exactly divisible by $W_k$—that is, if $b_k=W_k*f_k+r_k$ for some nonzero integers $f_k$ and $r_k$—for some regions, if $f_k$ is equal to 0 for some k is determined. If it is, a factor f is computed such that $b_k$=round($f*B_0*(P_k-P_{k-1})$) is an exact multiple of $W_k$ for all values of k. This factor f is essentially the least common multiple (LCM) of the set $\{W_k\}$. Then, the value of $B_0$ is multiplied by f. After $B_0$ is recomputed in this manner, $b_k$ is recomputed with the new value of $B_0$. Note that now $b_k \geq W_k$ for all values of k and $f_k \geq 1$ for each kth region. For each kth region, the bins to workers are assigned as follows:

If $r_k$=0, $f_k$ bins are assigned to each of the $W_k$ workers.

If $r_k$>0, each worker gets at least $f_k$ bins and the remainder $r_k$ bins need to be distributed among workers in some manner. For example, the first $r_k$ sets of ($f_k$+1) bins are assigned to each of the first $r_k$ workers and the remaining ($W_k-r_k$) sets of $f_k$ bins are assigned to each of the remaining ($W_k-r_k$) workers. Other possibilities of distributing the remainder $r_k$ bins among workers may be used.

In an alternative embodiment, the user may have an option of not multiplying $B_0$ by f and assigning the bins for each region based on the original value of $B_0$. This embodiment has the advantage of not inflating $B_0$, thereby reducing the number of parameters for the equal proportion algorithm of the first stage, which in turn can lead to faster and better binning solution. On the other hand, it has the disadvantage of unbalanced workload among workers for the second stage in regions that have $f_k$=0

In operation 754, subregions are assigned to worker devices based on a proportion of work to perform. Because there are fewer workers than regions, some workers need to work on more than one region. The distribution of the total work among workers is defined at the bin level. If the number of bins, $B_0$, is a multiple of $N_W$, there is an equitable work assignment. The work that needs to be done for each bin in the kth region is approximately $r_k=T_k/b_k$, where $b_k$ is the number of bins in the kth region ($b_k$=round($B_0*(P_k-P_{k-1})$)). For equitable assignment of work, the amount of work that should be assigned to each worker should be approximately $r_w=T/N_W$. $r_w$ might not be an exact multiple of $r_k$ for each region k. Bins can be assigned workers using the following steps:

i. Set the region counter, k, to 1. Set the running sum of unassigned work, S, to 0. Set the global bin indicator, $b_g$, to 1. Set the region bin indicator, b, to 1. Set the current worker indicator, w, to 1.

ii. Set $S=S+r_k$.

iii. Assign bin $b_g$ to worker w.

iv. If $S \geq r_w$, go to the next worker by incrementing w by 1 and reset S=0.

v. Go to the next bin by incrementing both $b_g$ and b by 1.

vi. If $b>b_k$, go to the next region by incrementing k and set b=1.

vii. If k>K, exit, otherwise go back to step (ii).

When $W \geq K$, steps i. to vii may be performed in an alternative embodiment. After the equal proportion binning algorithm finishes, let the $B_0$ bin boundaries that it finds be denoted by $\{b_{0,1}, b_{0,2}, b_{0,B0}\}$. These are used to estimate the region boundaries $R_k$ as follows:

A. If the binning algorithm is successful in achieving an almost uniform distribution of counts, then the EDF estimate at the start of the mth bin is approximately $m/B_0=m*c$. For the kth region, find m such that $P_k$ is closest to $m*c$ and set $R_k=b_{0,m}$, boundary of the mth bin.

B. If the binning algorithm fails to achieve a uniform distribution of counts for some reason, then values of $R_k$ need to be estimated by using the actual counts of each of the bins (count of a bin is the number of input sample values that belong to that bin). If $N_m$ denotes the cumulative count of bins 1 through m, then the EDF estimate at the start of the mth bin is $N_{m-1}/N$, where $N_{m-1}$ is the sum of counts in the previous m−1 bins. One way to estimate $R_k$ for the kth region is to find the mth bin such that $P_k$ is closest to $N_{m-1}/N$ and set $R_k=b_{0,m}$. Another way to estimate $R_k$ is to find a value of m such that $N_{m-1} \leq N*P_k < N_m$ and set $R_k=(b_{0,m}+b_{0,m+1})/2$. There are also other possible ways of combining $b_{0,m}$ and $b_{0,m+1}$ to compute $R_k$ when $N_{m-1} \leq N*P_k < N_m$ for some m.

Note that for this case, the distribution of bins to workers is unaffected if $W \geq K$. However, if W<K, the bin-to-worker assignment algorithm of operation 754 uses modified values of $r_k$ and $r_w$ that reflect the actual counts in bins. Specifically, after deciding which bins demarcate each of the regions, the bin-to-worker assignment algorithm first computes $N_k$ and $b_k$, which are the total count and number of bins in region k, respectively, for all regions. Then, it uses $r_k=s_k*N_k/b_k$ and $r_w=(\Sigma_k r_k)/W$.

It is also possible to offer the user a choice of using the method B above even for the case when equal proportion algorithm converges to an almost uniform distribution.

In operation 755, $E_{w,k}$ is computed for each region and/or subregion in parallel by the worker devices. After $R_k$ values are estimated, the first stage concludes by preparing the bin-to-worker mapping as described earlier and by computing $E_{w,k}=\{p_{w,k}, q_{w,k}\}$, the range of EDF values that a worker w processes in region k. $E_{w,k}$ is valid only for the regions k that are assigned to the worker w. For other regions, $E_{w,k}$ is set to a set of missing values (implying that it is undefined). Note that for W≥K, each worker processes bins from only one region, and for W<K, a worker might process bins from more than one region. Let f and l denote the indices of the first and the last bins that are assigned to the worker w in region k, respectively. Note that the indices f and l go over the global set of bins. Given these indices for each valid combination of w and k, the $E_{w,k}$ sets are computed as follows by utilizing the fact that a worker is always assigned a set of consecutive bins:

If the equal proportion binning algorithm is successful in achieving an almost uniform distribution of counts and if method A is used for estimating $R_k$, then $E_{w,k}=\{(f-1)*c, l*c\}$ If the binning algorithm fails to achieve a uniform distribution or if method B is used for estimating $R_k$, then the input sample is read to calculate the exact count of values in each of the bins by using the bin boundaries that the equal proportion algorithm prepares. Then, $E_{w,k}$ is set to $E_{w,k}=\{N_{f-1}/N, N_l/N\}$, where $N_l$ denotes the sum of counts in the first l bins.

Similarly, the EDF at the end of each region, $E_k$, also needs to be computed and stored (this is required to compute the final EDF estimates after the second stage completes). This can be done as follows:

If the equal proportion binning algorithm is successful in achieving an almost uniform distribution of counts and if method A is used for estimating $R_k$, then $E_k=m*c$, where m is the index of the bin that is used to estimate $R_k$.

If the binning algorithm fails to achieve a uniform distribution or if method B is used for estimating $R_k$, the input sample is read to calculate the exact count of values in each of the bins by using the bin boundaries that the equal proportion algorithm prepares. Then, $E_k$ is set to $E_k=N_m/N$, where $N_m$ denotes the sum of counts in the first m bins and m is index of the last bin in region k.

In an operation 756, a mapping of bins assigned to each worker device is broadcast.

In an operation 757, creation of sampled data buffers is requested by each worker device.

The second stage further bins the values in each of the K regions to achieve the desired accuracy level for the EDF estimates in each region. Let $a_k$ denote the desired accuracy in the kth region. The desired accuracy is defined as the desired precision in the EDF values. Specifically, if the desired accuracy is $a_k$, then the values for which the difference in the EDF estimates is greater than or equal to $a_k$ should be distinguishable from each other, but the values whose EDF estimates differ by a value that is smaller than $a_k$ might not be distinguishable. To achieve the desired accuracy, the second stage employs an equal proportion binning algorithm such that the proportion of observations in each final bin of the kth region is as close to $a_k$ as possible, when the proportion is computed with respect to the global data. Because each region contains a mutually exclusive set of values, the second stage binning can proceed in parallel for each region. In fact, because the first stage has created coarser bins in each of the regions and created a mapping from those bins to workers, the second stage binning can happen independently on each worker provided that each worker has access to all the data in the first-stage bins that are assigned to that worker. So the first thing to do in the second stage is to move the input data among workers such that each worker has only the data for the first-stage bins that are assigned to it. If the input data is large, the amount of data that needs to be moved can be large, leading to poor performance. But, the distributed system 100 alleviates this problem by applying the user-specified sampling fractions, $\{s_k\}$, before the data is moved, thereby reducing the amount of data movement. In fact, possible reduction in data movement is precisely the reason the distributed system 100 introduces the idea of region-specific sampling fractions. For regions that are highly populated and where desired accuracy is not high, user can specify larger sampling fractions to aggressively reduce the amount of data movement. To move the data among workers, the second stage uses the following steps:

The bin-to-worker mapping, which is prepared by the first stage on the master node, is broadcast to all the workers, so that each worker knows which bin belongs to which worker. Each worker also receives the range of EDF estimates, $E_{w,k}$, for the regions that are assigned to it, from the master node.

Each worker processes its local part of the input sample to create a buffer for every other worker by following the bin-to-worker mapping. When a worker processes a value that belongs to bin b that falls in the kth region such that bin b is assigned to worker w, the worker generates a random number p from the uniform distribution and adds the value to the buffer of worker w only if $p \leq s_k$. This ensures that only the sampled data are added to the worker buffers.

After each worker creates buffers of sampled data for destination workers, the buffers are shuffled to their respective destinations. Any standard distributed communication algorithm can be used for this shuffling.

After the sampled data is shuffled across workers, each worker proceeds independently to process the bins that are assigned to it. The bin-to-worker assignment in the first stage is designed to assign consecutive bins to a worker. If W≥K, then each worker processes bins in only one region. Within a worker, multithreading can be used to process sampled data in different first-stage bins in parallel. If W<K, some workers might process bins from different regions, in which case such workers use multithreading to process its assigned regions in parallel by assigning each region to a separate computation thread or by assigning different first-stage bins within each region to different threads of computation.

A worker or a thread on the worker processes its assigned region k to do the final binning. The EDF range for that assigned region, $E_{w,k}=\{p_{w,k}, q_{w,k}\}$, is used in conjunction with the desired accuracy of that region, $a_k$, to decide the number of bins that the worker or thread creates for the region k. Specifically, the number of bins $B_k$ that the worker or thread creates for the kth region is $B_k=(q_{w,k}-p_{w,k})/a_k$. The worker or thread then runs the sequential version of the equal proportion binning algorithm by using only the values that belong to the bins of the kth region that are assigned to the worker. The desired fraction of values in each of the $B_k$ bins is $c_k=1/B_k=a_k/(q_{w,k}-p_{w,k})$, which is essentially a region-relative fraction or EDF accuracy. It is possible that the number of bins $B_k$ is larger than the number of sampled data points that are available for binning in the range of values that is processed by the worker or thread. In such cases, the proposed solution uses the data points themselves as bin boundaries and resets $B_k$ lower to match the number of sampled data points in the range.

Figure 12B:
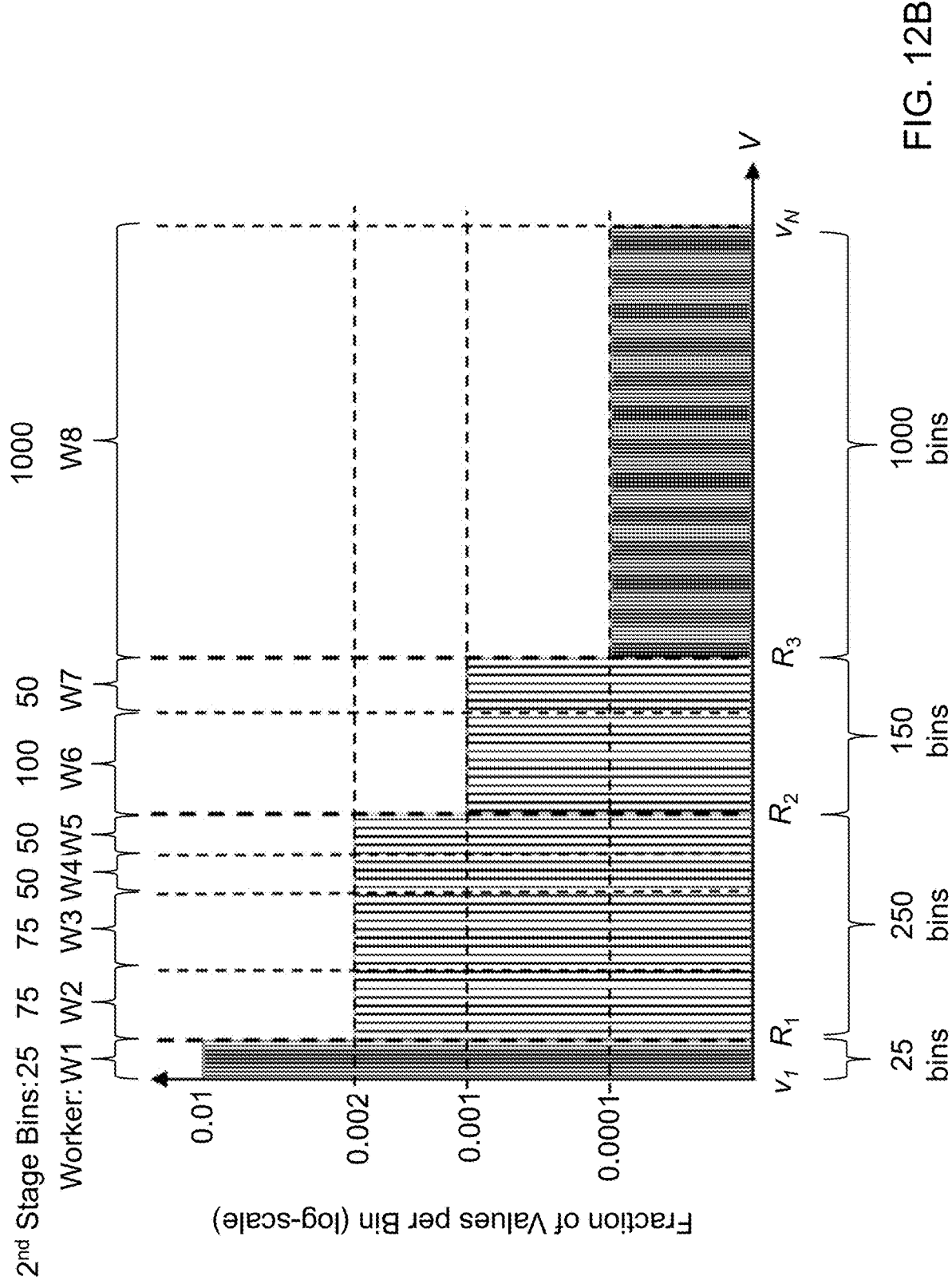

Referring to FIG. 12B, the user has specified four regions (K=4) with the K-1 region boundaries as $P_k=\{0.25, 0.75, 0.9\}$, K sampling fractions as $s_k=\{0.2, 0.5, 0.8, 1\}$, and K desired accuracy values of $a_k=\{0.01, 0.002, 0.001, 0.0001\}$. It can be verified that the first stage uses the $P_k$ values to create $B_0=20$ bins and that the number of first-stage bins for each region are $b_k=\{20*0.25, 20*0.5, 20*0.15, 20*0.1\}=\{5, 10, 3, 2\}$. Assuming the first stage equal proportion algorithm converges to an almost uniform distribution of counts in all bins, the EDF estimate at the end of each bin differs by $1/20=0.05$. Now, based on the sampling fractions, the estimated number of sampled points, and hence the work, in each region for the second stage is proportional to $T_k=\{0.2*0.25, 0.5*0.5, 0.8*0.15, 1*0.1\}=\{0.05, 0.25, 0.12, 0.1\}$. The total work is proportional to $T=\Sigma_k T_k=0.52$. Now, consider the following two cases:

Number of workers is 8, so W>K, which implies that the first stage distributes the 20 bins that it creates to workers by following the algorithm of step 3a (note that the step 3b of the algorithm can also be applied for this case, but this illustration uses step 3a). Specifically, the workers get assigned to regions in proportion of $T_k/T$. So $W_k=\{$round(8*0.05/0.52), round(8*0.25/0.52), round(8*0.12/0.52), round(8*0.1/0.52)$\}=\{1, 4, 2, 1\}$ for the 4 regions. Note that $W_4$ needs to be reduced by 1 to ensure that the condition $W=\Sigma_k W_k$ is satisfied. Given this region-to-worker assignment, the bin-to-worker assignment and the second stage binning happens within each region as follows:

Region 1 is assigned only one worker, worker 1, which gets all 5 first-stage bins of that region. The EDF range for worker 1 is $E_{1,1}=\{0,0.25\}$. Because worker 1 does not get bins for any other region, the values of $E_{1,2}$, $E_{1,3}$, and $E_{1,4}$ are set to $\{.,.\}$, where '.' denotes a missing (undefined) value, and the second stage processes only region 1 on worker 1. First region's desired accuracy is $a_1=0.01$, so in the second stage, worker 1 runs the equal proportion algorithm to create $B_1=0.25/0.01=25$ bins from the sampled set of values that belong to region 1, each bin with a desired proportion of $1/25$.

Region 2 is assigned to next 4 workers, workers 2 through 5. The 10 bins of that region are assigned as follows:

First 3 bins of region 2 are assigned to worker 2, so worker 2's EDF range is $E_{2,2}=\{0.25, 0.4\}$. Note that $E_{2,1}$, $E_{2,3}$, and $E_{2,4}$ are all set to $\{.,.\}$. The second stage essentially processes only the global first-stage bins 6 through 8 on worker 2. Region 2's desired accuracy is $a_2=0.002$, so in the second stage, worker 2 runs the equal proportion algorithm to create $B_2=0.15/0.002=75$ bins from the sampled set of values in the range that is demarcated by first-stage bins 6 through 8. Each second-stage bin created on worker 2 has a desired proportion of $1/75$.

Next 3 bins of region 2 are assigned to worker 3, so worker 3's EDF range is $E_{3,2}=\{0.4, 0.55\}$. Note that $E_{3,1}$, $E_{3,3}$, and $E_{3,4}$ are all set to $\{.,.\}$. The second stage essentially processes only the global first-stage bins 9 through 11 on worker 3. Region 2's desired accuracy is $a_2=0.002$, so in the second stage, worker 3 runs the equal proportion algorithm to create $B_2=0.15/0.002=75$ bins from the sampled set of values in the range that is demarcated by first-stage bins 9 through 11. Each second-stage bin created on worker 3 has a desired proportion of $1/75$.

Next 2 bins of region 2 are assigned to worker 4, so worker 4's EDF range is $E_{4,2}=\{0.55, 0.65\}$. Note that $E_{4,1}$, $E_{4,3}$, and $E_{4,4}$ are all set to $\{.,.\}$. The second stage essentially processes only the global first-stage bins 12 and 13 on worker 4. Region 2's desired accuracy is $a_2=0.002$, so in the second stage, worker 4 runs the equal proportion algorithm to create $B_2=0.1/0.002=50$ bins from the sampled set of values in the range that is demarcated by first-stage bins 12 and 13. Each second-stage bin created on worker 4 has a desired proportion of $1/50$.

Last 2 bins of region 2 are assigned to worker 5, so worker 5's EDF range is $E_{5,2}=\{0.65, 0.75\}$. Note that $E_{5,1}$, $E_{5,3}$, and $E_{5,4}$ are all set to $\{.,.\}$. The second stage essentially processes only the global first-stage bins 14 and 15 on worker 5. Region 2's desired accuracy is $a_{2=0.002}$, so in the second stage, worker 5 runs the equal proportion algorithm to create $B_2=0.1/0.002=50$ bins from the sampled set of values in the range that is demarcated by first-stage bins 14 and 15. Each second-stage bin created on worker 5 has a desired proportion of $1/50$.

Region 3 is assigned to next 2 workers, workers 6 and 7. The 3 bins of that region are assigned as follows:

First 2 bins of region 3 are assigned to worker 6, so worker 6's EDF range is $E_{6,3}=\{0.75, 0.0.85\}$. Note that $E_{6,1}$, $E_{6,2}$, and $E_{6,4}$ are all set to $\{.,.\}$. The second stage essentially processes only the global first-stage bins 16 and 17 on worker 6. Region 3's desired accuracy is $a_{3=0.001}$, so in the second stage, worker 6 runs the equal proportion algorithm to create $B_3=0.1/0.001=100$ bins from the sampled set of values in the range that is demarcated by first-stage bins 16 and 17. Each second-stage bin created on worker 6 has a desired proportion of $1/100$.

The last bins of region 3 is assigned to worker 7, so worker 7's EDF range is $E_{7,3}=\{0.85, 0.9\}$. Note that $E_{7,1}$, $E_{7,2}$, and $E_{7,4}$ are all set to $\{.,.\}$. The second stage essentially processes only the global first-stage bin 18 on worker 7. Region 3's desired accuracy is $a_{3=0.001}$, so in the second stage, worker 7 runs the equal proportion algorithm to create $B_3=0.05/0.001=50$ bins from the sampled set of values in the range that is demarcated by first-stage bin 18. Each second-stage bin created on worker 7 has a desired proportion of $1/50$.

Finally, region 4 is assigned to the last worker, worker 8. Both bins, global first-stage bins 19 and 20, are assigned to worker 8, which has the EDF range of $E_{8,4}=\{0.9, 1\}$. Note that $E_{8,1}$, $E_{8,2}$, and $E_{8,3}$ are all set to $\{.,.\}$. The second stage essentially processes only the global first-stage bins 19 and 20 on worker 8. Region 4's desired accuracy is $a_{4=0.0001}$, so in the second stage, worker 8 runs the equal proportion algorithm to create $B_4=0.1/0.0001=1000$ bins from the sampled set of values in the range that is demarcated by first-stage bins 19 and 20. Each second-stage bin created on worker 8 has a desired proportion of $1/1000$. Although no sampling is done for region 4, it is possible that the number of data points that fall in the bins 19 and 20 is smaller than 1000 ($B_4$). If that happens, $B_4$ is adjusted lower to match the number of data points in bins 19 and 20 and second stage bin boundaries are set to be equal to the data point values.

Note that all the workers run the equal proportion binning algorithms on their respective range of values independently and in parallel with other workers.

Figure 12C:
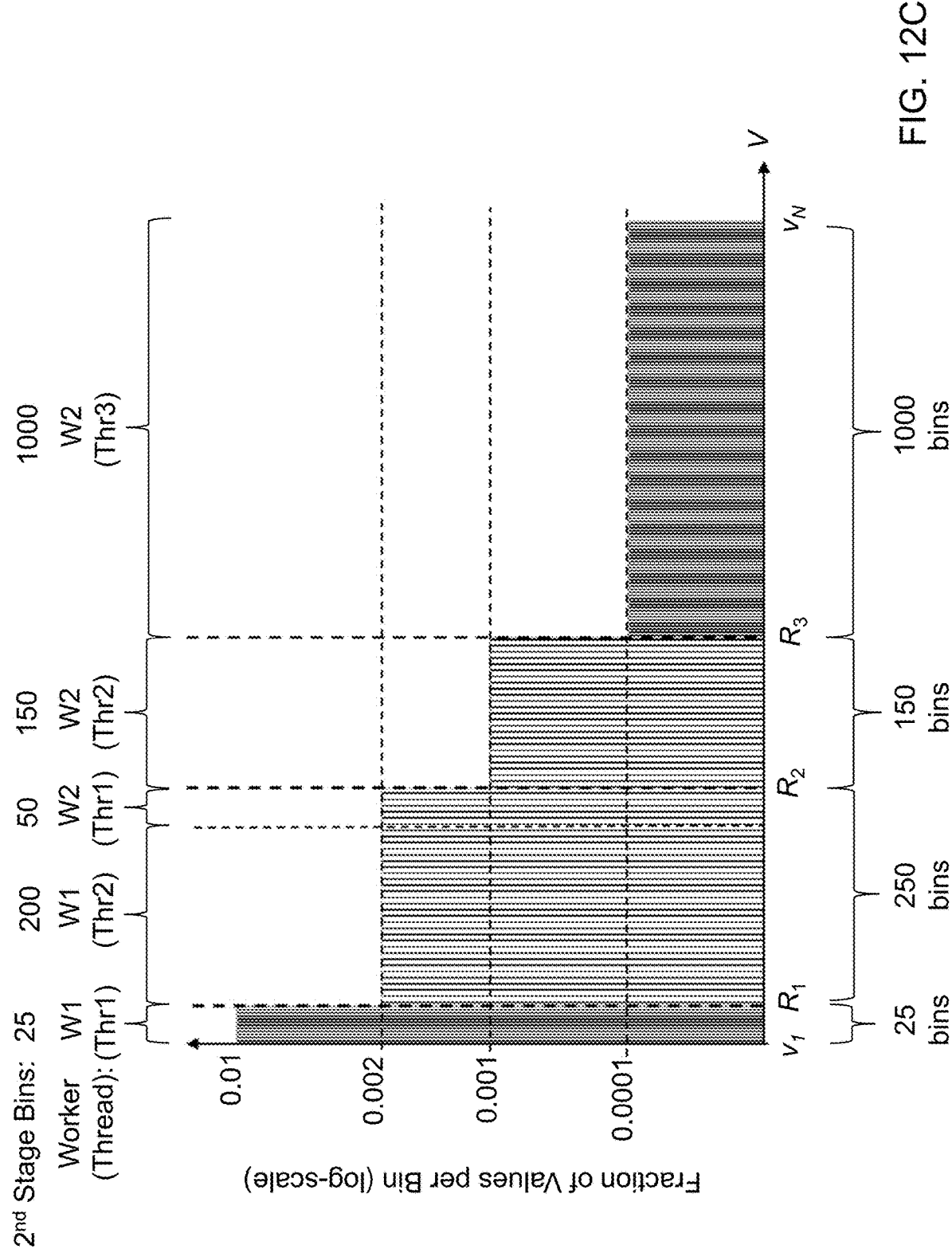

Referring to FIG. 12C, the number of workers is 2, so W<K, which implies that the first stage distributes the 20 bins that it creates to workers by following the algorithm of step 3b. The work per bin of each region is $r_k$ $(=T_k/b_k)=\{0.05/5, 0.25/10, 0.12/3, 0.1/2\}=\{0.01, 0.025, 0.04, 0.05\}$. The amount of work per worker is $r_w=T/W=0.52/2=0.26$. So, to distributed work equitably, the bin-to-worker assignment and the second stage binning happens within each region as follows:

All 5 bins of region 1 (amounting to a work of 0.05) and 8 bins of region 2 (amounting to a work of 0.025*8=0.2) are assigned to the first worker. So the first worker processes regions 1 and 2. The EDF ranges for those regions are $E_{1,1}=\{0, 0.25\}$ and $E_{1,2}=\{0.25, 0.65\}$. Note that $E_{1,3}$ and $E_{1,4}$ are set to $\{.,.\}$. The second stage essentially processes the global first-stage bins 1 through 13 on worker 1, but because those bins belong to two different regions, worker 1 needs to process the regions separately by applying different accuracy thresholds to each region. One way it can achieve higher performance is to use multithreading by assigning the second-stage binning work of region 1 to one thread of computation and the second-stage binning work of region 2 to another thread of computation. So, the multithreaded work can proceed in parallel as follows on worker 1:

Region 1's desired accuracy is $a_1=0.01$, so thread 1 runs the equal proportion binning algorithm to create $B_1=0.25/0.01=25$ bins from the sampled set of values in the range that is demarcated by first-stage bins 1 through 5 (all of region 1).

Region 2's desired accuracy is $a_2=0.002$, so thread 2 runs the equal proportion binning algorithm to create $B_2=0.4/0.002=200$ bins from the sampled set of values in the range that is demarcated by first-stage bins 6 through 13 (in region 2).

The last 2 bins of region 2 (amounting to a work of 0.025*2=0.05), all 3 bins of region 3 (amounting to a work of 0.12), and all 2 bins of region 4 (amounting to a work of 0.1) are assigned to the second worker. So the second worker processes regions 2, 3, and 4. The EDF ranges for those regions are $E_{2,2}=\{0.65, 0.75\}$, $E_{2,3}=\{0.75, 0.9\}$, and $E_{2,4}=\{0.9, 1\}$. Note that $E_{2,1}$ is set to $\{.,.\}$. The second stage essentially processes the global first-stage bins 14 through 20 on worker 2, but because those bins belong to three different regions, worker 2 needs to process the regions separately by applying different accuracy thresholds to each region. One way it can achieve higher performance is to use multithreading by assigning the second-stage binning work of each region to a separate thread of computation. Assuming that the worker has at least 3 threads of computation available, threads 1, 2, and 3 can be assigned to process regions 2, 3, and 4, respectively. So, the multithreaded work can proceed in parallel as follows on worker 1.

Thread 1 uses region 2's desired accuracy of $a_2=0.002$ and runs the equal proportion binning algorithm to create $B_2=0.1/0.002=50$ bins from the sampled set of values in the range that is demarcated by first-stage bins 14 and 15 (in region 2).

Thread 2 uses region 3's desired accuracy of $a_3=0.001$ and runs the equal proportion binning algorithm to create $B_3=0.15/0.001=150$ bins from the sampled set of values in the range that is demarcated by first-stage bins 16 through 18 (in region 3).

Thread 3 uses region 4's desired accuracy of $a_4=0.0001$ and runs the equal proportion binning algorithm to create $B_4=0.1/0.0001=1000$ bins from the sampled set of values in the range that is demarcated by first-stage bins 19 and 20 (in region 4).

After all workers finish running the equal proportion binning algorithms for their assigned regions and bins, the set of second-stage bin boundaries in all the regions together form the final EDF estimate. This final set of bin boundaries is distributed among workers. One option is to keep the EDF estimates distributed. Another option is to bring all the EDF estimates to one of the worker nodes or to the master node. The appropriateness of each option depends on how the EDF estimates are used. For the bins in the kth region, the EDF estimates start at $E_{k-1}$ (note that $E_0=0$). The EDF at each bin boundary in the region is computed based on the result of the equal proportion binning algorithm as follows:

If the algorithm converges to an almost uniform distribution, then the EDF increase by $a_k$ at each bin boundary, so the EDF estimate at the end of the ith bin in the kth region is $E_{k-1}+a_k*i$.

If the algorithm does not converge to an almost uniform distribution, then the counts in each final bin are used to compute the EDF estimate. Let $c_{i,k}$ denote the count in the ith bin and let $n_{i,k}=c_{1,k}+c_{2,k}+\ldots+c_{i,k}$ denote the sum of the counts in bins 1 through i in the kth region. The count at the beginning of the kth region is $E_{k-1}*N$, because N is the total size of the sample. So, the EDF estimate at the end of the ith bin in the kth region is $(N*E_{k-1}+n_{i,k})/N$. There is one important caveat in this method. The second stage uses sampled data, so the counts counts $c_{i,k}$ are based on the sampled data and they need to be adjusted for the sampling fraction that is applied to the region. Specifically, each count $c_{i,k}$ needs to be divided by the sampling fraction, $s_k$, of the kth region. However, this method of adjusting counts is approximate. Alternatively, exact counts can be calculated by making one more pass over the input data. This requires all the second-stage bin boundaries of all regions to be communicated to all workers, followed by all workers counting the bins for their locally stored portion of the input data, and finally, accumulating the worker-local counts of all bins on a master node to calculate the final bin counts $c_{i,k}$. Because this method of calculating exact counts involves inter-worker communication of final bin boundaries and counts, it is more expensive than the approximate method of adjusting $c_{i,k}$ by sampling fractions. The distributed system 100 lets the user decide which method to use after weighing the accuracy vs. cost tradeoff.

If the equal proportion algorithm succeeds in all regions, the number of values that need to be stored to represent the EDF estimate is B, which is the sum of the number of bins $B_k$ in all the regions: $B=B_1+B_2+\ldots+B_K$. It is important to note that the value of each $B_k$ depends only on the values of $P_k$ and $a_k$, so B is independent of N. Even when the equal proportion algorithm fails to achieve a uniform distribution of counts in all the regions, the final set of bin boundaries that it computes can still be used for computing the EDF estimate by using the counts in the individual bins. In that case, in addition to just the bin boundaries, the cumulative counts at the start of each bin also need to be stored, which doubles the required storage to 2*B. Comparing this to the naïve method of computing the EDF estimates that requires all N values to be stored, the memory saved by the proposed method can be significant when N is large. For the example illustrated in FIG. 12B, B=25+250+150+1,000=1,425. Even if the desired accuracy is increased ten-fold in all the regions by dividing all $a_k$ values by 10, the required storage is proportional to 14,250 instead of being proportional to N, which can typically be in millions or even billions.

This work assignment among 2 workers and threads on those workers is illustrated pictorially in FIG. 12C. The multithreading model that is used to process regions in parallel can be extended further to process the subsets of bins within each region in parallel. For example, because worker 1 processes 13 bins, it can use 13 threads of execution can be used to process each bin in parallel, with each thread using appropriate region's accuracy level to decide the number of bins to create. Similarly, worker 2 can use up to 7 threads of execution to process its assigned 7 bins in parallel.

In an operation 758, the sampled data buffers are shuffled across worker devices In an operation 759, computation of bins for each of the shuffled sampled data buffers is requested by each worker device.

In an operation 760, one or more convergence parameters is received from each worker device.

In an operation 761, a determination is made concerning whether the converged status is converged for all of the worker devices. When the converged status is converged, processing continues in an operation 762. When the converged status is not converged, processing continues in an operation 766.

In operation 762, computation of an empirical distribution function (EDF) is requested by each worker device.

In an operation 763, bin values for the bins are received from each worker device.

In an operation 764, the received bin values for the bins are combined.

In an operation 765, computation of the EDF as defined by equal proportion bins is complete, and control returns to an operation 704 referring again to FIG. 7A. The bin boundaries from all regions and their average proportions together form the EDF estimate.

In operation 766, a determination is made concerning whether an exact EDF computation is selected. When an exact EDF computation is selected, processing continues in an operation 767. When an exact EDF computation is not selected, processing continues in an operation 769.

In operation 767, bin boundaries are broadcast to each worker device.

In an operation 768, bin counts for the bins are received from each worker device, and processing continues in operation 764.

In operation 769, computation of an approximate EDF is requested by each worker device as described in operations 1028 to 1034 of FIG. 10A.

In an operation 770, bin counts for the bins are received from each worker device, and processing continues in operation 764.

Referring to FIG. 6D, example operations associated with manager application 312 are described to sequentially compute bin boundaries. Additional, fewer, or different operations may be performed depending on the embodiment. The order of presentation of the operations of FIG. 6D is not intended to be limiting.

In operation 663, a minimum sample value $x_{min}$ and a maximum sample value $x_{max}$ are computed from the sample values.

In an operation 664, c and B are defined, where c=a*M is a count of values in each bin and B=1/a is a number of bins, where a is an accuracy value, and M is a sample size.

In an operation 665, a determination is made concerning whether c<m. When c<m, processing continues in an operation 666. When c≥m, processing continues in an operation 670. m is a minimum expected number of observations per bin. To employ a statistical test of uniformity, such as the chi-squared test or G-test, the bins should contain a minimum number of observations because the test statistics might not have an approximate chi-squared distribution when the expected count per bin is very small. A general guideline for the value of m is 5. If the value of c is less than m, the iterative bin update mechanism is not used. Instead, the 100*k*ath percentile (k=1, ..., B) is used as the bin boundaries. The minimum expected number of observations per bin m may be included as part of the control values.

In operation 666, the sample is loaded in memory if not already loaded in memory.

In an operation 667, the loaded sample is sorted.

In an operation 668, bin boundaries are computed using the sorted sample.

In an operation 669, the sequential binning process is complete, and for example, processing continues in operation 646 of FIG. 6C or in an operation 1018 of FIG. 10 depending on whether operation 645, operation 1012, or operation 1016 requested the sequential binning process.

In operation 670, initial bin boundaries $b_k$ for each $k^{th}$ region are defined based on equal spacing across the [$x_{min}$, $x_{max}$] range of values. So, the initial values of $b_k$ are $b_k = x_{min} + (k-1)*(x_{max}-x_{min})/B$, where k=1, ..., B.

In an operation 671, the sample is read and bin counts are computed within each of the bin boundaries. For example, the sample value read is compared in succession to each region boundary or using a binary search operation to determine which bin count is incremented.

In an operation 672, a uniformity test statistic, a p-value, and a D criterion are computed. A statistical hypothesis test is used to determine whether the distribution of counts in the bins is indistinguishable from a uniform distribution. Two examples of tests that can be used are the chi-squared test and the G-test. The test statistic method may be included as part of the control values and may be selected from additional methods. For illustration, the chi-squared test statistic is computed using $$H = \sum_{k=1}^{B_c} \frac{(o_k - c)^2}{c}$$

and is also Known as a Pearson's chi-squared test statistic, where $o_k$ is an observed count in each bin, and $B_c$ is a number of bins that contain nonzero counts. $B_c$ might be less than B because some bins may contain no observations for a latest set of bin boundaries and $B_c$ excludes such bins. The G-test test statistic is computed using $$G = 2\sum_{k=1}^{B_c} o_k \ln\left(\frac{o_k}{c}\right).$$

Both uniformity test statistics, H and G, follow a chi-squared distribution with $B_c-1$ degrees of freedom. The p-value is the probability that the value of the random variable that follows a chi-squared distribution with $B_c-1$ degrees of freedom is greater than the value of the uniformity test statistic. The D criterion is computed as a difference in the fractions of observations in the largest and smallest bins by count.

In an operation 673, a determination is made concerning whether the p-value>$p_{min}$. When the p-value>$p_{min}$, processing continues in operation 675. When the p-value≤$p_{min}$, processing continues in an operation 674. $p_{min}$ is a minimum p-value that should be achieved by a chi-squared test or G-test to declare that the distribution of bin counts is indistinguishable from the uniform distribution. A typical value of $p_{min}$ is 0.05 or 0.1, but a user can specify higher values, such as 0.5 or even 0.8, to achieve higher confidence in the test results. The $p_{min}$ value may be included as part of the control values.

In operation 674, bin boundaries are updated, for example, the operations of FIG. 6E may be performed to update the bin boundaries, and processing continues in operation 671.

In operation 675, a determination is made concerning whether D>e*a, where e is an acceptable tolerance in the EDF accuracy and has a value between zero and one and is a fractional multiplier to the desired accuracy a. The value of e may be included as part of the control values. In practice, the D-based criterion is found to be more stringent than the criterion based on the p-value, because it ensures that fraction of counts in the smallest and largest bins is not very different. When D>e*a, processing continues in an operation 676. When D≤e*a, processing continues in operation 669 meaning the sequential bin computation is complete because the convergence criterion has been satisfied.

In operation 676, a determination is made concerning whether D has degraded for too many iterations defined by $I_n$. $I_n$ is the maximum number of iterations for which the convergence criterion D is allowed to deteriorate. Although the process tries to update the bin boundaries to minimize the convergence criterion, for certain data, the convergence criterion might degrade for a certain number of iterations and improve after that. However, $I_n$ avoids long-running loops. A typical value of $I_n$ is 5. The value of $I_n$ may be included as part of the control values. When D has degraded for too many iterations $I_n$, processing continues in operation 669 meaning the sequential bin computation is stopped. When D has not degraded for too many iterations $I_n$, processing continues in an operation 677.

In operation 677, a determination is made concerning whether there have been too many iterations $N_I$ of operation 822. $N_I$ is a maximum number of iterations. For certain data, convergence may take a large number of iterations, and for certain data, convergence may not be possible. $N_I$ defines an upper limit on the number iterations to control the how long the process is allowed to run. The value of $N_I$ may be included as part of the control values. When there have been too many iterations $N_I$, processing continues in operation 669 meaning the sequential bin computation is stopped. When there have not been too many iterations $N_I$, processing continues in operation 674.

Referring to FIG. 6E, example operations associated with manager application 312 are described to update bin boundaries. Additional, fewer, or different operations may be performed depending on the embodiment. The order of presentation of the operations of FIG. 6E is not intended to be limiting.

In an operation 678, parameters are initialized. For example, k=1, l=1, $f_1=b_1$, begin=$b_1$=$x_{min}$, end=$b_2$=$b_{k+1}$, and excess=0, where k and l are the counters over the original (pre-update) and final (post-update) bin boundaries $b_k$ and $f_l$, respectively. A first final bin begins at the same value as the first original bin so $f_1=b_1$. Excess tracks an excess count carried forward from a bin whose observed count $o_k$ is greater than c. (begin, end] indicates an active interval, which is a currently active part of a kth original bin that is being processed. $b_k$ indicates a boundary of the kth bin before the update. A boundary of a bin marks the beginning of the bin; that is, the smallest value that the bin can contain. A boundary of the first bin is $x_{min}$, and the last bin ends at $x_{max}$. $f_k$ indicates a boundary of the kth bin at the end of the update. It is initialized to $b_k$ at the beginning of the update.

$o_k$ indicates a count in the kth bin at the beginning of an iteration be where the counting step computes $o_k$. Again, c indicates the desired count in each bin.

Before a first iteration, the number of bins is B=1/a and bin boundaries are equally spaced across the [$x_{min}$, $x_{max}$] range of values, so, the initial values of $b_k$ are $b_k$=$x_{min}$+(k−1)*($x_{max}$−$x_{min}$)/B, where k=1, ..., B. The boundary update process splits or expands the kth bin when ok is either larger or smaller than the target count c, respectively. When the bin is split, the excess count, ($o_k$−c), is carried forward to the next bin. When a bin is expanded, it is merged with the next bin, and its count is added to the next bin's count.

In an operation 679, a determination is made concerning k>B or l>B. When k>B or l>B, processing continues in operation 680. When k≤B and l≤B, processing continues in an operation 683.

In operation 680, B is set equal to l when B<l.

In an operation 681, new boundaries are defined. The final bin boundaries $f_k$ are copied to $b_k$ (k=1 ... B) so that a next iteration of the sequential equal proportion binning process uses the updated bin boundaries to count the data.

In operation 682, the boundary update is complete, and for example, processing continues in operation 671 of FIG. 6D or in an operation 742 of FIG. 7A depending on whether operation 670, operation 677, operation 738, or operation 741 requested the bin boundary update.

In operation 683, $n_l$=$o_k$+excess is computed, where $n_l$ is a new count of the lth final bin.

In an operation 684, a determination is made concerning $n_l$,c. When $n_l$≤c, processing continues in an operation 687. When $n_l$>c, processing continues in an operation 685. If $n_l$≤c, the current final bin does not need to be split. If $n_l$>c, the current final bin needs to be split.

Figure 13B:
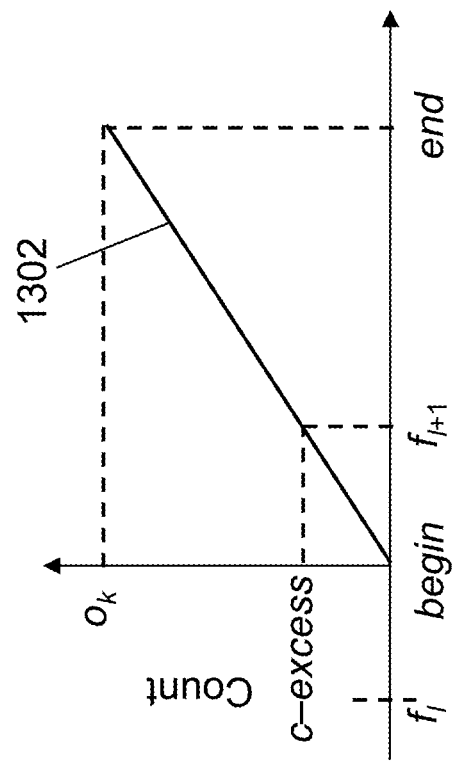
FIGS. 13A and 13B graphically illustrate bin splitting in accordance with an illustrative embodiment.
Figure 13A:
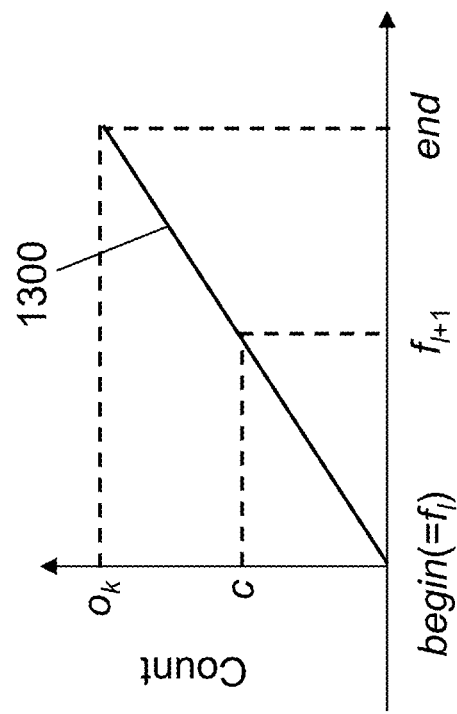

In operation 685, l is incremented, for example, using l=l+1 to set the next final bin as the current final bin. The counter k for the original bin is not incremented, because the count of that bin is not yet exhausted. The active interval [begin, end] indicates the range that needs to be split and ok denotes the count of values in that range. The range should be split such that the expected count in the current final bin will be close to c. Because the distribution of values is not known, a distribution is assumed to make the split. For the lack of any additional information, a uniform distribution of values is assumed and the active interval is split in proportion to the desired count. In other words, a linear interpolation is computed in the active interval to find the value where the total expected count in the current final bin will be c. When the carried forward count (excess) is 0, the current final bin needs to be assigned the full target count of c. In this case, that bin starts at the beginning of the active interval ($f_l$=begin). Because the total count in the [begin, end] range is $o_k$, a split based on the uniform distribution means that the current final bin should end and the next final bin should begin at a value $f_{l-1}$=begin+(end−begin)*c/$o_k$. This is illustrated by a line 1300 in FIG. 13A. When the carried forward count (excess) is nonzero, the current final bin has already begun ($f_l$<begin) and has a count of excess, so only the (c−excess) count needs to be apportioned to the part of the final bin that falls in the active interval. Hence, $f_{l+1}$=begin+(end−begin)*(c−excess)/$o_k$. This is illustrated by a line 1302 in FIG. 13B. After computing $f_{l+1}$, the new active interval is set to begin at $f_{l+1}$, and the total count in the active interval is reduced by (c−excess). There is no count to carry forward.

In an operation 686, a determination is made concerning whether l>B. When l>B, processing continues in operation 680. When l≤B, processing continues in an operation 687.

In operation 687, a bin boundary is updated using $f_l$=begin+(end−begin)*(c−excess)/$o_k$.

In an operation 688, $o_k$, excess, and the first boundary begin are updated, and processing continues in operation 679. For example, begin=$f_l$, $o_k$=$o_k$−(c−excess), and excess=0.

In operation 689, a determination is made concerning $n_l$=c. When $n_l$≥c, processing continues in an operation 695. When $n_l$<c, processing continues in an operation 690. If $n_l$=c, the desired count is achieved.

In operation 690, k is incremented, for example, using k=k+1. The count in the lth final bin is not sufficiently large, so the bin needs to be expanded and its count needs to be carried forward. The remaining count needs to be borrowed from the next original bin, so k is incremented, but not l because the current final bin's end (and next final bin's beginning) is not yet known.

In an operation 691, a determination is made concerning k>B. When k>B, processing continues in operation 680. When k≤B, processing continues in an operation 692.

In operation 692, excess is updated using excess=$n_l$.

In an operation 693, a last boundary is updated based on whether k=B or k<B. The active interval needs to be updated for the new value of k. If k=B, set end=$x_{max}$, and if k≠B, set end=$b_{k+1}$. The observed count in the active interval is $o_k$.

In an operation 694, a first boundary begin=$b_k$ is updated, and processing continues in operation 679.

In operation 695, k and l are incremented, for example, using k=k+1 and l=l+1. Since $n_l$=c, the desired count is achieved so the original and final bin counters k and l are incremented by one.

In an operation 696, a determination is made concerning k>B or l>B. When k>B or l>B, processing continues in operation 680. When k≤B and l≤B, processing continues in an operation 697. If either k or l is greater than B, the loop over k and l is stopped and processing continues in operation 680.

In operation 697, $f_l$ and excess are updated, and processing continues in operation 693. A new final bin is started at $b_k$ for the new value of k, so $f_l$=$b_k$. There is no count to carry forward so excess=0.

For illustration, consider that a sample of 500 values in the range [0,100] needs to be binned such that a proportion in each bin is a=0.2. Let the input tuning parameters be e=0.5, $p_{min}$=0.1, uniformity test to use=chi-squared, l=10, $l_n$=5, and m=5. A number of bins is set to B=1/a=5. Set target count per bin to c=M*a=100. Given that c>m, the iterative binning process is used instead of setting bin boundaries using percentiles of the whole sample as in operations 666, 667, and 668. Set the initial bin boundaries as equally spaced values in the data range, so they are {0, 20, 40, 60, 80}. Referring to FIGS. 14A to 14E, a graphical illustration of creation of equal proportion bins is shown in accordance with an illustrative embodiment.

The bins and counts at the beginning of the update algorithm are shown in FIG. 14A. Iteration 1: Count the bins for the initial bin boundaries. Let the bin counts be {50 for a first bin 1400, 100 for a second bin 1402, 250 for a third bin 1404, 70 for a fourth bin 1406, 30 for a fifth bin 1408}, for which the chi-squared test statistic is (2500+0+22500+900+4900)/100=308. For that test statistic, the p-value for B−1=4 degrees of freedom is very close to 0, which means that the count distribution is far from being uniform. Because p-value<$p_{min}$, the boundary update algorithm of FIG. 6E is called in operation 674.

The bin update algorithm proceeds as follows:

Active interval is (0,20] and $n_k$=50, which is smaller than the target count of 100 (c). So first final bin needs to be expanded by borrowing count from the next original bin. Set carried forward count, excess, to 50 and set k=2 to advance to the second original bin. The active interval is now (begin,end]=(20,40] and the count in the active interval is $o_2$=100.

The current count of the first final bin, $n_1$, is $o_2$+excess=150, which is greater than the target. Because the carried forward count (excess) is 50, only a count of (c−excess)=50 needs to be borrowed from the current active interval. Assuming the uniform distribution within the active interval, the value in the active interval at which count is estimated to be 50 is equal to 20+(40−20)*50/100=30, because the active interval is (20,40] and has a total count of 100. So, the first final bin ends and the second final bin starts at 30; set $f_{2=30}$. Because, a new final bin is started, the excess count is set to 0. The new active interval is now (30,40] and the count in the second original bin, $o_2$, is reduced from 100 to 50, because a count of 50 was lent to the previous bin. The bins and their estimated counts at this stage are shown in FIG. 14B.

The current count of the second final bin is, $n_2$=50, which is smaller than the target, so it needs to be expanded by borrowing count from the next original bin. Set excess=50 and set k=3 to advance to the third original bin. The active interval is now (begin,end]=(40,60] and the count in the active interval is $o_3$=250.

The current count of the second final bin, $n_2$, is $o_3$+excess=250+50=300, which is greater than the target. Because the carried forward count (excess) is 50, only a count of (c−excess)=50 needs to be borrowed from the current active interval. Assuming the uniform distribution within the active interval, the value in the active interval at which count is estimated to be 50 is equal to 40+(60−40)*50/250=44, because the active interval is (40,60] and has a total count of 250. So, the second final bin ends and the third final bin starts at 44; set $f_3$=44. Because, a new final bin is started, the excess count is set to 0. The new active interval is now (44,60] and the count in the third original bin, $o_3$, is reduced from 250 to 200, because a count of 50 was lent to the previous bin. The bins and their estimated counts at this stage are shown in FIG. 14C.

The current count of the third final bin, $n_3$, is $o_3$+excess=200+0=200, which is greater than the target. Because there is no carried forward count (excess=0), a count of c=100 needs to be borrowed from the current active interval. Assuming the uniform distribution within the active interval, the value in the active interval at which count is estimated to be 100 is equal to 44+(60−44)*100/200=52, because the active interval is (44,60] and has a total count of 200. So, the third final bin ends and the fourth final bin starts at 52; set $f_4$=52. Because, a new final bin is started, the excess count is set to 0. The new active interval is now (52,60] and the count in the third original bin, $o_3$, is reduced from 200 to 100, because a count of 100 was lent to the previous bin.

The current count of the fourth final bin, $n_4$, is $o_3$+excess=100+0=100, which is exactly equal to the target, so advance both the original and final bins, which means fifth final bin starts at 60; set $f_5$=60. Set excess=0. The active interval is now (begin,end]=(60,80] and the count in the active interval is $o_4$=70. The bins and their estimated counts at this stage are shown in FIG. 14D.

The current count of the fifth final bin is, $n_5$=70, which is smaller than the target, so it needs to be expanded by borrowing count from the next original bin. Set excess=70 and set k=5 to advance to the fifth original bin. The active interval is now (begin,end]=(80,100] and the count in the active interval is o5=30.

The current count of the fourth final bin, $n_5$, is $o_5$+excess=30+70=100, which is exactly equal to the target, so advance both the original and final bins. However, both have been exhausted (k>B and l>B), so the boundary update process ends. The final set of updated bin boundaries is {0, 30, 44, 52, 60} and their estimated counts are uniform as shown in FIG. 14E.

The steps of the bin boundary update algorithm for this iteration are illustrated in FIGS. 15A to 15E. Iteration 2: The boundary update algorithm adjusts the bin boundaries by estimating the counts. For the lack any additional information other than counts, the estimation uses an assumption that values within a bin follow the uniform distribution. Unfortunately, that assumption might not be valid for some bins, so the actual counts of the updated bins need to be calculated by reading the input sample. Let the actual bin counts for the bin boundary set {0, 30, 44, 52, 60} for this example's input sample be {120 for a first bin 1500, 160 for a second bin 1502, 40 for a third bin 1504, 80 for a fourth bin 1406, 100 for a fifth bin 1508}. The chi-squared test statistic for these counts is (400+6400+1600+3600+0)/100=120. Although it is better than that of the test statistic in the first iteration, the p-value for 4 degrees of freedom is still very close to 0, so the bin update algorithm needs to be used again to update the bin boundaries.

Initial bins are {0, 30, 44, 52, 60} with actual counts: {120, 160, 40, 80, 100}.

Figure 15D:
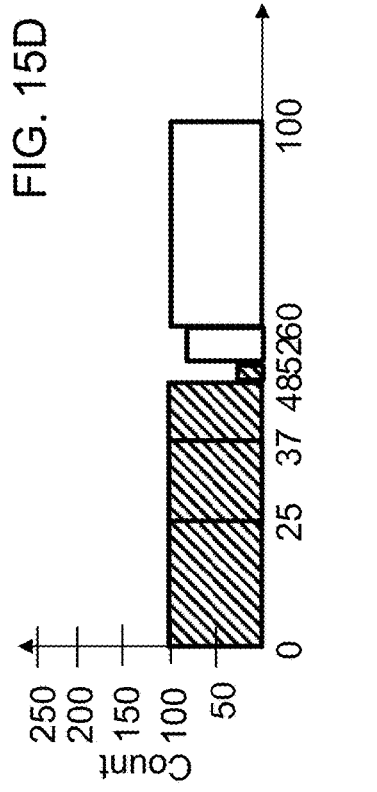
FIGS. 15A to 15E graphically illustrate creation of equal proportion bins as part of a second iteration in accordance with an illustrative embodiment.
Figure 15E:
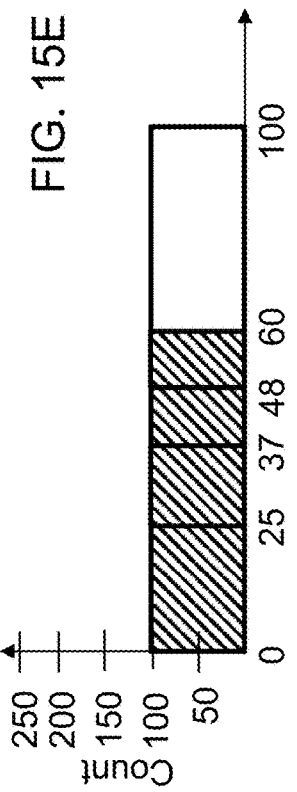
Figure 15A:
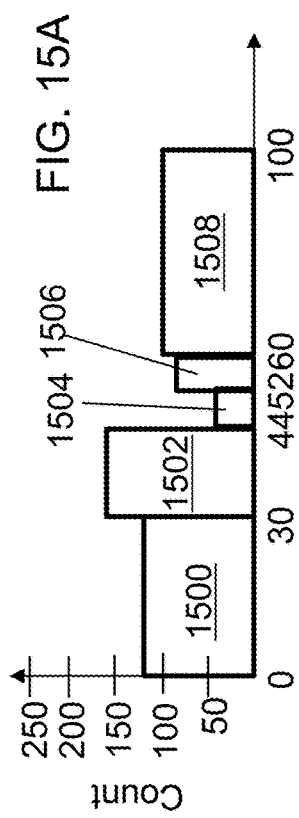
Figure 15B:
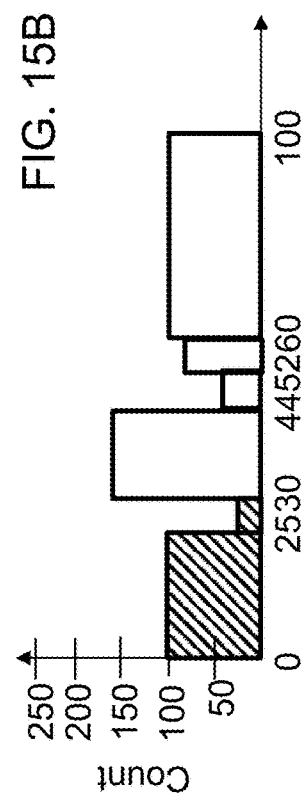

Boundaries after the $1^{st}$ update are {0, 25, 30, 44, 52, 60} with estimated counts {100, 20, 160, 40, 80, 100} as shown in FIG. 15B. Note that this is a logical representation of the bin boundaries for the purposes of illustration; the algorithm does not physically store 6 boundary values in the array of final boundaries.

Figure 15C:
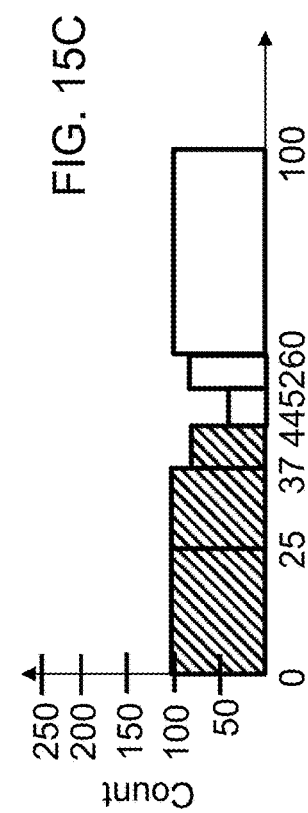

Boundaries after the $2^{nd}$ update are {0, 25, 37, 44, 52, 60} with estimated counts {100, 100, 80, 40, 80, 100} as shown in FIG. 15C.

Boundaries after the $3^{rd}$ update are {0, 25, 37, 48, 52, 60} with estimated counts {100, 100, 100, 20, 80, 100} as shown in FIG. 15D.

Boundaries after the $4^{th}$ and final update are {0, 25, 37, 48, 60} with estimated counts {100, 100, 100, 100, 100} as shown in FIG. 15E.

Iteration 3: Calculate the actual counts for the updated bin boundaries {0, 25, 37, 48, 60}. Let those bin counts be {115, 105, 80, 100, 100}. The chi-squared test statistic is (225+25+400+0+0)/100=6.5. The p-value for 4 degrees of freedom is approximately 0.1648, which is greater than $p_{min}$. The difference between the proportions of the largest and smallest bins is D=(115−80)/500=0.07. Because e*a=0.1 and D<e*a, convergence has been attained, and the final set of bin boundaries for the specified set of tuning parameters is {0, 25, 37, 48, 60} as shown in FIG. 15E.

Figure 9:
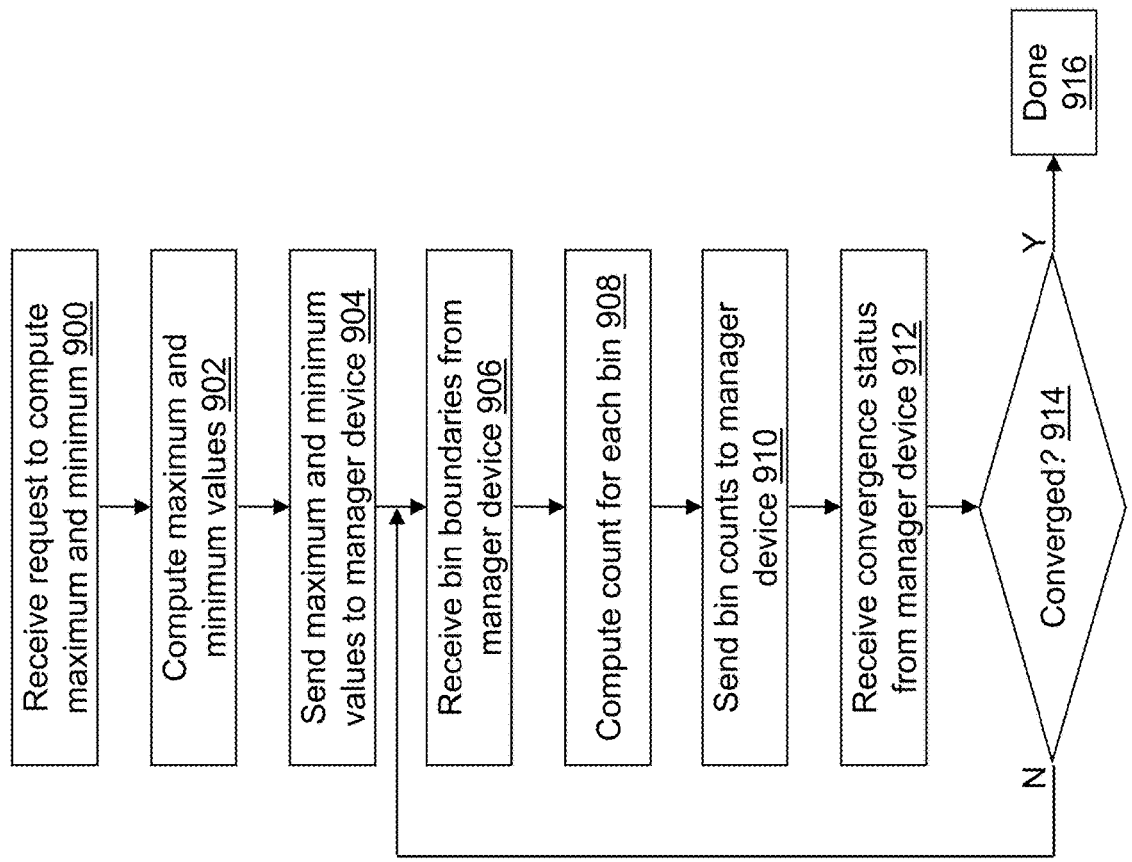
FIG. 9 depicts a flow diagram illustrating examples of operations performed by the worker device of FIG. 4 in computing in parallel an empirical distribution function performing in accordance with an illustrative embodiment.

Referring to FIG. 9, example operations associated with worker application 412 in performing parallel EDF estimation are described. Additional, fewer, or different operations may be performed depending on the embodiment. The order of presentation of FIG. 9 is not intended to be limiting.

In an operation 900, a request to compute a maximum sample value and a minimum sample value is received, for example, as a result of operation 727.

In an operation 902, the maximum sample value and the minimum sample value is computed from the sample such as the outcome expectation measure values by reading each value of the sample.

In operation 904, the computed maximum sample value and minimum sample value are sent to manager device 104.

In an operation 906, bin boundaries are received from manager device 104, for example, as a result of operation 731.

In an operation 908, a count is computed within the bin boundaries.

In operation 910, the computed count for each bin is sent to manager device 104.

In an operation 912, a convergence status is received from manager device 104, for example, as a result of operation 742.

In an operation 914, a determination is made concerning whether the convergence status indicates convergence. When the convergence status indicates convergence, processing continues in an operation 916. When the convergence status does not indicate convergence, processing continues in operation 906 to await receipt of new bin boundaries, for example, as a result of an additional iteration of operation 731.

In operation 916, parallel binning by each worker device is complete.

Referring to FIG. 10, example operations associated with worker application 412 in performing parallel equal proportion binning are described. Additional, fewer, or different operations may be performed depending on the embodiment. The order of presentation of the operations of FIG. 10 is not intended to be limiting.

In an operation 1000, a bin to worker mapping is received from manager device 104, for example, as a result of operation 756.

In an operation 1002, a request to create sampled buffers is received.

In an operation 1004, sampled buffers are created.

In an operation 1006, the sampled buffers are sent to manager device 104.

In an operation 1008, a request to compute bins for the assigned region(s) is received from manager device 104, for example, as a result of operation 759.

In an operation 1010, a determination is made concerning whether a plurality of regions has been assigned to the worker device. When the plurality of regions has been assigned, processing continues in an operation 1014. When the plurality of regions has not been assigned, processing continues in an operation 1012.

In operation 1012, bin counts are computed for the assigned region, for example, using the operations of FIG. 6D, and processing continues in operation 1018.

In operation 1014, regions are assigned to threads.

In an operation 1016, each thread computes bin counts for the assigned region, for example, using the operations of FIG. 6D In operation 1018, a convergence status that results from the operations of FIG. 6D is returned to manager device 104.

In an operation 1020, a determination is made concerning whether an exact EDF is to be computed, for example, as a result of operation 767. When an exact EDF is to be computed, processing continues in an operation 1022. When an exact EDF is not to be computed, processing continues in an operation 1026.

In operation 1022, the bins boundaries are received from manager device 104, for example, as a result of operation 767.

In an operation 1024, the EDF is computed from the bin counts and returned to manager device 104, and processing continues in operation 768.

In operation 1026, a determination is made concerning whether an approximate EDF is to be computed, for example, as a result of operation 769. When an approximate EDF is to be computed, processing continues in an operation 1028. When an approximate EDF is not to be computed, processing continues in an operation 1034.

In operation 1028, the bin counts are inflated.

In an operation 1030, the approximate EDF is computed from the bins.

In an operation 1032, the EDF is returned to manager device 104, and processing continues in operation 770.

In operation 1034, the EDF is computed from the bins, for example, as a result of operation 762.

In an operation 1036, the EDF is returned to manager device 104, and processing continues in operation 763.

Referring to FIG. 16, fourth input interface 1602 provides the same or similar functionality as that described with reference to input interface 202 of user device 200 though referring to prediction device 108. Fourth output interface 1604 provides the same or similar functionality as that described with reference to output interface 204 of user device 200 though referring to prediction device 108. Fourth communication interface 1606 provides the same or similar functionality as that described with reference to communication interface 206 of user device 200 though referring to prediction device 108. Data and messages may be transferred between prediction device 108 and manager device 104 and/or user device 200 using fourth communication interface 1606. Fourth computer-readable medium 1608 provides the same or similar functionality as that described with reference to computer-readable medium 208 of user device 200 though referring to prediction device 108. Fourth processor 1610 provides the same or similar functionality as that described with reference to processor 210 of user device 200 though referring to prediction device 108.

Predictive marginal model application 1622 performs operations associated with generating the aggregate measure sample T using marginal event data 1624. Predictive marginal model application 1622, outcome expectation application 222, manager application 312, and/or worker application 412 may be the same or different applications that are integrated in various manners to compute joint probabilities data 314 and sample data 316 distributed across a plurality of computing devices that may include manager device 104 and/or worker system 106 from marginal event data 1624. Predictive marginal model application 1622, outcome expectation application 222, manager application 312, and/or worker application 412 further may compute output data 318 and/or output data subset 418 that may be distributed across the plurality of computing devices that may include manager device 104 and/or worker system 106 from joint probabilities data 314 and sample data 316.

The aggregate measure sample T may be stored in output data 318 and/or output data subset 418. Dependent on the type of data stored in marginal event data 1624, predictive marginal model application 1622 may identify estimated aggregate measures for a particular time period, for example, of a manufacturing process, of an entity such as a business with multiple lines of business, of a region due to weather events, etc. Some or all of the operations described herein may be embodied in predictive marginal model application 1622. The operations may be implemented using hardware, firmware, software, or any combination of these methods.

Referring to the example embodiment of FIG. 16, predictive marginal model application 1622 is implemented in software (comprised of computer-readable and/or computer-executable instructions) stored in fourth computer-readable medium 1608 and accessible by fourth processor 1610 for execution of the instructions that embody the operations of predictive marginal model application 1622. Predictive marginal model application 1622 may be written using one or more programming languages, assembly languages, scripting languages, etc. Predictive marginal model application 1622 may be integrated with other analytic tools. As an example, predictive marginal model application 1622 may be part of an integrated data analytics software application and/or software architecture such as that offered by SAS Institute Inc. of Cary, N.C., USA. For example, predictive marginal model application 1622 may be part of SAS® Econometrics developed and provided by SAS Institute Inc. of Cary, N.C., USA. Merely for further illustration, predictive marginal model application 1622 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA. Predictive marginal model application 1622, outcome expectation application 222, manager application 312, and/or worker application 412 may be the same or different applications that are integrated in various manners to generate the aggregate measure sample T. Predictive marginal model application 1622 may be implemented as a Web application.

Marginal event data 1624 may include a plurality of rows and a plurality of columns with the plurality of rows referred to as observations or records, and the columns referred to as variables that are associated with an observation. Marginal event data 1624 may be transposed. Marginal event data 1624 may include a frequency (count) of marginals that an marginal variable such as a line of business incurs in a particular time period and a severity (magnitude) of each marginal.

Marginal event data 1624 may be stored on fourth computer-readable medium 1608 or on one or more computer-readable media of manager device 104 and/or worker system 106 and accessed by prediction device 108 using fourth communication interface 1606. The data stored in marginal event data 1624 may be captured at different time points periodically, intermittently, when an event occurs, etc. One or more columns may include a time value.

Marginal event data 1624 may include data captured under normal operating conditions of the physical object. Marginal event data 1624 may include data captured at a high data rate such as 200 or more observation vectors per second. For example, data stored in marginal event data 1624 may be generated as part of the Internet of Things (IoT), where things (e.g., machines, devices, phones, sensors) can be connected to networks and the data from these things collected and processed within the things and/or external to the things before being stored in marginal event data 1624. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an event stream processing engine (ESPE), which may reside in the cloud or in an edge device before being stored in marginal event data 1624.

Marginal event data 1624 may be stored in various compressed formats such as a coordinate format, a compressed sparse column format, a compressed sparse row format, etc. Marginal event data 1624 further may be stored using various structures as known to those skilled in the art including a file system, a relational database, a system of tables, a structured query language database, etc. on prediction device 108 and/or on manager device 104 and/or worker system 106. Prediction device 108 and/or manager device 104 may coordinate access to marginal event data 1624 that is distributed across worker system 106. For example, marginal event data 1624 may be stored in a cube distributed across worker system 106 implemented as a grid of computers as understood by a person of skill in the art. As another example, marginal event data 1624 may be stored in a multi-node Hadoop® cluster. As another example, marginal event data 1624 may be stored in worker system 106 implemented as a cloud of computers and accessed using cloud computing technologies, as understood by a person of skill in the art. The SAS® LASR™ Analytic Server and/or SAS® Viya™ may be used as an analytic platform to enable multiple users to concurrently access data stored in marginal event data 1624.

Referring to FIG. 17, example operations of predictive marginal model application 1622 are described. Additional, fewer, or different operations may be performed depending on the embodiment of predictive marginal model application 1622. The order of presentation of the operations of FIG. 17 is not intended to be limiting. Although some of the operational flows are presented in sequence, the various operations may be performed in various repetitions, concurrently (in parallel, for example, using threads and/or a distributed computing system), and/or in other orders than those that are illustrated. Predictive marginal model application 1622 may establish the session with user device 200 and/or manager device 104 such that prediction device 108 accepts commands from a user and relays instructions to user device 200 and/or manager device 104.

In an operation 1700, an eighth indicator may be received that indicates marginal event data 1624. For example, the eighth indicator indicates a location and a name of marginal event data 1624. As an example, the eighth indicator may be received by predictive marginal model application 1622 after selection from a user interface window or after entry by a user into a user interface window. In an alternative embodiment, marginal event data 1624 may not be selectable. For example, a most recently created dataset may be used automatically.

In an operation 1702, a ninth indicator may be received that indicates a frequency model. As an example, the frequency model may be selected from different parametric families. The frequency model may be labeled or selected in a variety of different manners by the user as understood by a person of skill in the art. In an alternative embodiment, the frequency model may not be selectable, and a single frequency model is implemented in predictive marginal model application 1622. For illustration, a parametric model that includes a discrete probability distribution has a fixed set of parameters. The frequency model may include regression parameters that measure an impact of external factors on a location or shape of the discrete probability distribution.

In an operation 1704, a plurality of frequency models is generated.

In an operation 1706, a tenth indicator may be received that indicates a severity model. As an example, the severity model may be selected from an individual parametric family or a mixture of parametric families. The severity model may be labeled or selected in a variety of different manners by the user as understood by a person of skill in the art. In an alternative embodiment, the severity model may not be selectable, and a single severity model is implemented in predictive marginal model application 1622. For illustration, a parametric model that includes a discrete probability distribution has a fixed set of parameters. The severity model may include regression parameters that measure an impact of external factors on a location or shape of the continuous probability distribution.

In an operation 1708, a plurality of severity models is generated.

In an operation 1708, a plurality of compound distribution models is generated from the generated frequency and severity models. For illustration, the compound distribution model (CDM) simulates the total severity of events that can occur in a particular time period. Here, the total severity of events is a marginal random variable. The frequency and severity models are combined to generated the CDM. Because of the possibly complex nature of the frequency and severity distributions, the CDM often cannot be encoded in a concise parametric form. Hence, it is usually estimated by simulating a large empirical sample of the total severity for one set of frequency and severity parameters. To analyze the effect of uncertainty in the frequency and severity parameter, multiple sets of frequency and severity parameters are generated by using a multivariate probability distribution of the parameters, and one aggregate marginal sample is generated for each such set. This process is referred to as parameter perturbation analysis results and it results in multiple samples of the total severity. For a parallel and distributed system that includes $N_w$ worker nodes, if the number of perturbed parameter sets is K, such that $N_w \geq K$, each worker node generates approximately W/K samples of the total severity. For further discussion, refer to US Patent Publication No. 2018/0060470 titled TECHNIQUES FOR ESTIMATING COMPOUND PROBABILITY DISTRIBUTION BY SIMULATING LARGE EMPIRICAL SAMPLES WITH SCALABLE PARALLEL AND DISTRIBUTED PROCESSING, filed Nov. 7, 2017, and assigned to the assignee of the present application and which is hereby incorporated herein by reference.

In an operation 1712, sample data 316 and/or each sample data subset 418 is output from the generated plurality of compound distribution models. For illustration, U.S. Pat. No. 9,563,725, assigned to the assignee of the present application, describes operations 1700 to 1712.

In an operation 1714, joint probabilities data 314 is output from the generated plurality of compound distribution models. Joint probabilities data 314 may be computed using a copula model that decouples a dependency structure from the probability distributions of individual marginal variables and enables simulation of joint probabilities.

In an operation 1716, the outcome expectation measure values are computed, for example, by executing outcome expectation application 222.

To illustrate the advantages of the described processes of FIGS. 6A to 6E, 7A and 7B, 8, 9, 10A, and 10B, both sequential and parallel versions of the algorithm were implemented and compared against a standard, existing algorithm that represents the EDF by the sorted set of all values in the input data sample. Because the standard algorithm uses the full input data to represent the EDF estimate, the algorithm is referred to as the "FULL" algorithm in the subsequent discussion and results. The steps of the FULL algorithm are, if running on a plurality of worker devices with a distributed input data sample, gather all of sample data subsets 418 on manager device 104 and load the entire sample data 316 in memory. The loaded sample data 316 is sorted, which represents the EDF estimate.

The three algorithms were compared for the task of using the EDF estimates for computing a large number of percentiles for a data table stored in joint probabilities data 314 that contains joint probabilities of marginal variables, where each marginal variable can be thought of as one of the set of random variables that depend on each other through some dependency structure such as a copula. Joint probabilities data 314 referred to as table J in the subsequent discussion. Sample data 316 includes large tables that contain empirical samples of the marginal variables with one table per marginal variable.

The term "large table" refers to a table that contains a large number of rows. The goal of the task is to compute the percentile for each value of the marginal probability in the table J by using the respective marginal sample. The percentiles that are computed for the probabilities in each row of table J are added and stored in a table T. Table T essentially contains a sample of the random variable that represents the sum of the marginal variables. The table T is further analyzed to compute a certain number of percentiles, which essentially requires estimation of the EDF for the values in T.

The motivation to use this task for comparing the algorithms comes from ECM, which estimates the distribution of the aggregate measure that is incurred across multiple, dependent lines of business (marginal variable). In the ECM application, the marginal in a particular time interval for each marginal variable constitutes a marginal variable, table J represents a simulation of the joint marginal probabilities from a copula model that models the dependency structure among the marginal variables, and the table T represents a sample of the aggregate measure expected across all marginal variables. Percentiles for various levels of aggregate measure values in table T represent the value-at-outcome expectation (VaR) and those percentiles are further used to estimate the tail value-at-outcome expectation (TVaR), which is the average of the aggregate measure values that exceed a given VaR value.

In the experimental setup, there are two marginal variables, CB and RB. For each marginal variable, multiple samples of size S were generated from the estimated probability distribution of that marginal variable. The experiment used five distinct values of S: 1,000,000, 2,000,000, 5,000,000, 10,000,000, and 20,000,000. The size of the table J that contains the joint marginal probabilities was fixed to N=5,000,000 rows. The experiment varied the number of worker nodes of the grid, $N_w$, from 1 to 16. For a single worker device 400 setup ($N_w$=1), the experiment used the sequential EDF estimation processing method, which in turn uses the sequential equal proportion binning process. For $N_w$>1, the experiment used the parallel EDF estimation processing method, which in turn used both the sequential and parallel equal proportion binning processes. In each experiment, each marginal sample as well as the table J were distributed equitably among the $N_w$ nodes such that each node had approximately $S/N_w$ rows of each marginal's table and approximately $N/N_w$ rows of the table J. To use the FULL algorithm for $N_w$>1, all tables had to be brought over to a single node so that the percentiles could be computed from an in-memory copy of the full sample. To use the parallel EDF estimation processing method for $N_w$>1, after the algorithm computed the EDF estimates of both marginals, those estimates were copied to all nodes so that the percentile computations could be done in parallel for the distributed rows of table J meaning table J was not moved across worker system 106.

The experiment used the following settings and tuning parameters:
  Two regions, such that the desired CDF value at the end of the first region was 0.8 ($P_1$=0.8). For such two-region problems, typically the first region ($F(v) \le P_1$) is referred to as the body region and the second region ($F(v) > P_1$) is referred to as the tail region.
  Desired accuracy levels in the two regions were set to {1.0E-5, 1.0E-6}.
  Sampling fractions for regions (used when $N_w$>1): {0.7, 1.0} for S>1,000,000.
  For S=1,000,000, {0.8,1.0}
  Equal proportion binning algorithm parameters:
  e (acceptable tolerance in the EDF accuracy)=0.75
  $p_{min}$ (minimum p-value to be achieved to confirm uniformity of the bin count distribution)=0.8
  Uniformity test: chi-squared test
  l (maximum number of iterations)=50
  ln (maximum number of iterations for which the convergence criterion is allowed to deteriorate)=5
  m (minimum expected number of observations per bin)=5

The FULL algorithm computes the exact EDF estimates because it uses the full sample. The goal of the sequential EDF estimation processing method and the parallel EDF estimation processing method is to essentially compute approximate EDF estimates by compressing the full sample into a much smaller set of bin boundaries and bin counts to achieve space as well as runtime reduction. However, this approximation should not be at the cost of the accuracy of the quantities, such as percentiles, that are computed by using these EDF estimates. As a results, the accuracy of the algorithms was evaluated. One way to do that is to compare the distribution of the percentiles that are computed using the sequential EDF estimation processing method and the parallel EDF estimation processing method with the distribution of the percentiles that are computed by using the FULL algorithm. The experiment used four different statistical tests: Kolmogorov-Smirnov test, Kuiper's test, one-way ANOVA, and Conover's two-sample test. For each test, a p-value was computed for the null hypothesis that the distributions are equal, where the definition of equality depends on the statistical test. The Kolmogorov-Smirnov and Kuiper's tests compare the equality of the EDF of the distributions (note that this is the full EDF, not approximated, of the set of percentiles that each method computed). The ANOVA test checks the equality of means of the distributions, and the Conover's test checks the equality of means and variances. For any test, a p-value larger than some significance level implies failure to reject the null hypothesis. This experiment used a significance level of 0.05, which means the p-value for each test needs to be larger than 0.05 to conclude that the distribution of percentiles that are computed by using the sequential EDF estimates and the parallel EDF estimates is statistically indistinguishable from the distribution of percentiles that are computed by using the FULL method's exact EDF estimates. For the combination of S=5,000,000 and $N_w$=4, the results of the statistical tests comparing the percentiles of the CB marginal variable are shown in FIGS. 18A to 18H. The sample of percentiles that are computed by the parallel EDF estimation processing method is denoted by "2STG" in these and all subsequent results. The p-values of all tests are significantly larger than 0.05, which confirms that the parallel EDF estimates generated by the the parallel EDF estimation processing method result in statistically accurate percentiles.

Referring to FIG. 19, an ANOVA box-plot is shown that compares the percentile distributions visually, confirming the results in the ANOVA table where a first box plot 1900 was generated using the FULL method, and a second box plot 1902 was generated using the parallel EDF estimation processing method.

The tuning parameters play a role in ensuring the accuracy of the parallel EDF estimates. As an illustration, if the region accuracy requirements were lowered to {1.0E-3, 1.0E-4} for the combination of S=5,000,000 and $N_w$=4, the statistical tests yield lower p-values, which means that the distribution of percentiles that are computed by using the parallel EDF estimates is statistically different than the distribution of percentiles that are computed by using the exact EDF estimates of the FULL algorithm. The results in FIGS. 20A to 20H illustrate this.

Figure 21:
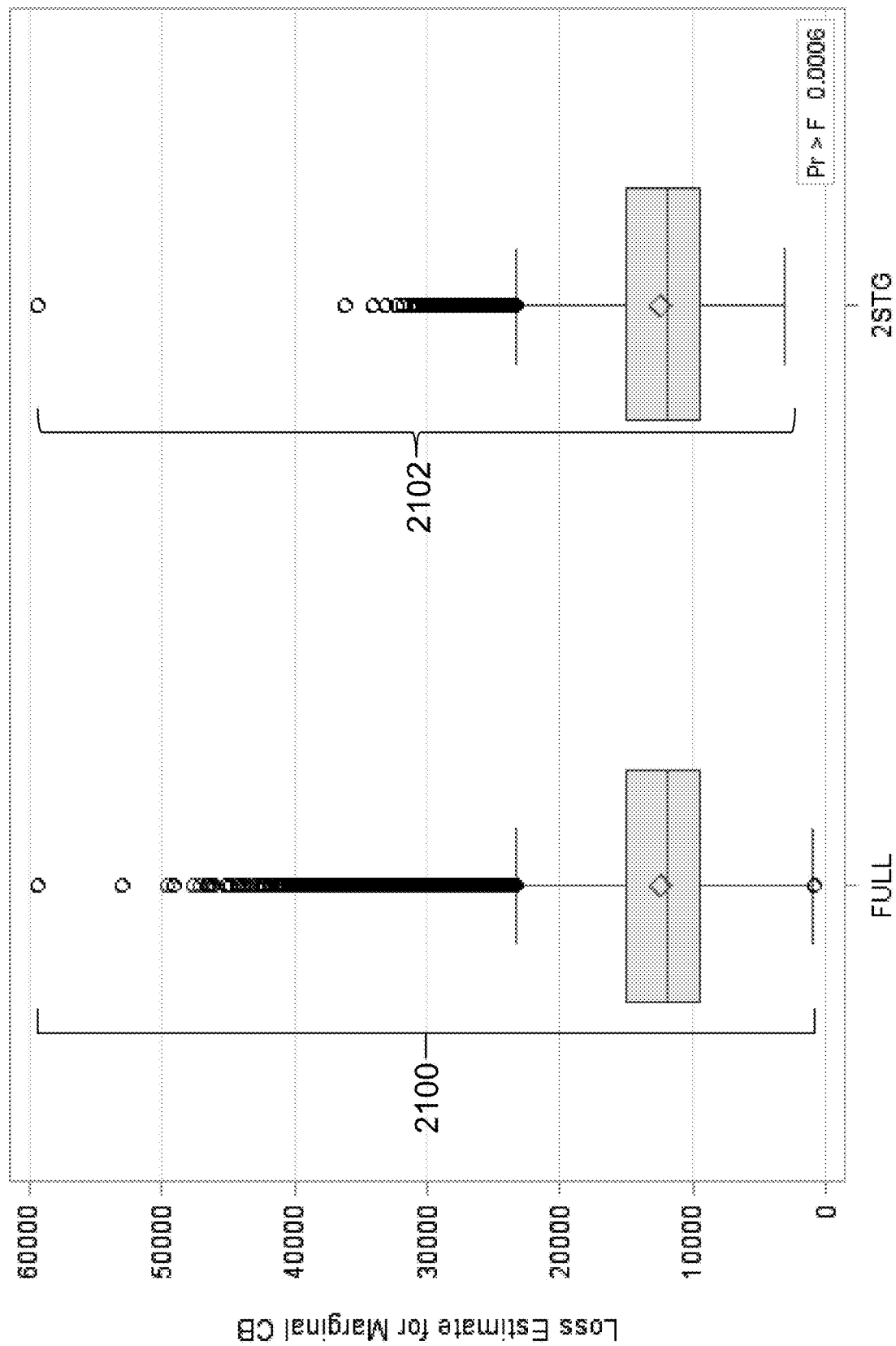
FIG. 21 provides a second box plot for comparison between the described system and the existing system in accordance with an illustrative embodiment.
Figure 22A:
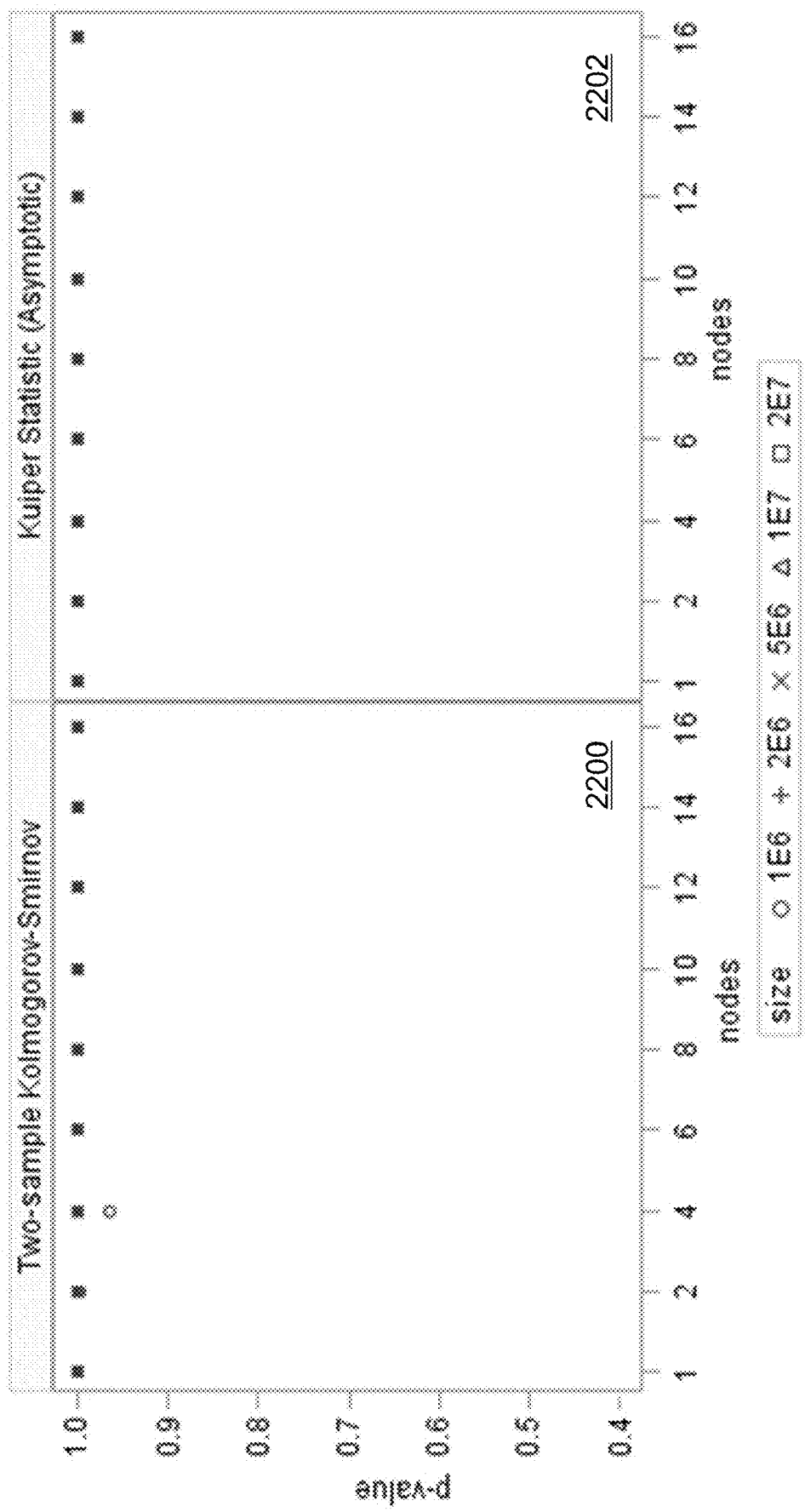
FIGS. 22A to 22B provide graphs comparing the percentile distribution between the described system and the existing system in accordance with an illustrative embodiment.
Figure 22B:
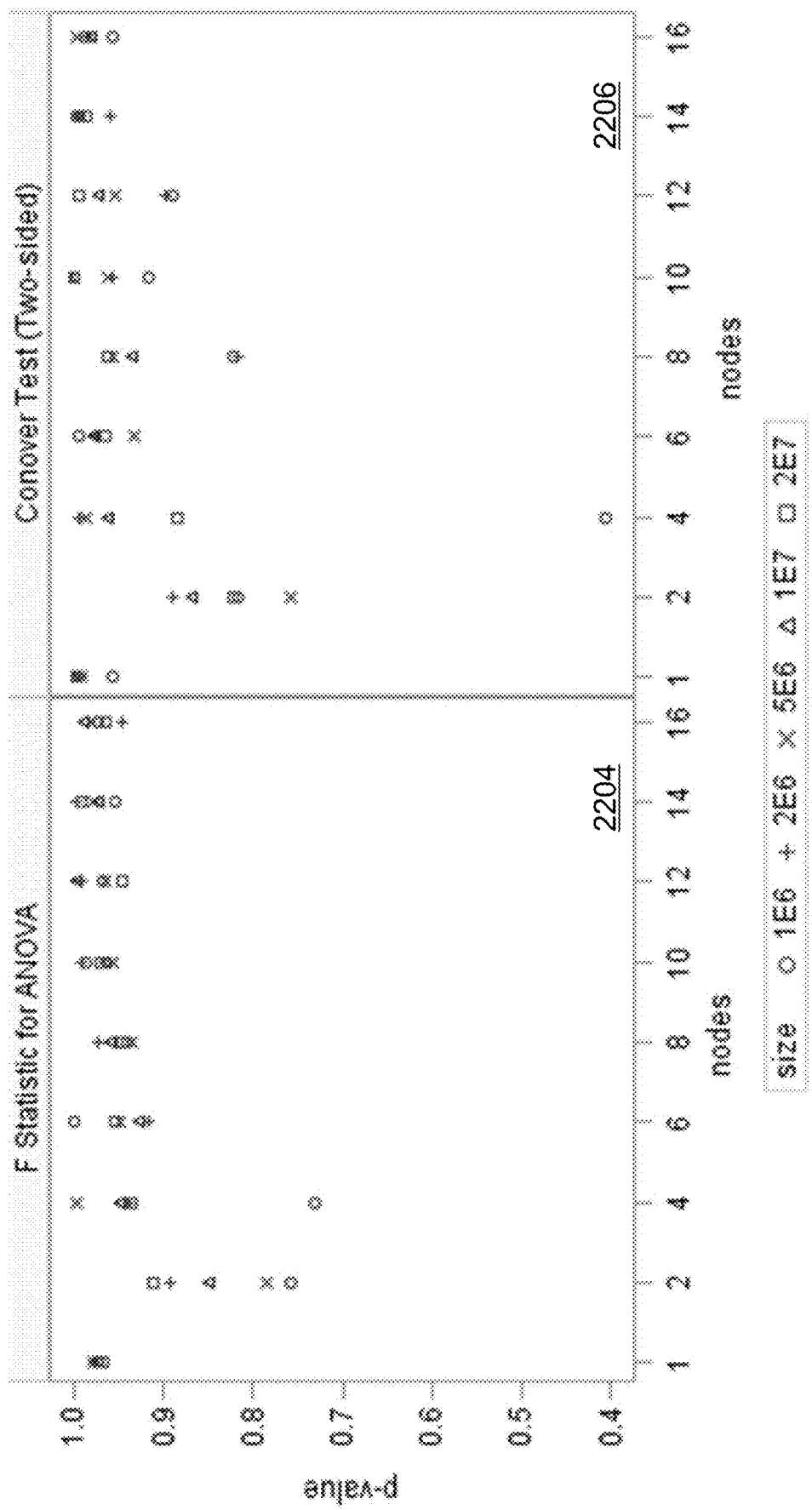
Figure 23A:
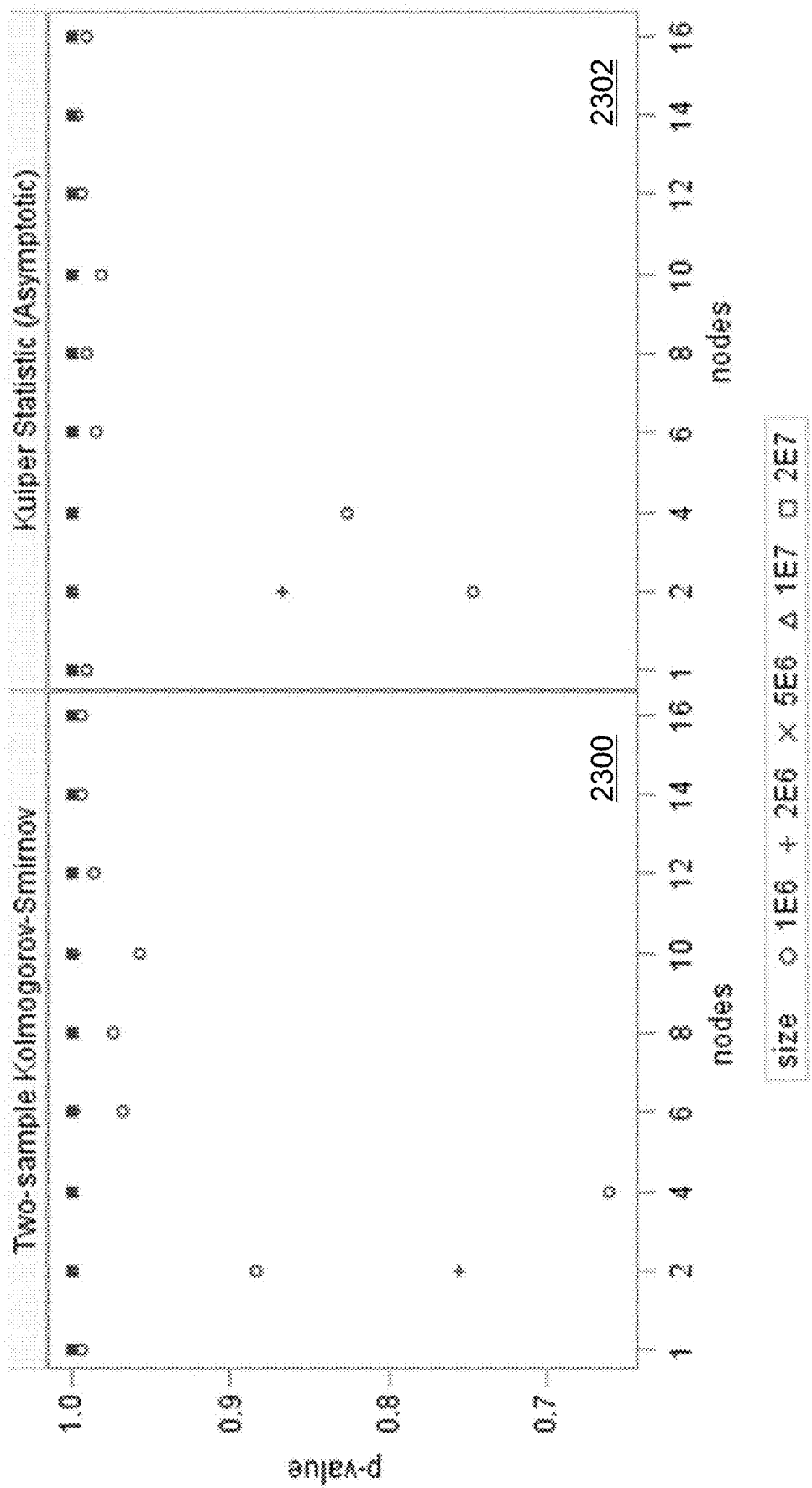
FIGS. 23A to 23B provide graphs comparing the percentile distribution between the described system and the existing system in accordance with an illustrative embodiment.
Figure 23B:
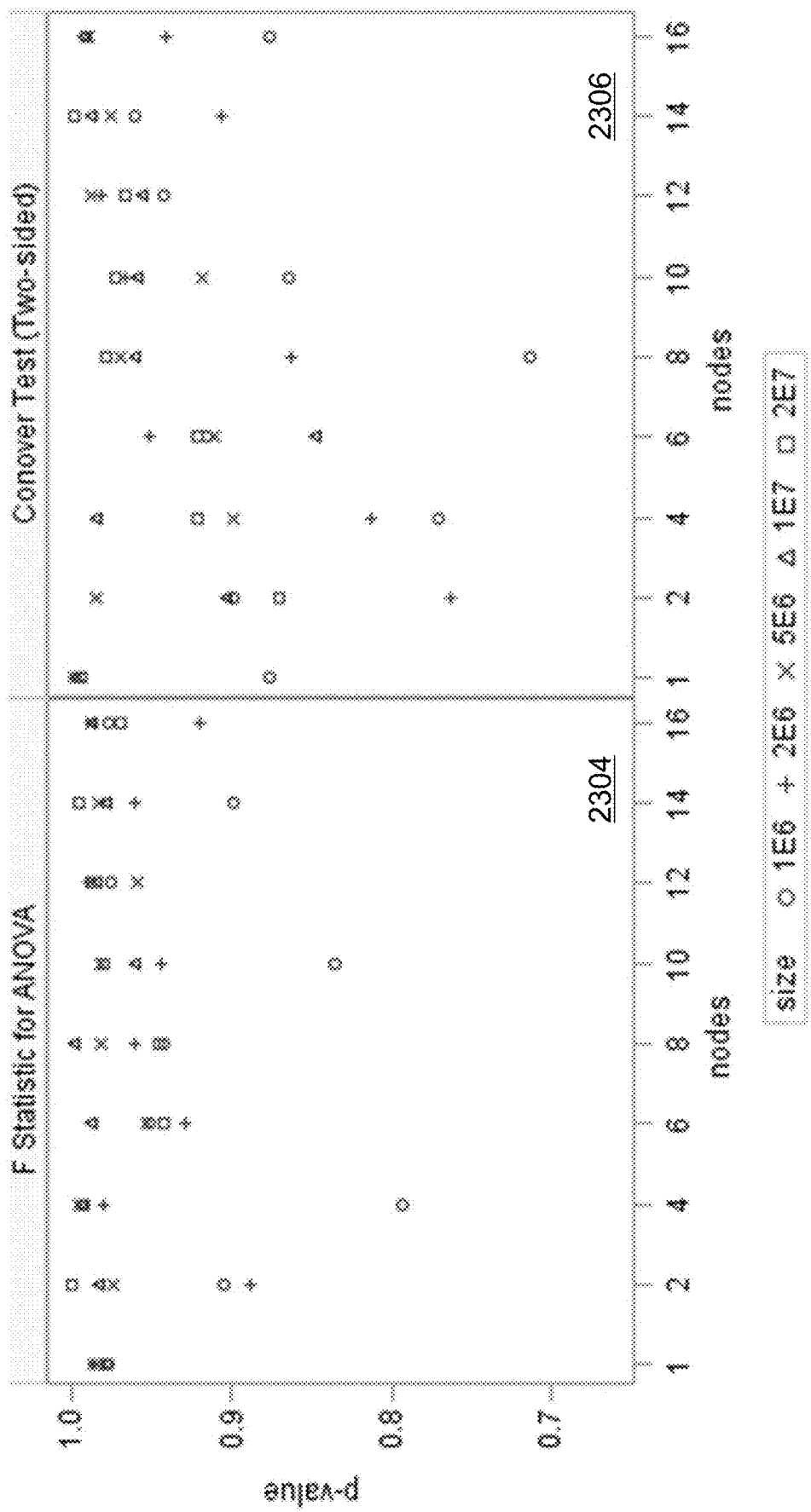
Figure 24A:
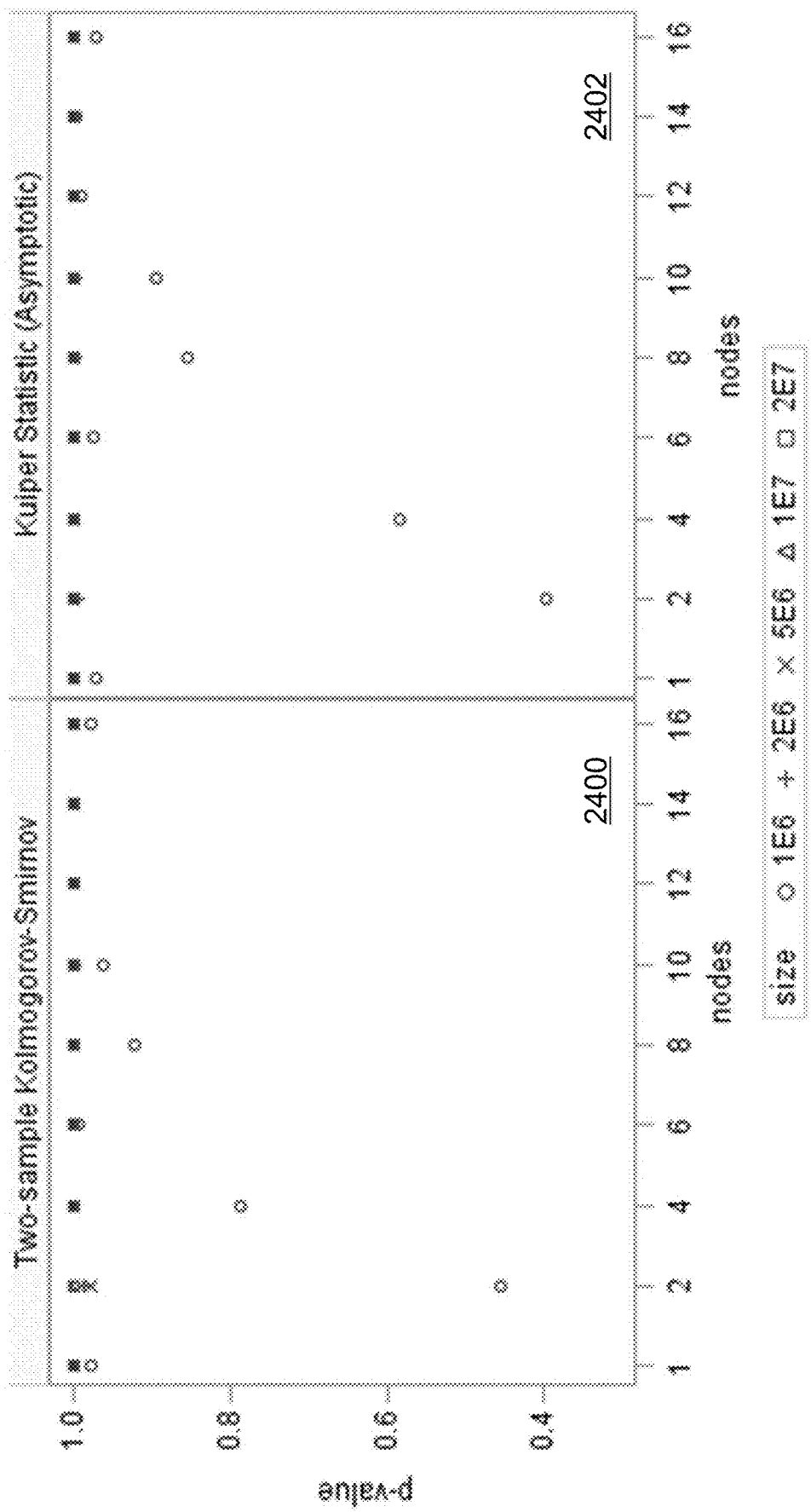
FIGS. 24A to 24B provide graphs comparing the percentile distribution between the described system and the existing system in accordance with an illustrative embodiment.
Figure 24B:
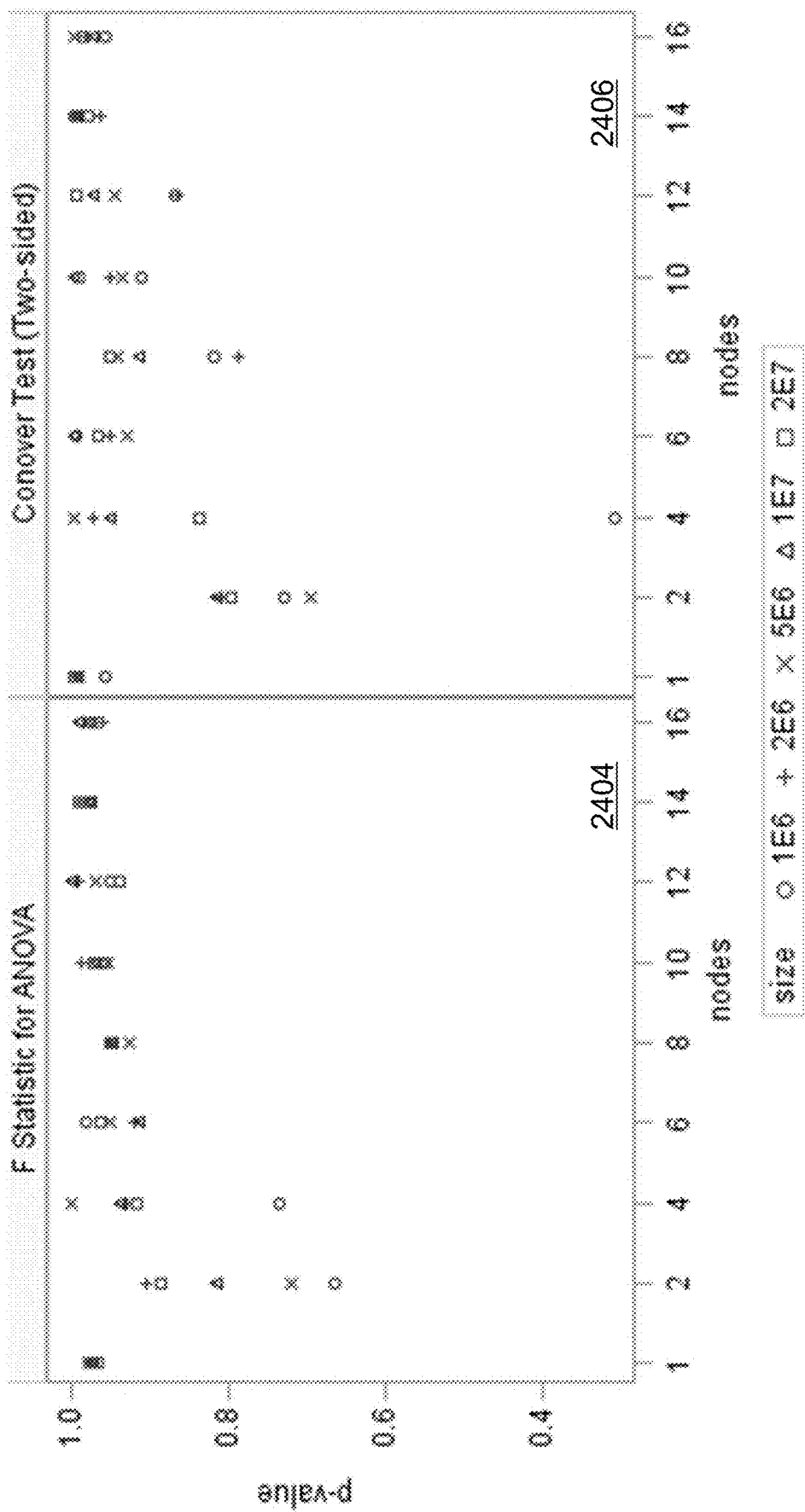

Referring to FIG. 21, an ANOVA box-plot is shown that compares the percentile distributions visually, confirming the results in the ANOVA table where a third box plot 2100 was generated using the FULL method, and a fourth box plot 2102 was generated using the parallel EDF estimation processing method with the region accuracy requirements lowered to {1.0E-3, 1.0E-4} for the combination of S=5,000,000 and $N_w$=4.

For the original region accuracy settings of {1.0E-5, 1.0E-6}, the experiment computed p-values for various combinations of S and $N_w$ for percentile computations of all three random variables, aggregate measure (CB+RB), RB, and CB, results of which are shown in FIGS. 22A to 22B, FIGS. 23A to 23B, and FIGS. 24A to 24B, respectively. All plots show that p-values for all combinations of S and $N_w$ are significantly larger than 0.05, which confirms that both sequential and parallel versions yield statistically accurate EDF estimates, where the results for nodes=1 used the sequential EDF estimate.

The experiment also compared two key resources: the amount of time it takes for an algorithm to complete and the amount of data that needs to be moved across worker devices 400 of worker system 106. For each algorithm, the reported runtime included the following times:

The time to compute the EDF estimates of two marginal variables, CB and RB. For the FULL method, this was the time to perform an in-memory quick-sort of each marginal's sample, because sorted full data sample represents the full EDF estimate. For the sequential EDF estimation processing method and the parallel EDF estimation processing method, this involved the iterative two-stage process of binning the sample of size S for each marginal variable as described in the invention.

The time to copy the EDF estimates of CB and RB to the worker device 400 that require those estimates for percentile computations. For the FULL method, only manager device 104 performed percentile computations, so the full sample of each marginal was copied to manager device 104 and the table J is also copied to manager device 104. For the sequential EDF estimation processing method and the parallel EDF estimation processing method, the compressed representation of the EDF estimate was copied to all worker devices 400, but the table J was not moved.

The time to compute the percentiles for all the probability values in the table J by using the EDF estimates of respective marginal variables. With two marginal variables, total of 2*N percentiles were computed for N rows (note that the experiment used N=5,000,000).

The time to compute the EDF from the N-sized sample of aggregate measure (sum of the percentiles of the marginals).

The time to compute 10 different percentiles of the aggregate measure, of which the 90th, 95th, 97.5th, 99th, and 99.5th percentiles represent the five value-at-outcome expectation (VaR) estimates of interest.

The time to compute tail value-at-outcome expectation (TVaR) for the five VaR values.

Figure 25:
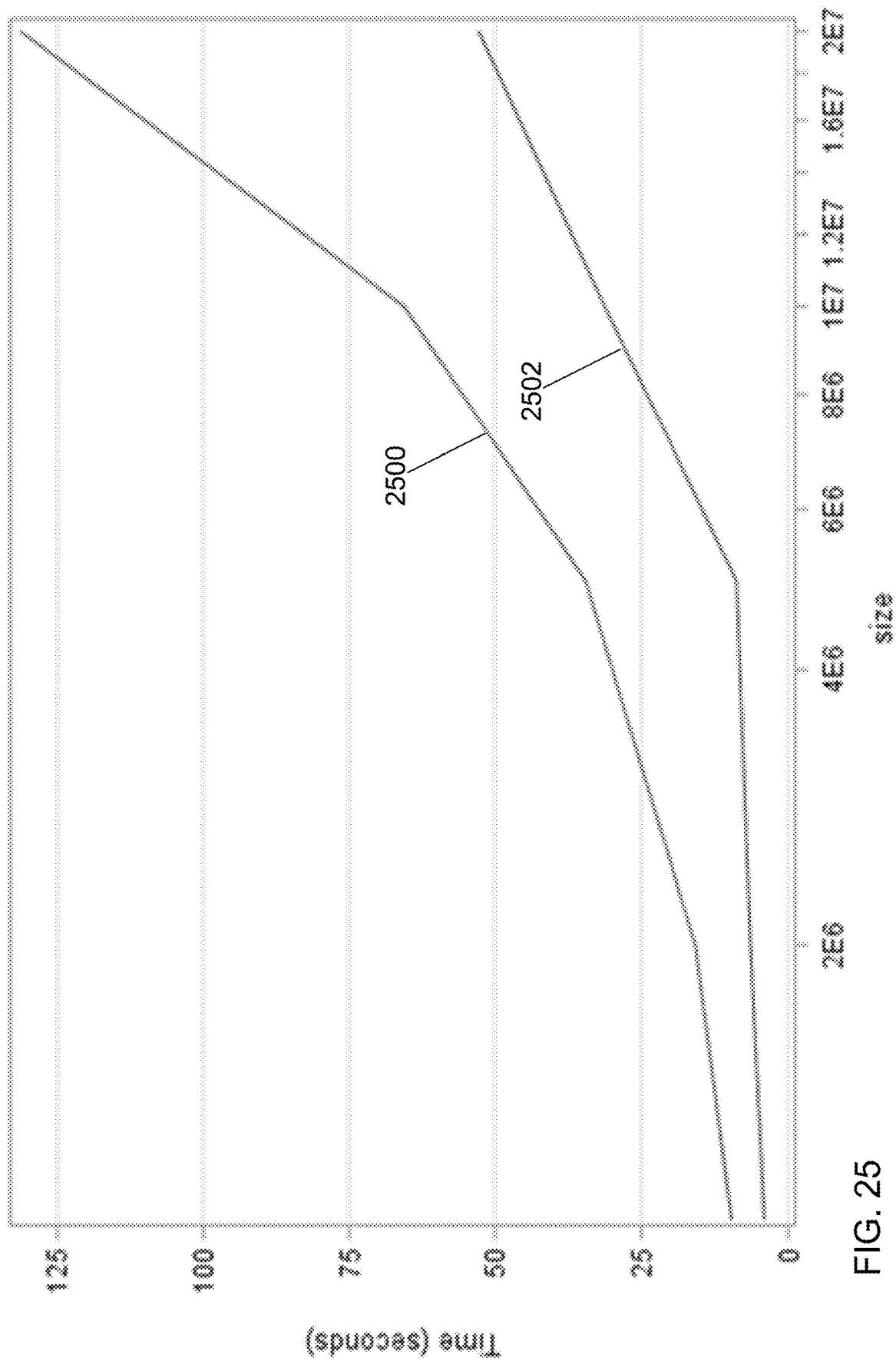
FIG. 25 provides a runtime comparison between the described sequential system and the existing system in accordance with an illustrative embodiment.

The timing results for $N_w$=1, which compare the speed of the sequential EDF estimation processing method to the FULL algorithm is shown in FIG. 25 for various values of marginal sample size S. A first curve 2500 indicates the runtime using the FULL method. A second curve 2502 indicates the runtime using the sequential EDF estimation processing method. The plots show that sequential EDF estimation processing method runs significantly faster than the FULL algorithm, and the difference in runtimes grows as S becomes larger.

Figure 26:
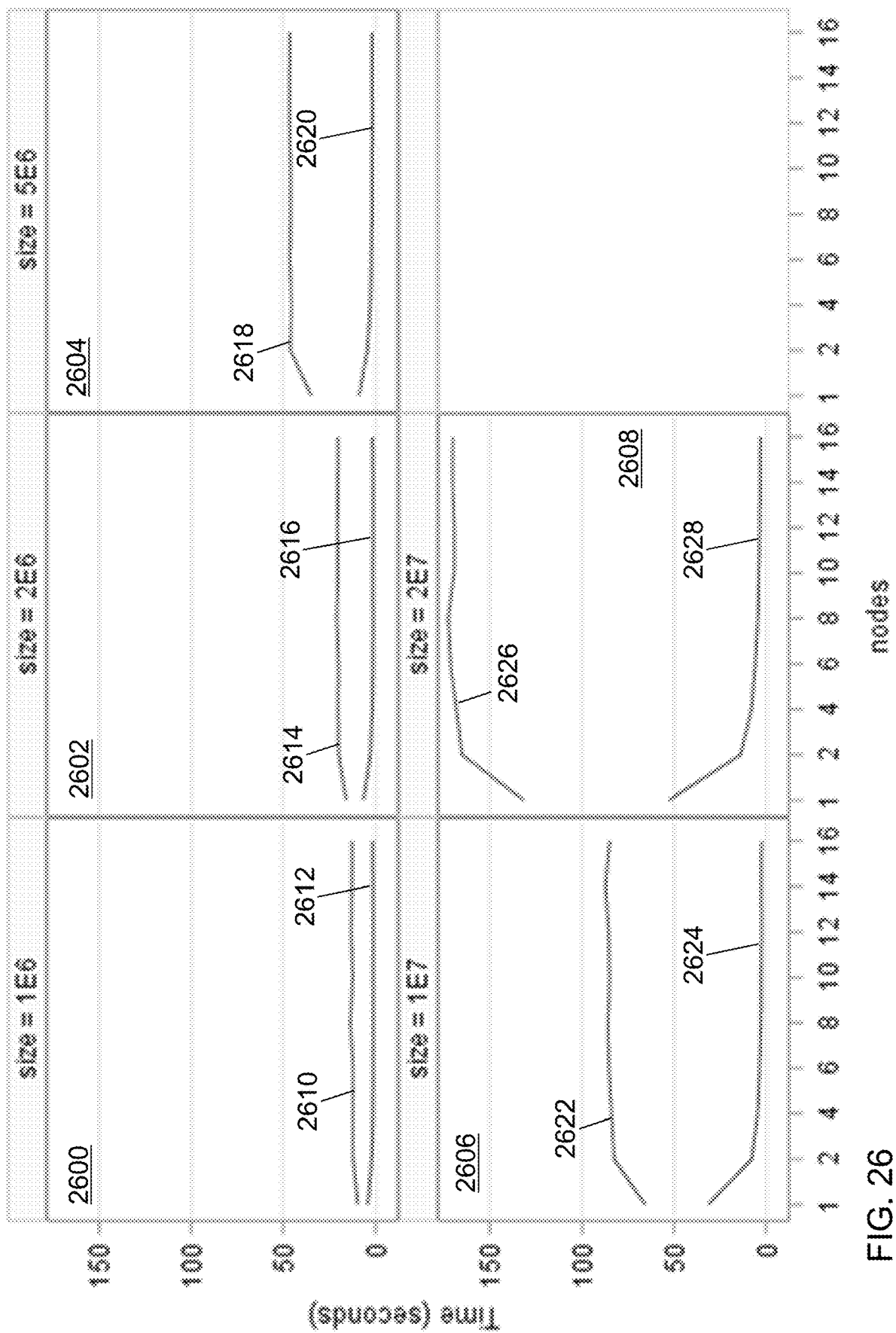
FIG. 26 provides a runtime comparison between the described parallel system and the existing system in accordance with an illustrative embodiment.

The timing results for multiple values of $N_w$ for different sizes of sample data 316 are shown in FIG. 26. A first graph 2600 shows a first "FULL" runtime curve 2610 using the FULL method and a first "Parallel/Sequential" runtime curve 2612 using the sequential EDF estimation method for $N_w$=1 and using the parallel EDF estimation method for $N_w$>1 for a size of sample data 316 of 1E6. A second graph 2602 shows a second "FULL" runtime curve 2614 using the FULL method and a second "Parallel/Sequential" runtime curve 2616 using the sequential EDF estimation method for $N_w$=1 and using the parallel EDF estimation method for $N_w$>1 for a size of sample data 316 of 2E6. A third graph 2604 shows a third "FULL" runtime curve 2618 using the FULL method and a third "Parallel/Sequential" runtime curve 2620 using the sequential EDF estimation method for $N_W$=1 and using the parallel EDF estimation method for $N_w$>1 for a size of sample data 316 of 5E6. A fourth graph 2606 shows a fourth "FULL" runtime curve 2622 using the FULL method and a fourth "Parallel/Sequential" runtime curve 2624 using the sequential EDF estimation method for $N_w$=1 and using the parallel EDF estimation method for $N_w$>1 for a size of sample data 316 of 1E7. A fifth graph 2608 shows a fifth "FULL" runtime curve 2626 using the FULL method and a fifth "Parallel/Sequential" runtime curve 2628 using the sequential EDF estimation method for $N_W$=1 and using the parallel EDF estimation method for $N_w$>1 for a size of sample data 316 of 2E7. All plots show that the parallel EDF estimation processing method is significantly faster than the FULL algorithm for all combinations of S and $N_w$ and the difference in their runtimes grows as S and $N_w$ become larger.

Figure 27:
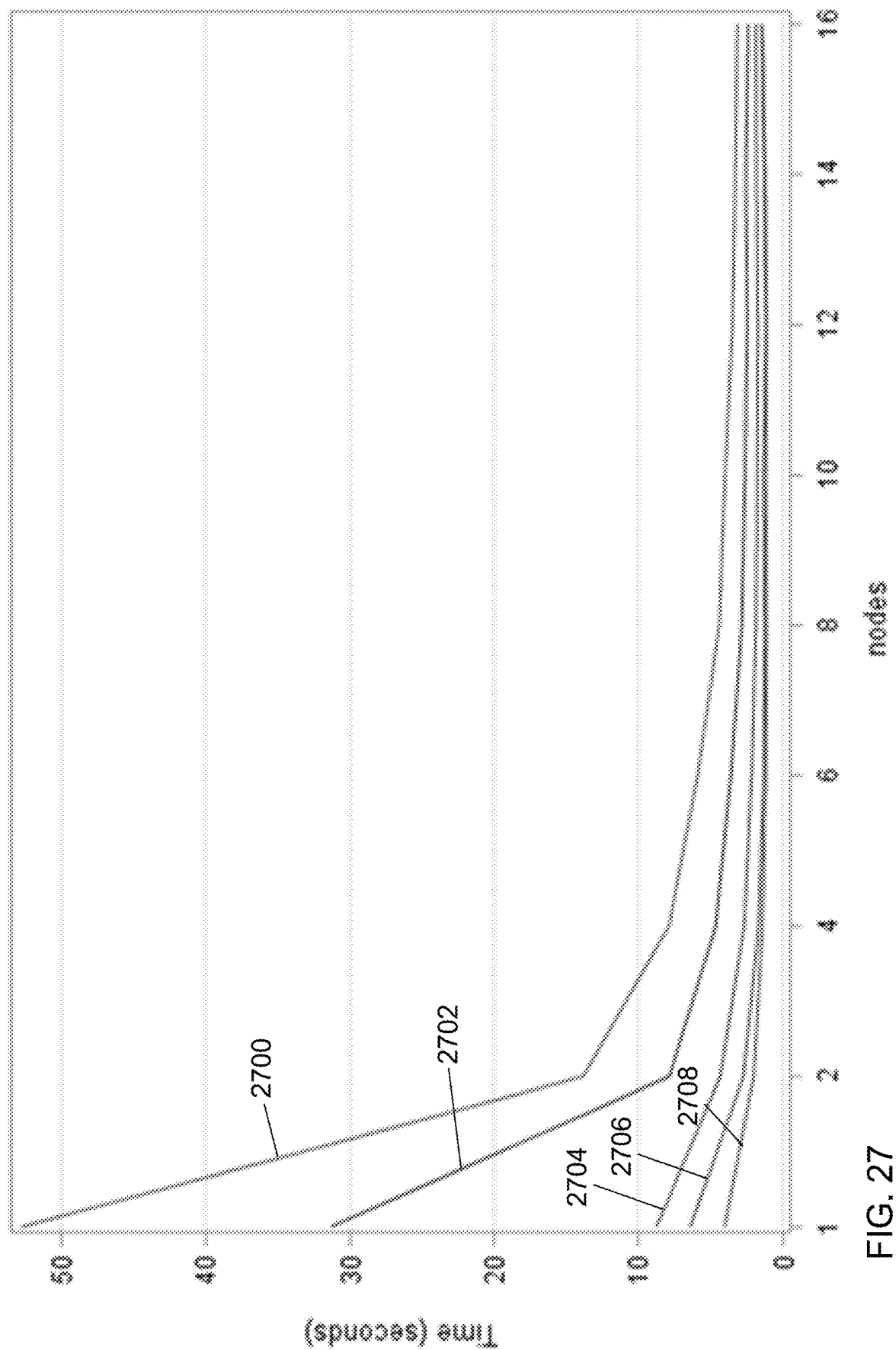
FIG. 27 presents runtime scalability results for the described parallel system in accordance with an illustrative embodiment.

Scalability of the parallel EDF estimation processing method with increasing values of $N_w$ is illustrated in FIG. 27, which shows that the larger the sample size the greater the benefit of using a larger number of worker devices 400 to reduce the runtime. A first runtime curve 2700 shows the runtime for a size of sample data 316 of 2E7. A second runtime curve 2702 shows the runtime for a size of sample data 316 of 1E7. A third runtime curve 2704 shows the runtime for a size of sample data 316 of 5E6. A fourth runtime curve 2706 shows the runtime for a size of sample data 316 of 2E6. A fifth runtime curve 2708 shows the runtime for a size of sample data 316 of 1E6. For smaller sample sizes, the runtime saturates at some value of $N_w$ and might even grow, because the communication overhead dominates the actual (CPU-bound) computations as $N_w$ increases. This is typical of most parallel algorithms.

Figure 28:
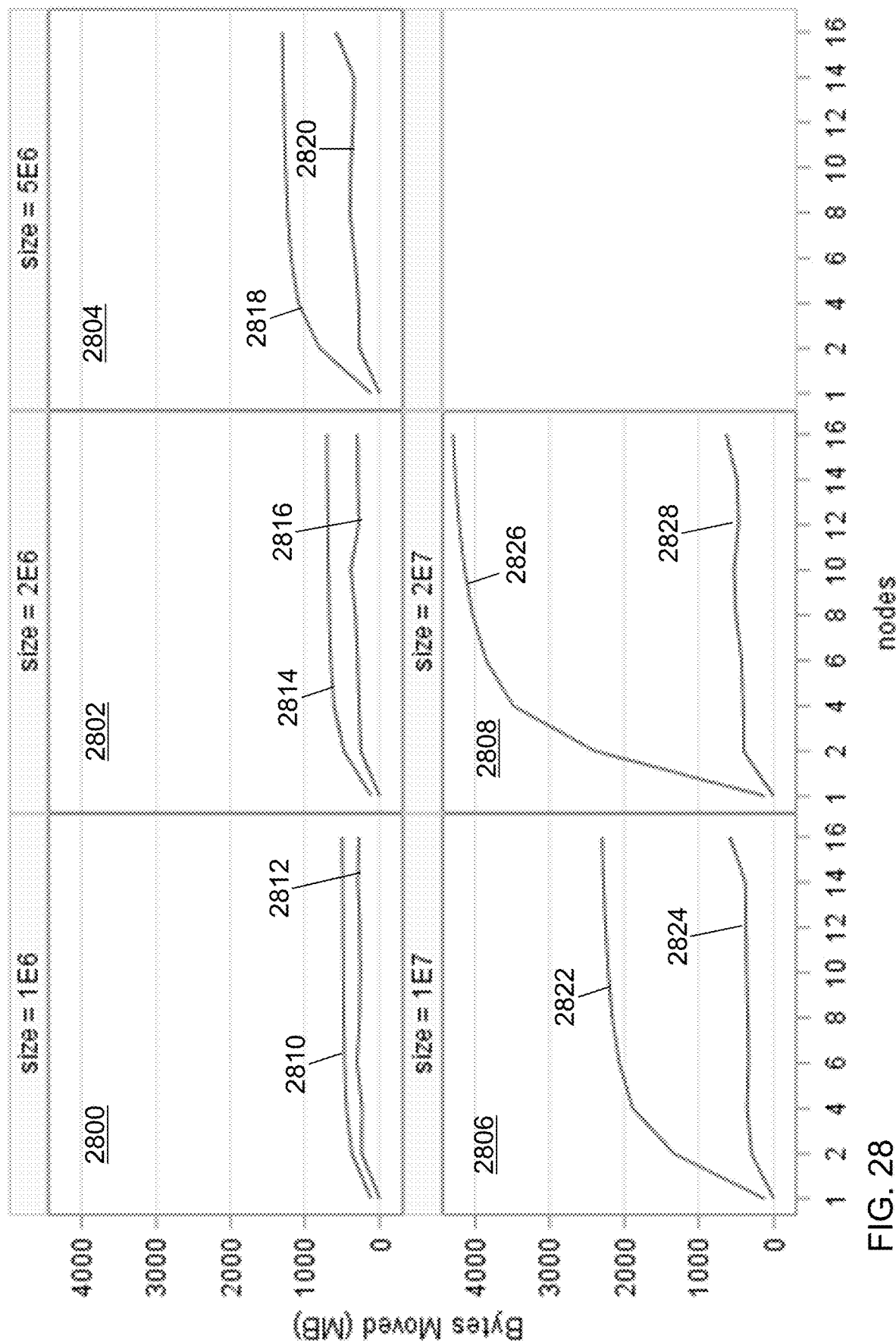
FIG. 28 provides a data movement comparison between the described parallel system and the existing system in accordance with an illustrative embodiment.

The experiment also compared the amount of data that each algorithm moved across worker devices 400 of worker system 106 because this data movement can be expensive. For the sequential EDF estimation processing method ($N_w=1$), there was no data movement. However, as $N_w$ increases, some data was moved across the network. The data movement for the FULL algorithm included gathering rows of all tables, marginal tables as well as the table J, on manager device 104. Referring to FIG. 28, the amount of data movement in bytes moved in megabytes is shown for different values of $N_w$ and of the size of sample data 316.

A sixth graph 2800 shows a sixth "FULL" bytes moved curve 2810 using the FULL method and a sixth "Parallel/Sequential" bytes moved curve 2812 using the sequential EDF estimation method for $N_w=1$ and using the parallel EDF estimation method for $N_w>1$ for a size of sample data 316 of 1E6. A seventh graph 2802 shows a seventh "FULL" bytes moved curve 2814 using the FULL method and a seventh "Parallel/Sequential" bytes moved curve 8616 using the sequential EDF estimation method for $N_w=1$ and using the parallel EDF estimation method for $N_w>1$ for a size of sample data 316 of 2E6. An eighth graph 2804 shows a eighth "FULL" bytes moved curve 2818 using the FULL method and a eighth "Parallel/Sequential" bytes moved curve 2820 using the sequential EDF estimation method for $N_w=1$ and using the parallel EDF estimation method for $N_w>1$ for a size of sample data 316 of 5E6. A ninth graph 2806 shows a ninth "FULL" bytes moved curve 2822 using the FULL method and a ninth "Parallel/Sequential" bytes moved curve 2824 using the sequential EDF estimation method for $N_w=1$ and using the parallel EDF estimation method for $N_w>1$ for a size of sample data 316 of 1E7. A tenth graph 2808 shows a tenth "FULL" bytes moved curve 2826 using the FULL method and a tenth "Parallel/Sequential" bytes moved curve 2828 using the sequential EDF estimation method for $N_w=1$ and using the parallel EDF estimation method for $N_w>1$ for a size of sample data 316 of 2E7.

The results show that the amount of data movement for the FULL method increases significantly as the size of sample data 316 increases. The data movement for the FULL method also increases with $N_w$, but the growth slows down for larger $N_w$ values. Comparatively, the amount of data that the sequential EDF estimation method 1 and the parallel EDF estimation method moves across the network is extremely small. In fact, the exact number of bytes moved across the grid for the FULL and the sequential/parallel EDF estimation methods are shown in FIG. 29 and FIG. 30, respectively, where FIG. 30 with $N_w=1$ is using the sequential EDF estimation method, and $N_w>1$ is using the parallel EDF estimation method.

Figure 29:
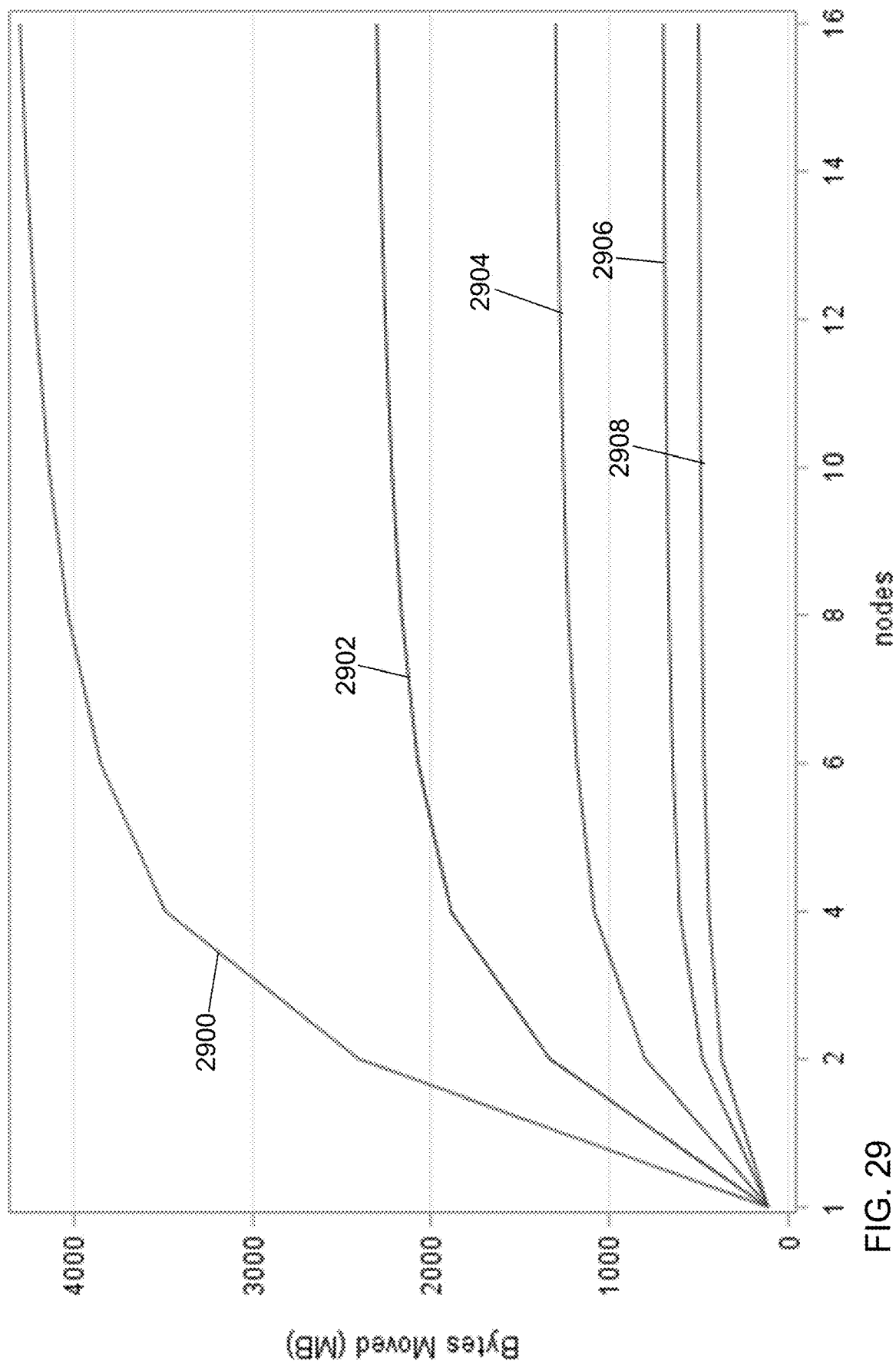
FIG. 29 provides a data movement comparison for the existing system in accordance with an illustrative embodiment.

Referring to FIG. 29, a first bytes moved curve 2900 shows the bytes moved for a size of sample data 316 of 2E7. A second bytes moved curve 2902 shows the bytes moved for a size of sample data 316 of 1E7. A third bytes moved curve 2904 shows the bytes moved for a size of sample data 316 of 5E6. A bytes moved runtime curve 2906 shows the bytes moved for a size of sample data 316 of 2E6. A bytes moved runtime curve 2908 shows the bytes moved for a size of sample data 316 of 1E6.

Figure 30:
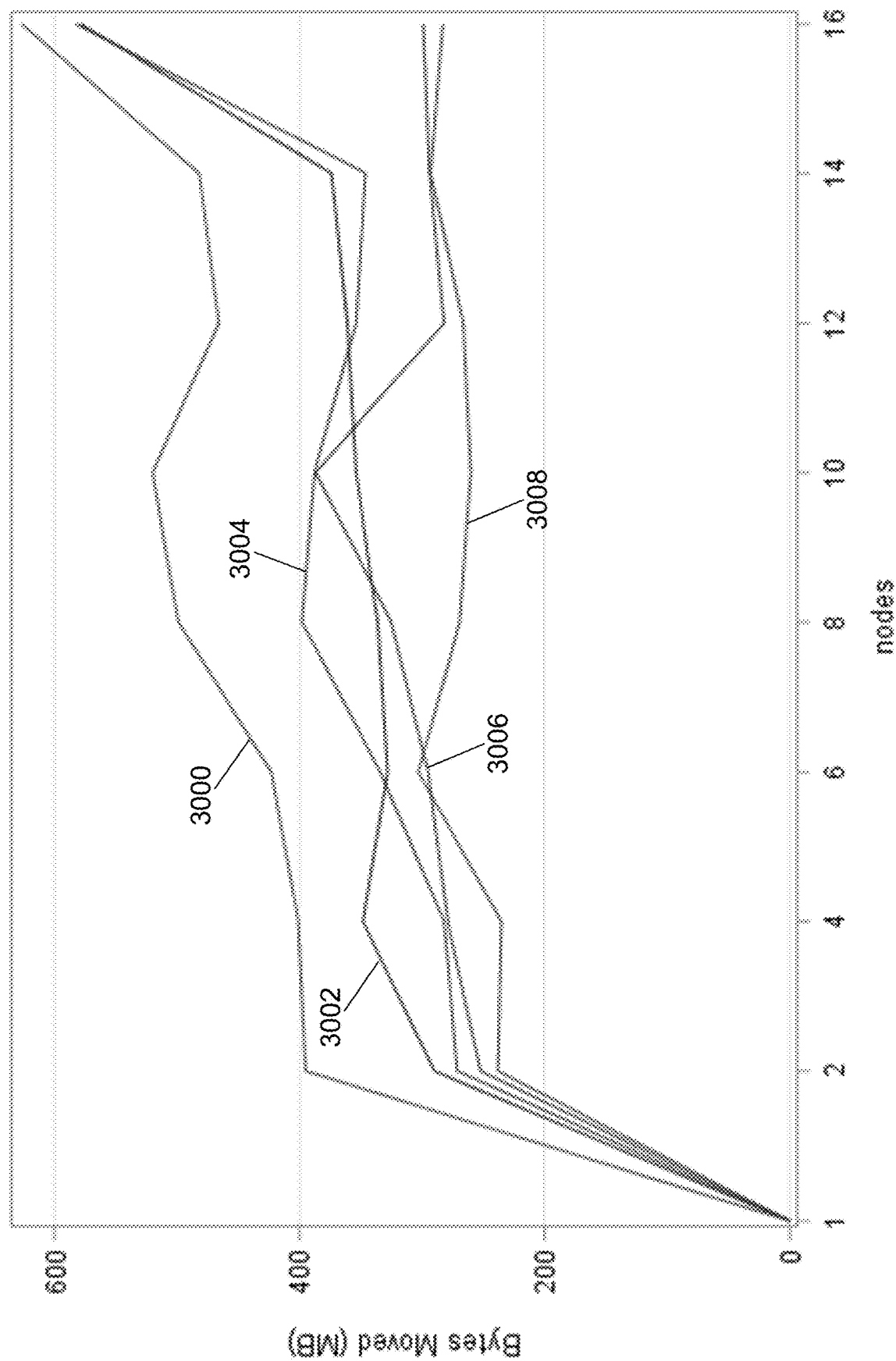
FIG. 30 provides a data movement comparison for the described parallel system in accordance with an illustrative embodiment.
Figure 31:
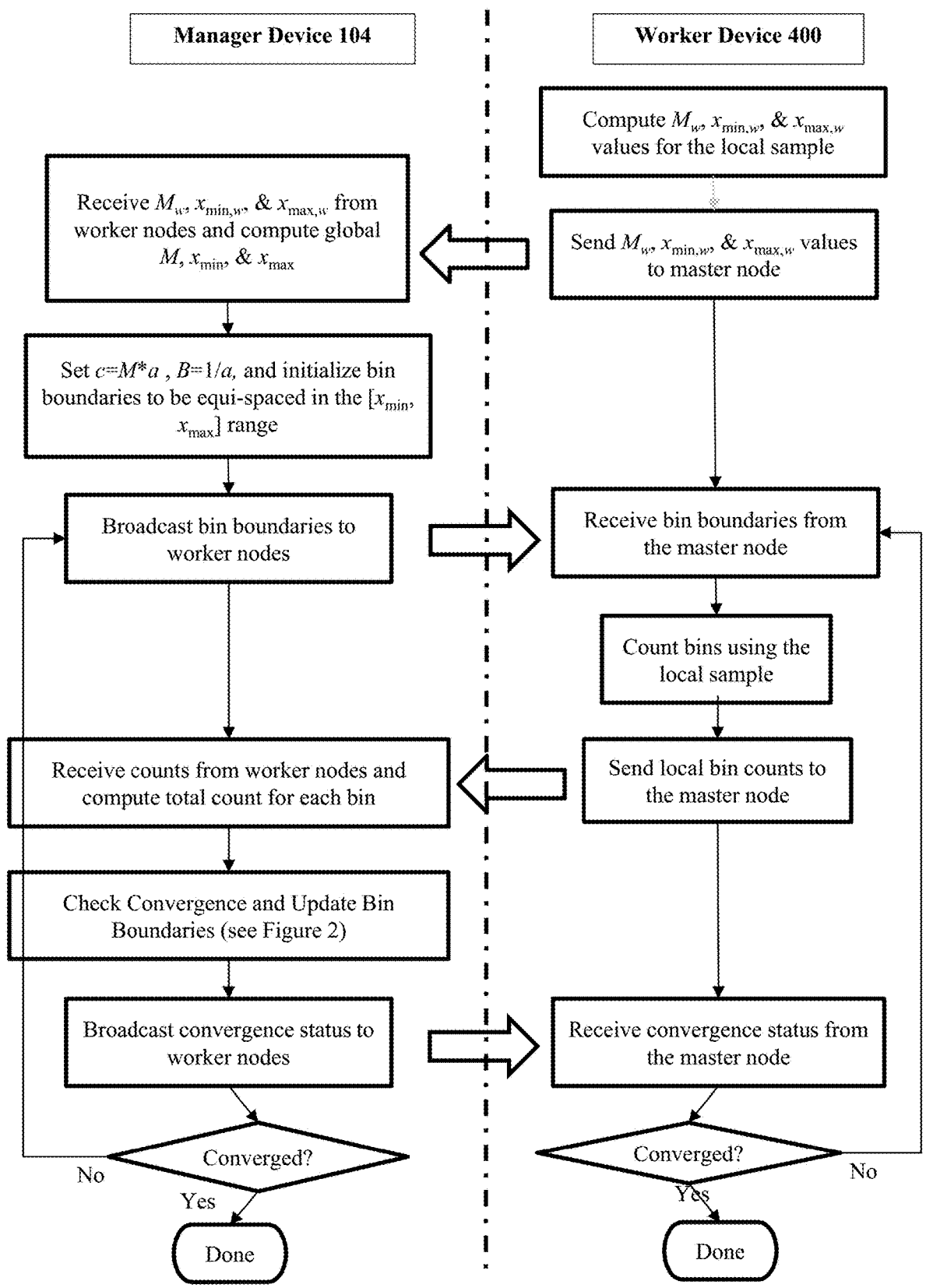
FIG. 31 depicts a flow diagram of the interactions between the manager device of FIG. 2 and the worker device of FIG. 4 in performing parallel EDF estimation in accordance with an illustrative embodiment.

Referring to FIG. 30, Referring to FIG. 30, a first bytes moved curve 3000 shows the runtime for a size of sample data 316 of 2E7. A second bytes moved curve 3002 shows the runtime for a size of sample data 316 of 1E7. A third bytes moved curve 3004 shows the runtime for a size of sample data 316 of 5E6. A bytes moved runtime curve 3006 shows the runtime for a size of sample data 316 of 2E6. A bytes moved runtime curve 3008 shows the runtime for a size of sample data 316 of 1E6.

For the FULL method, the amount grows to more than 12 GB for S=20,000,000 and $N_w=16$, whereas for the sequential/parallel EDF estimation methods, the amount is independent of the value of S and even the largest value for $N_w=16$ is only a few kilobytes, which is orders of magnitude smaller than that of the FULL method.

The experimental results show that the two-stage method can save a significant amount of time and data movement cost, especially as a sample size grows larger, while maintaining statistically accurate results.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

receive metadata from each worker computing device of a plurality of worker computing devices, wherein the metadata from each worker computing device describes a plurality of empirical distribution function (EDF) estimates computed for each of a plurality of samples of each of a plurality of marginal variables that is stored on each respective worker computing device;

enumerate and assign a plurality of combinations of the EDF estimates to each worker computing device based on the received metadata;

initiate a request to compute outcome expectation measure values for an outcome expectation measure to each worker computing device of the plurality of worker computing devices based on the assigned plurality of combinations of the EDF estimates, wherein computing the outcome expectation measure values comprises second computer-readable instructions that when executed by each worker computing device cause each worker computing device to:
(a) read a first combination of the assigned plurality of combinations and a probability value $p_{im}$ of a first marginal variable from a first observation of joint probabilities data;
(b) compute a marginal value as a $(100*p_{im})$th percentile by using an EDF estimate of the first marginal variable from the read first combination;
(c) repeat (a) and (b) with each remaining marginal variable of the plurality of marginal variables as the first marginal variable;
(d) compute an aggregate measure value by applying a predefined aggregation function to the computed marginal variable values;
(e) add the computed aggregate measure value to an aggregate measure sample;
(f) repeat (a) to (e) with each remaining observation in the joint probabilities data as the first observation;
(g) compute the outcome expectation measure value for the first combination from the aggregate measure sample;
(h) repeat (a) to (g) with each remaining combination of the assigned plurality of combinations as the first combination; and
(i) send the computed outcome expectation measure value for each combination of the assigned plurality of combinations to the computing device;

receive the outcome expectation measure values computed by each worker computing device of the plurality of worker computing devices from each respective worker computing device;

accumulate the received outcome expectation measure values for the outcome expectation measure;

compute a mean value for the outcome expectation measure from the accumulated, received outcome expectation measure values; and output the computed mean value for the outcome expectation measure to represent an expected outcome based on the plurality of marginal variables.

2. The non-transitory computer-readable medium of claim 1, wherein the outcome expectation measure is a percentile at a predefined level.

3. The non-transitory computer-readable medium of claim 1, wherein the outcome expectation measure is a conditional tail expectation at a predefined level.

4. The non-transitory computer-readable medium of claim 1, wherein the request includes a plurality of outcome expectation measures.

5. The non-transitory computer-readable medium of claim 1, wherein, after accumulating the received outcome expectation measure values, the computer-readable instructions further cause the computing device to:
compute a standard deviation value for the outcome expectation measure from the accumulated, received outcome expectation measure values and the computed mean value; and
output the computed standard deviation value for the outcome expectation measure.

6. The non-transitory computer-readable medium of claim 1, wherein, after accumulating the received outcome expectation measure values, the computer-readable instructions further cause the computing device to:
compute a median value for the outcome expectation measure from the accumulated, received outcome expectation measure values;
compute an interquartile range value for the outcome expectation measure from the accumulated, received outcome expectation measure values; and
output the computed median value and the computed interquartile range value for the outcome expectation measure.

7. The non-transitory computer-readable medium of claim 1, wherein a first worker computing device of the plurality of worker computing devices that processes an assigned non-local combination requests any non-local EDF estimate that it does not store locally from a second computing device of the plurality of worker computing devices or from the computing device that does store the EDF estimate.

8. The non-transitory computer-readable medium of claim 1, wherein before (a), the computer-readable instructions further cause the computing device to broadcast the joint probabilities data to each worker computing device.

9. The non-transitory computer-readable medium of claim 8, wherein before broadcasting the joint probabilities data, the computer-readable instructions further cause the computing device to create the joint probabilities data from portions of the joint probabilities data distributed across the plurality of worker computing devices.

10. The non-transitory computer-readable medium of claim 1, wherein before (a), the computer-readable instructions further cause the computing device to request that a worker computing device storing the joint probabilities data broadcast the joint probabilities data to each remaining worker computing device.

11. The non-transitory computer-readable medium of claim 1, wherein before (a), the computer-readable instructions further cause the computing device to:
determine whether a portion of the joint probabilities data stored on each worker computing device is greater than or equal to a predefined threshold value;
when the portion of the joint probabilities data stored on each worker computing device is less than the predefined threshold value,
create the joint probabilities data from portions of the joint probabilities data distributed across the plurality of worker computing devices;
when a size of the created joint probabilities data is less than a second predefined threshold value, broadcast the joint probabilities data to each worker computing device; and
when a size of the created joint probabilities data is greater than or equal to the second predefined threshold value, distribute a portion of the created joint probabilities data to each worker computing device.

12. The non-transitory computer-readable medium of claim 11, wherein the portion of the created joint probabilities data distributed to each worker computing device is determined as the size of the created joint probabilities data divided by a number of the worker computing devices.

13. The non-transitory computer-readable medium of claim 1, wherein enumerating and assigning the plurality of combinations comprises balancing a load of processing combinations across the plurality of worker computing devices.

14. The non-transitory computer-readable medium of claim 13, wherein each worker computing device is assigned approximately $$\frac{K_U}{N_W}$$

combinations, where $K_U$ is a predefined maximum number of combinations to process, and $N_W$ is a number of the worker computing devices.

15. A computing device comprising:
   a processor; and
   a non-transitory computer-readable medium operably coupled to the processor, the computer-readable medium having computer-readable instructions stored thereon that, when executed by the processor, cause the computing device to
      receive metadata from each worker computing device of a plurality of worker computing devices, wherein the metadata from each worker computing device describes a plurality of empirical distribution function (EDF) estimates computed for each of a plurality of samples of each of a plurality of marginal variables that is stored on each respective worker computing device;
      enumerate and assign a plurality of combinations of the EDF estimates to each worker computing device based on the received metadata;
      initiate a request to compute outcome expectation measure values for an outcome expectation measure to each worker computing device of the plurality of worker computing devices based on the assigned plurality of combinations of the EDF estimates;
      receive the outcome expectation measure values computed by each worker computing device of the plurality of worker computing devices from each respective worker computing device, wherein computing the outcome expectation measure values comprises second computer-readable instructions that when executed by each worker computing device cause each worker computing device to:
         (a) read a first combination of the assigned plurality of combinations and a probability value $p_{im}$ of a first marginal variable from a first observation of joint probabilities data;
         (b) compute a marginal value as a $(100*p_{im})$th percentile by using an EDF estimate of the first marginal variable from the read first combination;
         (c) repeat (a) and (b) with each remaining marginal variable of the plurality of marginal variables as the first marginal variable;
         (d) compute an aggregate measure value by applying a predefined aggregation function to the computed marginal variable values;
         (e) add the computed aggregate measure value to an aggregate measure sample;
         (f) repeat (a) to (e) with each remaining observation in the joint probabilities data as the first observation;
         (g) compute the outcome expectation measure value for the first combination from the aggregate measure sample;
         (h) repeat (a) to (g) with each remaining combination of the assigned plurality of combinations as the first combination; and
         (i) send the computed outcome expectation measure value for each combination of the assigned plurality of combinations to the computing device;
      accumulate the received outcome expectation measure values for the outcome expectation measure;
      compute a mean value for the outcome expectation measure from the accumulated, received outcome expectation measure values; and
      output the computed mean value for the outcome expectation measure to represent an expected outcome based on the plurality of marginal variables.

16. A method of distributed computation of an outcome expectation measure, the method comprising:
   receiving, by a computing device, metadata from each worker computing device of a plurality of worker computing devices, wherein the metadata from each worker computing device describes a plurality of empirical distribution function (EDF) estimates computed for each of a plurality of samples of each of a plurality of marginal variables that is stored on each respective worker computing device;
   enumerating and assigning, by the computing device, a plurality of combinations of the EDF estimates to each worker computing device based on the received metadata;
   initiating, by the computing device, a request to compute outcome expectation measure values for an outcome expectation measure to each worker computing device of the plurality of worker computing devices based on the assigned plurality of combinations of the EDF estimates, wherein computing the outcome expectation measure values by each worker computing device comprises:
      (a) reading, by a respective worker computing device, a first combination of the assigned plurality of combinations and a probability value $p_{im}$ of a first marginal variable from a first observation of joint probabilities data;
      (b) computing, by the respective worker computing device, a marginal value as a $(100*p_{im})$th percentile by using an EDF estimate of the first marginal variable from the read first combination;
      (c) repeating, by the respective worker computing device, (a) and (b) with each remaining marginal variable of the plurality of marginal variables as the first marginal variable;
      (d) computing, by the respective worker computing device, an aggregate measure value by applying a predefined aggregation function to the computed marginal variable values;
      (e) adding, by the respective worker computing device, the computed aggregate measure value to an aggregate measure sample;
      (f) repeating, by the respective worker computing device, (a) to (e) with each remaining observation in the joint probabilities data as the first observation;
      (g) computing, by the respective worker computing device, the outcome expectation measure value for the first combination from the aggregate measure sample;
      (h) repeating, by the respective worker computing device, (a) to (g) with each remaining combination of the assigned plurality of combinations as the first combination; and
      (i) sending, by the respective worker computing device, the computed outcome expectation measure value for each combination of the assigned plurality of combinations to the computing device;
   receiving, by the computing device, the outcome expectation measure values computed by each worker computing device of the plurality of worker computing devices from each respective worker computing device;

accumulating, by the computing device, the received outcome expectation measure values for the outcome expectation measure;

computing, by the computing device, a mean value for the outcome expectation measure from the accumulated, received outcome expectation measure values; and outputting, by the computing device, the computed mean value for the outcome expectation measure to represent an expected outcome based on the plurality of marginal variables.

17. The method of claim 16, wherein the estimated EDF assigned to a first worker computing device of the plurality of worker computing devices that does not store a non-local combination is requested from a second worker computing of the plurality of worker computing devices that does store the non-local combination.

18. The method of claim 16, wherein enumerating and assigning the plurality of combinations comprises balancing a load of processing combinations across the plurality of worker computing devices.

19. The method of claim 18, wherein each worker computing device is assigned approximately $$\frac{K_U}{N_W}$$

combinations, where $K_U$ is a predefined maximum number of combinations to process, and $N_W$ is a number of the worker computing devices.

20. A non-transitory computer-readable medium having stored thereon computer-readable instructions that when executed by a computing device cause the computing device to:

receive metadata from each worker computing device of a plurality of worker computing devices, wherein the metadata from each worker computing device describes a plurality of empirical distribution function (EDF) estimates computed for each of a plurality of samples of each of a plurality of marginal variables that is stored on each respective worker computing device;

enumerate and assign a plurality of combinations of the EDF estimates to each worker computing device based on the received metadata, wherein enumerating and assigning the plurality of combinations comprises computing a total number of local combinations as a sum of a number of purely local combinations computable on each worker computing device, wherein a purely local combination indicates that the respective worker computing device includes a full sample of each marginal variable included in the purely local combination;

when the total number of local combinations is greater than or equal to a predefined maximum number of combinations to process, computing $$W_E = \Sigma_{N_W} 1_{\left(K_w > \frac{K_U}{N_W}\right)},$$

where $1_C$ denotes a function that equals one if the condition C is true and zero otherwise, $N_W$ is a number of the worker computing devices, $K_U$ is the predefined maximum number of combinations to process, and $K_w$ is the number of purely local combinations computable on a $w^{th}$ worker computing device;

when $W_E/N_W$ is less than or equal to a predefined threshold, computing a total slack value E as $$E = \Sigma_{N_W} \max\left(\frac{K_U}{N_W} - K_w, 0\right);$$

computing a number of combinations assigned $N_a$ as $$N_a = \min\left(\frac{K_U}{N_W} + \frac{E}{W_E}, K_w\right);$$

and requesting that each worker computing device process $N_a$ of its purely local combinations;

initiate a request to compute outcome expectation measure values for an outcome expectation measure to each worker computing device of the plurality of worker computing devices based on the assigned plurality of combinations of the EDF estimates;

receive the outcome expectation measure values computed by each worker computing device of the plurality of worker computing devices from each respective worker computing device;

accumulate the received outcome expectation measure values for the outcome expectation measure;

compute a mean value for the outcome expectation measure from the accumulated, received outcome expectation measure values; and output the computed mean value for the outcome expectation measure to represent an expected outcome based on the plurality of marginal variables.

21. The non-transitory computer-readable medium of claim 20, wherein enumerating and assigning the plurality of combinations further comprises:

when the total number of local combinations is greater than or equal to a predefined maximum number of combinations to process, computing $$W_E = \Sigma_{N_W} 1_{\left(K_w > \frac{K_U}{N_W}\right)},$$

where $1_C$ denotes a function that equals one if the condition C is true and zero otherwise, $N_W$ is a number of the worker computing devices, $K_U$ is the predefined maximum number of combinations to process, and $K_w$ is the number of purely local combinations computable on a $w^{th}$ worker computing device;

when $W_E/N_W$ is greater than a predefined threshold or when the total number of local combinations is less than the predefined maximum number of combinations to process, (a) selecting a worker computing device of the plurality of worker computing devices;

(b) computing a number of marginal variables L that have a local sample on the selected worker computing device;

(c) computing a number of local samples $N_m$ of a first marginal variable on the selected worker computing device; and (d) when $L=N_m$ and $$K_W \geq \frac{K_U}{N_W},$$

the selected worker computing device is assigned the purely local combinations computable on the selected worker computing device.

22. The non-transitory computer-readable medium of claim 21, wherein enumerating and assigning the plurality of combinations further comprises:

(e) when $L \geq N_m$, computing $$R_w = \frac{K_U}{N_W} - K_W, L = N_m,$$

and $N_{nl}=0$;

(f) computing $C_w = N_1 * N_2 * \ldots * N_{L-1} N_{nl}$;
(g) when there are no non-local samples for an Lth marginal, decrementing L;
(h) when there are no non-local samples for the Lth marginal and when L=0, repeating (a) to (e) for each remaining worker computing device of the plurality of worker computing devices; and
(i) when there are no non-local samples for the Lth marginal and when decremented $L \neq 0$, repeating (f) to (h).

23. The non-transitory computer-readable medium of claim 22, wherein enumerating and assigning the plurality of combinations further comprises:

(j) when there are non-local samples for the Lth marginal, adding a next smallest non-local sample for the Lth marginal to the plurality of combinations assigned to the selected worker computing device;
(k) computing $R_w = R_w - C_w$ and $N_{nl} = N_{nl} + 1$; and
(l) when $R_w > 0$, repeating (g) to (k).

24. The non-transitory computer-readable medium of claim 23, wherein enumerating and assigning the plurality of combinations further comprises:

(m) when $L < N_m$, computing $$R_w = \frac{K_U}{N_W},$$

$N_{nl}=U$, $C_w = N_1 * N_2 * \ldots * N_L$, and setting a new combination parameter to indicate false;
(n) computing $m=L+1$;
(o) when there are non-local samples for an mth marginal, adding a next smallest non-local sample for a marginal m to the plurality of combinations assigned to the selected worker computing device and setting a new combination parameter to indicate true;
(p) incrementing m; and
(q) when $m \leq N_m$, repeating (o) to (p) until $m > N_m$.

25. The non-transitory computer-readable medium of claim 24, wherein enumerating and assigning the plurality of combinations further comprises:

(r) when $m > N_m$ and the new combination parameter indicates true, computing $R_w = R_w - C_w$ and $N_{nl} = N_{nl} + 1$;
(s) when $m > N$, and the new combination parameter indicates true, and $R_w > 0$, repeating (n) to (r) until $R_w \leq 0$;

(t) when $m > N_m$, the new combination parameter indicates false, and L=0, repeating (a) to (s) for each remaining worker computing device of the plurality of worker computing devices; and
(u) when $m > N_m$, the new combination parameter indicates false, and $L \neq 0$, repeating (f) to (l).

26. A computing device comprising:
a processor; and
a non-transitory computer-readable medium operably coupled to the processor, the computer-readable medium having computer-readable instructions stored thereon that, when executed by the processor, cause the computing device to
receive metadata from each worker computing device of a plurality of worker computing devices, wherein the metadata from each worker computing device describes a plurality of empirical distribution function (EDF) estimates computed for each of a plurality of samples of each of a plurality of marginal variables that is stored on each respective worker computing device;
enumerate and assign a plurality of combinations of the EDF estimates to each worker computing device based on the received metadata, wherein enumerating and assigning the plurality of combinations comprises
computing a total number of local combinations as a sum of a number of purely local combinations computable on each worker computing device, wherein a purely local combination indicates that the respective worker computing device includes a full sample of each marginal variable included in the purely local combination;
when the total number of local combinations is greater than or equal to a predefined maximum number of combinations to process, computing $$W_E = \Sigma_{N_W} 1_{\left(K_w > \frac{K_U}{N_W}\right)},$$

where $1_C$ denotes a function that equals one if the condition C is true and zero otherwise, $N_W$ is a number of the worker computing devices, $K_U$ is the predefined maximum number of combinations to process, and $K_w$ is the number of purely local combinations computable on a $w^{th}$ worker computing device;
when $W_E/N_W$ is less than or equal to a predefined threshold, computing a total slack value E as $$E = \Sigma_{N_W} \max\left(\frac{K_U}{N_W} - K_w, 0\right);$$

computing a number of combinations assigned $N_a$ as $$N_a = \min\left(\frac{K_U}{N_W} + \frac{E}{W_E}, K_w\right);$$

and
requesting that each worker computing device process $N_a$ of its purely local combinations;

initiate a request to compute outcome expectation measure values for an outcome expectation measure to each worker computing device of the plurality of worker computing devices based on the assigned plurality of combinations of the EDF estimates;
receive the outcome expectation measure values computed by each worker computing device of the plurality of worker computing devices from each respective worker computing device;
accumulate the received outcome expectation measure values for the outcome expectation measure;
compute a mean value for the outcome expectation measure from the accumulated, received outcome expectation measure values; and
output the computed mean value for the outcome expectation measure to represent an expected outcome based on the plurality of marginal variables.

27. A method of distributed computation of an outcome expectation measure, the method comprising:
receiving, by a computing device, metadata from each worker computing device of a plurality of worker computing devices, wherein the metadata from each worker computing device describes a plurality of empirical distribution function (EDF) estimates computed for each of a plurality of samples of each of a plurality of marginal variables that is stored on each respective worker computing device;
enumerating and assigning, by the computing device, a plurality of combinations of the EDF estimates to each worker computing device based on the received metadata, wherein enumerating and assigning the plurality of combinations comprises
computing a total number of local combinations as a sum of a number of purely local combinations computable on each worker computing device, wherein a purely local combination indicates that the respective worker computing device includes a full sample of each marginal variable included in the purely local combination;
when the total number of local combinations is greater than or equal to a predefined maximum number of combinations to process, computing $$W_E = \Sigma_{N_W} 1_{\left(K_w > \frac{K_U}{N_W}\right)},$$

where $1_C$ denotes a function that equals one if the condition C is true and zero otherwise, $N_W$ is a number of the worker computing devices, $K_U$ is the predefined maximum number of combinations to process, and $K_w$ is the number of purely local combinations computable on a $w^{th}$ worker computing device;
when $W_E/N_W$ is less than or equal to a predefined threshold, computing a total slack value E as $$E = \Sigma_{N_W} \max\left(\frac{K_U}{N_W} - K_w, 0\right);$$

computing a number of combinations assigned $N_a$ as $$N_a = \min\left(\frac{K_U}{N_W} + \frac{E}{W_E}, K_w\right);$$

and
requesting that each worker computing device process $N_a$ of its purely local combinations;
initiating, by the computing device, a request to compute outcome expectation measure values for an outcome expectation measure to each worker computing device of the plurality of worker computing devices based on the assigned plurality of combinations of the EDF estimates;
receiving, by the computing device, the outcome expectation measure values computed by each worker computing device of the plurality of worker computing devices from each respective worker computing device;
accumulating, by the computing device, the received outcome expectation measure values for the outcome expectation measure;
computing, by the computing device, a mean value for the outcome expectation measure from the accumulated, received outcome expectation measure values; and
outputting, by the computing device, the computed mean value for the outcome expectation measure to represent an expected outcome based on the plurality of marginal variables.

* * * * *

UNITED STATES PATENT AND TRADEMARK OFFICE
CERTIFICATE OF CORRECTION

PATENT NO. : 10,565,085 B2
APPLICATION NO. : 16/433136
DATED : February 18, 2020
INVENTOR(S) : Joshi It is certified that error appears in the above-identified patent and that said Letters Patent is hereby corrected as shown below:

In the Specification

Column 32, Line 36:
Delete the phrase "in all the regions: $B = 81 + 82\ B_K$." and replace with --in all the regions: $B = B_1 + B_2 + ... + B_K$.--.

Column 46, Line 30-31:
Delete the phrase "a determination is made concerning $n_l\ c$." and replace with --a determination is made concerning $n_l \leq c$.--.

Column 47, Line 8:
Delete the phrase "When $n_l 32c$, processing continues in an operation 695." and replace with --When $n_l = c$, processing continues in an operation 695.--.

Column 48, Line 63:
Delete the phrase "active interval is 04=70." and replace with --active interval is $o_4 = 70$.--.

Column 49, Line 3:
Delete the phrase "active interval is 05=30." and replace with --active interval is $o_5 = 30$.--.

In the Claims

Claim 22, Column 67, Line 21:
Delete the phrase "(f) computing $C_w = N_1 * N_2 * ... * N_{L-1}\ N_{nl}$;" and replace with --(f) computing $C_w = N_1 * N_2 * ... * N_{L-1} + N_{nl}$;--.

Claim 24, Column 67, Line 50:
Delete the phrase "$N_{nl} = U,\ C_w = N_1 * N_2 * ... * N_L$," and replace with --$N_{nl} = 0,\ C_w = N_1 * N_2 * ... * N_L$,--.

Signed and Sealed this
Ninth Day of June, 2020

Andrei Iancu
*Director of the United States Patent and Trademark Office*